United States Patent [19]

Makino et al.

[11] Patent Number: 4,568,623

[45] Date of Patent: Feb. 4, 1986

[54] PHOTOCONDUCTIVE COMPOSITIONS CONTAINING NOVEL DISAZO COMPOUNDS AND ELECTROPHOTOGRAPHIC PHOTORECEPTORS USING THE SAME

[75] Inventors: Naonori Makino; Seiji Horie; Kouichi Kawamura; Hideo Sato, all of Kanagawa, Japan

[73] Assignee: Fuji Photo Film Co., Ltd., Kanagawa, Japan

[21] Appl. No.: 616,501

[22] Filed: Jun. 1, 1984

[30] Foreign Application Priority Data

Jun. 3, 1983 [JP] Japan .................................. 58-99042

[51] Int. Cl.$^4$ ................................................ G03G 5/06
[52] U.S. Cl. .......................................... 430/58; 430/71; 430/72; 430/75; 430/76; 430/79; 534/691

[58] Field of Search ................ 430/58, 71, 72, 75, 430/76, 79; 260/160, 188

[56] References Cited

U.S. PATENT DOCUMENTS 4,349,616  9/1982  Sasaki ................................. 430/76
4,451,548  5/1984  Kinoshita et al. .................. 430/76

*Primary Examiner*—John L. Goodrow
*Attorney, Agent, or Firm*—Sughrue, Mion, Zinn, Macpeak and Seas

[57] ABSTRACT

Disazo compounds of a specified structure as a photoconductive element for photoreceptors in an electrophotographic process, which achieve higher photosensitivity and higher durability compared with conventional organic photoconductive materials, useful with copying machines, printers, video camera pickup tubes and semiconductor circuits for signal transfer and scanning.

12 Claims, 1 Drawing Figure

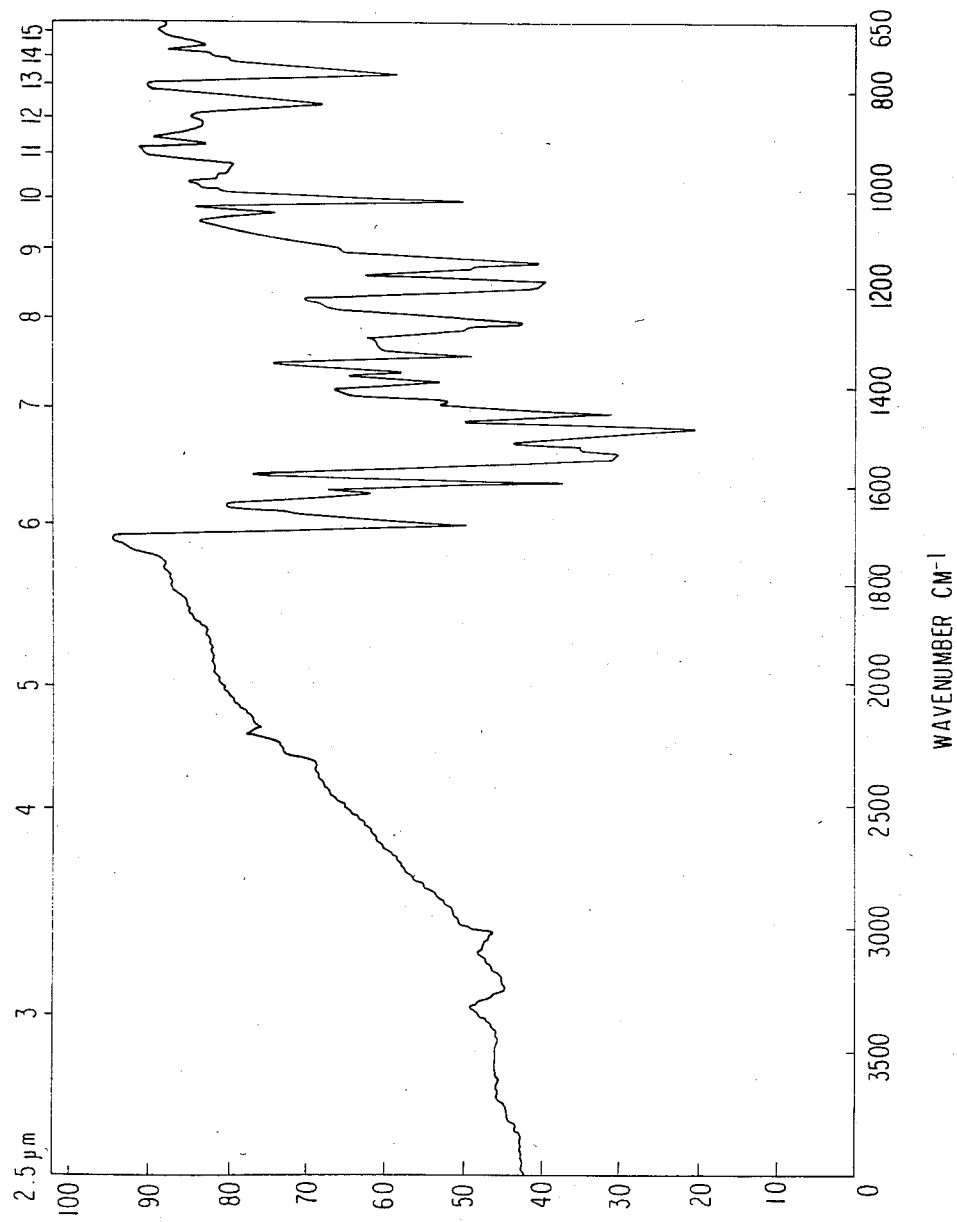

PHOTOCONDUCTIVE COMPOSITIONS CONTAINING NOVEL DISAZO COMPOUNDS AND ELECTROPHOTOGRAPHIC PHOTORECEPTORS USING THE SAME

FIELD OF THE INVENTION

This invention relates to photoconductive compositions comprising a novel disazo compound and to electrophotographic photoreceptors containing the disazo compound in a photosensitive layer.

BACKGROUND OF THE INVENTION

Photoconduction in an electrophotographic photoreceptor consists of the following two steps:

(1) generation of electric charges by exposure, and
(2) transport of the generated electric charges.

A selenium photoconductor may be mentioned as a typical example in which the steps (1) and (2) are achieved using a single substance. On the other hand, the combination of amorphous selenium and polyvinylcarbazole is familiar example in which the two steps (1) and (2) are effected separately by different types of substances. The latter combination has the advantage that a wider range of selection for photoconductive materials is possible, thus helping achieve better electrophotographic characteristics, such as higher photosensitivity and receptive potential, as well as greater ease in manufacturing the photoreceptor layer.

Inorganic substances, such as selenium, cadmium sulfide and zinc oxide, have long been used as photoconductive material in electrophotographic photoreceptors.

As disclosed in U.S. Pat. No. 2,297,691, the electrophotographic process employs a photoconductive material comprising a base material and a substance coated thereupon which is electrically insulated in the dark and whose electric resistance changes depending on the amount of light received during exposure. The conductive material is uniformly surface charged after being allowed to stand in the dark for an appropriate time, and then exposed for image formation in such a pattern that the surface charge at each section of the photoconductive material is reduced in accordance with the relative energy at that image section. The pattern of electric charges thus left on the surface of photoconductive layer (electrophotographic photoreceptive layer), that is, static latent images, are then brought into contact with a charge-detecting and developing substance ("toner") for development of visible images.

The toner, whether it is dispersed in an electrically insulating liquid or contained in a dry carrier, can be attached to the electrophotographic photosensitive layer in accordance with the pattern of static charges. The toner thus attached can be fixed by known methods, such as application of heat, pressure and solvent vapor. Alternatively the static latent images may be transported to a second substrate, such as a paper and a film. It is also possible to transport the static latent images to a second substrate and develop them there. Electrophotography is the process of forming images by these methods.

The basic requirements for photoreceptors used in this process include: (1) the capability of being electrically charged to an appropriate potential in the dark, (2) little leakage of electric charges in the dark, and (3) rapid leakage of electric charges upon irradiation of light.

The inorganic substances mentioned above have various advantages, but it is also true that they also have a number of disadvantages. Selenium, which is now used extensively, fully satisfies the above-mentioned requirements (1) through (3). On the other hand, the cost for producing photoreceptors is high because of the critical manufacturing conditions involved. It is difficult to shape this substance into a belt form because of a lack of flexibility, and its high sensitivity to thermal and mechanical shock requires special care in handling. Cadmium sulfide and zinc oxide are used in a dispersed form using a resin as a binder, but poor mechanical properties, such as surface smoothness, hardness, tensile strength and abrasion resistance, prove an obstacle against its repetitive use.

To avoid these difficulties associated with inorganic substances, various photoreceptors using organic substances have recently been proposed, some of which have been practically used. These include photoreceptors comprising poly-N-vinylcarbazole and 2,4,7-trinitrofluoren-9-one (as disclosed in U.S. Pat. No. 3,484,237); poly-N-vinylcarbazole sensitized with pyrilium salt dyes (as disclosed in Japanese Patent Publication No. 25658/73); photoreceptors using an organic pigment as main component (as disclosed in Japanese Patent Application (OPI) No. 37543/72 (the term "OPI" as used herein refers to a "published unexamined Japanese patent application")); and photoreceptors using as a main component an eutectic complex of a dye and a resin (as disclosed in Japanese Patent Application (OPI) No. 10735/72).

These organic photoreceptors have better mechanical properties and flexibility in comparison with the above-described inorganic photoreceptors to a greater or lesser extent, but they do not fully satisfy the requirements because of low sensitivity or unsuitability for repetitive use.

SUMMARY OF THE INVENTION

As a result of studies to overcome the difficulties of conventional photoreceptors for electrophotography, it has now been discovered that photoreceptors containing a novel disazo compound as described below show sensitivity and durability sufficiently high for practical use. This invention was accomplished based on these findings.

Thus the present invention provides a photoconductive compositions comprising a novel disazo compound (disazo dye) represented by the general formula (1) below and an electrophotographic photoreceptor containing the disazo compound in the photosensitive layer.

This invention specifically provides:

(1) a photoconductive composition comprising a disazo compound represented by the general formula (1)

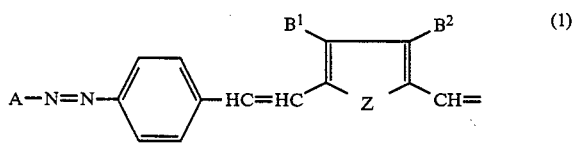

-continued

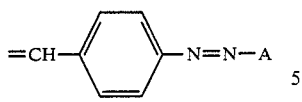

wherein Z is

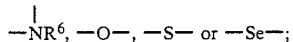

$R^6$ is a hydrogen atom, a lower alkyl group, an aryl group, an aryloxy group, an aryloxy carbonyl group or a substituted group thereof; A represents

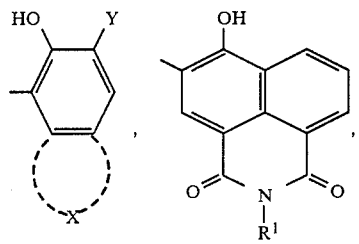

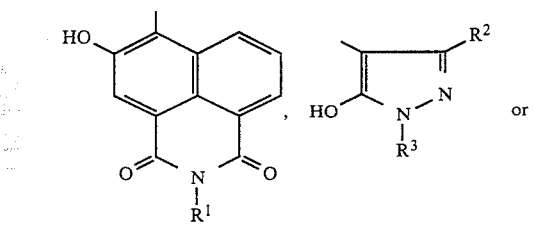

where $B^1$ and $B^2$ each represents a hydrogen atom, a halogen atom, a lower alkyl group, a lower alkoxyl group, a lower alkoxycarbonyl group, an aryl group, an aryloxy group, an aryloxycarbonyl group, or a substituted group thereof and may be the same or different; X represents a radical (a group of atoms) which links with the benzene ring to which a hydroxyl group and Y groups are attached to form an aromatic or heterocyclic ring (which may be substituted or unsubstituted); Y represents

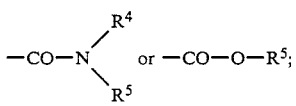

$R^1$ is an alkyl group, a phenyl group, or a substituted group thereof; $R^2$ is a hydrogen atom, a lower alkyl group, a carbamoyl group, a carboxyl group, an alkoxycarbonyl group, an aryloxycarbonyl group, or a substituted or unsubstituted amino group; $R^3$ and $R^5$ each represents an alkyl group, an aromatic group or a heterocyclic group, or a substituted group thereof; and $R^4$ is a hydrogen atom, an alkyl group, a phenyl group, or a substituted group thereof.

This invention also provides:

(2) an electrophotographic photoreceptor containing a disazo compound represented by the above-described general formula (1) in the photosensitive layer.

BRIEF DESCRIPTION OF THE DRAWING

The FIGURE shows the infrared absorption spectrum (KBr method) of Disazo Compound I-13.

DETAILED DESCRIPTION OF THE INVENTION

The disazo compounds represented by the general formula (1) are described in more detail below.

Z is selected from the group consisting of

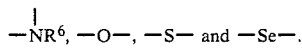

$R^6$ may be an alkyl group, preferably of 1 to 6 carbon atoms, or an aryl group. Typical examples of unsubstituted alkyl groups include methyl, ethyl, propyl, butyl, pentyl, hexyl, isopropyl, isobutyl, isohexyl, neopentyl and tert-butyl groups.

When $R^6$ is a substituted alkyl group, the substituent group may be, among others, a hydroxyl group, an alkoxy group of 1 to 6 carbon atoms, a cyano group, an alkylamino group of 1 to 6 carbon atoms, a dialkylamino group having two alkyl groups of 1 to 6 carbon atoms, a halogen atom, or an aryl group of 6 to 15 carbon atoms. Typical examples include hydroxyalkyl groups (e.g., hydroxymethyl, 2-hydroxyethyl, 3-hydroxypropyl and 2-hydroxypropyl), alkoxyalkyl groups (e.g., methoxymethyl, 2-methoxyethyl, 3-methoxypropyl, ethoxymethyl and 2-ethoxyethyl), cyanoalkyl groups (e.g., cyanomethyl and 2-cyanoethyl), (alkylamino)alkyl groups (e.g., (methylamino)methyl, 2-(methylamino)ethyl and (ethylamino)methyl), (dialkylamino)alkyl groups (e.g., (dimethylamino)methyl and 2-(dimethylamino)ethyl), haloalkyl groups (e.g., fluoromethyl, chloromethyl and bromomethyl), and aralkyl groups (e.g., benzyl and phenethyl). Typical examples of $R^6$ when it is an unsubstituted aryl group, an unsubstituted aryloxy group or an unsubstituted aryloxycarbonyl group include phenyl, naphthyl, phenoxy, naphthoxy, phenoxycarbonyl and naphthoxycarbonyl groups.

When $R^6$ is a substituted aryl group, a substituted aryloxy group or a substituted aryloxycarbonyl group, the substitutent group may be the same as when $R^6$ is a substituted alkyl group. The number of substituents may be 1, 2 or 3; when more than one substituent is present, these may be the same or different (in any combination) and may be attached to any positions of the aromatic ring.

X is a radical (a group of atoms) capable of forming an aromatic ring, such as naphthalene and anthracene, or a heterocyclic ring, such as indole, carbazole, benzocarbazole and dibenzofuran, through condensation with the benzene nucleus to which a hydroxyl group and Y are attached. When X forms a substituted aromatic or heterocyclic ring, the substituent groups may be, among others, a halogen atom (e.g., fluorine, chlorine and bromine), or a lower alkyl group preferably of 1 to 8 carbon atoms (e.g., methyl, ethyl, propyl, butyl, isopropyl and isobutyl). The number of these substituents may be 1 or 2; when two substituents are present, they may be the same or different.

$R^1$ may be an alkyl group, preferably of 1 to 12 carbon atoms, or a phenyl group. Examples of unsubstituted alkyl groups include methyl, ethyl, propyl, butyl, pentyl, hexyl, isopropyl, isobutyl, isoamyl, isohexyl, neopentyl and tert-butyl groups. When $R^1$ is a substituted alkyl group, the substituent group may be a hydroxy group, an alkoxy group of 1 to 12 carbon atoms, a cyano group, an amino group, an alkylamino group of 1 to 12 carbon atoms, a dialkylamino group with two alkyl groups of 1 to 12 carbon atoms, a halogen atom, and an aryl group of 6 to 15 carbon atoms. Typical examples of these substituents include hydroxyalkyl groups (e.g., hydroxymethyl, 2-hydroxyethyl, 3-hydroxypropyl and 2-hydroxypropyl), alkoxyalkyl groups (e.g., methoxymethyl, 2-methoxyethyl, 3-methoxypropyl, ethoxymethyl and 2-ethoxyethyl), cyanoalkyl groups (e.g., cyanomethyl and 2-cyanoethyl), aminoalkyl groups (e.g., aminomethyl, 2-aminoethyl and 3-aminopropyl), (alkylamino)alkyl groups (e.g., (methylamino)methyl, 2-(methylamino)ethyl and (ethylamino)methyl), (dialkylamino)alkyl groups (e.g., (dimethylamino)methyl and 2-(dimethylamino)ethyl), haloalkyl groups (e.g., fluoromethyl, chloromethyl and bromomethyl), and aralkyl groups (e.g., benzyl and phenethyl).

When $R^1$ is a substituted phenyl group, the substituent may be a hydroxyl group, an alkoxy group of 1 to 12 carbon atoms, a cyano group, an amino group, an alkylamino group of 1 to 12 carbon atoms, a dialkylamino group having two alkyl groups of 1 to 12 carbon atoms, a halogen atom, an alkyl group of 1 to 6 carbon atoms, and a nitro group. Examples of these substituted phenyl groups include a hydroxyphenyl group, an alkoxyphenyl group (e.g., methoxyphenyl and ethoxyphenyl), a cyanophenyl group, an aminophenyl group, an (alkylamino)phenyl group (e.g., (methylamino)phenyl and (ethylamino)phenyl), a (dialkylamino)phenyl group (e.g., (dimethylamino)phenyl), a halophenyl group (e.g., fluorophenyl, chlorophenyl and bromophenyl), an alkylphenyl group (e.g., tolyl, ethylphenyl, cumenyl, xylyl and mesityl), a nitrophenyl group and a phenyl group having two or three of these substituent groups (at any positions on the benzene nucleus).

$R^2$ is preferably a hydrogen atom, a lower alkyl group of 1 to 6 carbon atoms, a carbamoyl group, a carboxyl group, an alkoxycarbonyl group having an alkoxy group of 1 to 12 carbon atoms, an aryloxycarbonyl group having an aryloxy group of 6 to 20 carbon atoms, or a substituted or unsubstituted amino group. Typical examples of $R^2$ when it is a substituted amino group include methylamino, ethylamino, propylamino, phenylamino, tolylamino, benzylamino, phenethylamino, dimethylamino, diethylamino and diphenylamino groups. Typical examples of lower alkyl groups as a substituent for $R^2$ include methyl, ethyl, propyl, butyl, isopropyl and isobutyl groups; examples of alkoxycarbonyl groups include methoxycarbonyl, ethoxycarbonyl, propoxycarbonyl, butoxycarbonyl, isopropoxycarbonyl and benzyloxycarbonyl groups; and examples of aryloxycarbonyl groups include phenoxycarbonyl and tolyloxycarbonyl groups.

$R^3$ and $R^5$ are preferably an alkyl group of 1 to 20 carbon atoms, an aromatic group, such as a phenyl group and a naphthyl group, a heterocyclic group containing oxygen, nitrogen, sulfur and other hetero atoms, such as dibenzofuranyl, carbazolyl and benzocarbazolyl, or substituted groups thereof. Typical examples of $R^3$ or $R^5$ when it is a substituted or unsubstituted alkyl group may be the same as those for $R^1$ when it is a substituted or unsubstituted alkyl group.

When $R^3$ and $R^5$ are each a substituted aromatic group, such as a substituted phenyl group and a substituted naphthyl group, or a substituted heterocyclic group, such as substituted dibenzofuranyl and substituted carbazolyl, examples of these substituents include a hydroxyl group, a cyano group, a nitro group, a halogen atom (e.g., fluorine, chlorine and bromine), an alkyl group of 1 to 12 carbon atoms (e.g., methyl, ethyl, propyl and isopropyl), an alkoxy group of 1 to 12 carbon atoms (e.g., methoxy, ethoxy, propoxy, butoxy, pentyloxy, isopropoxy, isobutoxy, isoamyloxy, tert-butoxy and neopentyloxy), an amino group, an alkylamino group of 1 to 12 carbon atoms (e.g., methylamino, ethylamino and propylamino), a dialkylamino group having two alkyl groups of 1 to 12 carbon atoms (e.g., dimethylamino, diethylamino and N-methyl-N-ethylamino), an arylamino group of 6 to 12 carbon atoms (e.g., phenylamino and tolylamino), a diarylamino group having two aryl groups of 6 to 15 carbon atoms (e.g., diphenylamino), a carboxyl group, an alkali metal carboxylate group (e.g., Na, K and Li carboxylates), an alkali metal sulfonate group (e.g., Na, K and Li sulfonates), an alkylcarbonyl group (e.g., acetyl, propionyl and benzylcarbonyl), an arylcarbonyl group having an aryl group of 6 to 12 carbon atoms (e.g., benzoyl and toluoyl), and an alkylthio group of 1 to 12 carbon atoms (e.g., methylthio, ethylthio), an arylthio group of 6 to 12 carbon atoms (e.g., phenylthio and tolylthio). The number of these substituent groups may be 1, 2 or 3; when two or three substituents are present, they may be the same or different (in any combination), and may be attached to any positions of the aromatic ring.

$R^4$ is a hydrogen atom, an alkyl group of 1 to 20 carbon atoms, a phenyl group, or a substituted group thereof. As examples of $R^4$ when it is a substituted or unsubstituted alkyl group or phenyl group, the groups given for $R^3$ or $R^5$ when it is a substituted or unsubstituted alkyl group or phenyl group are appropriate.

$B^1$ and $B^2$ each represents a hydrogen atom, a halogen atom (e.g., chlorine, bromine and iodine), an alkyl group of 1 to 6 carbon atoms, an alkoxy group of 1 to 6 carbon atoms, an alkoxycarbonyl group of 1 to 6 carbon atoms, an aryl group of 6 to 15 carbon atoms, an aryloxy group of 6 to 15 carbon atoms, or an aryloxycarbonyl group of 6 to 15 carbon atoms. When $B^1$ and $B^2$ are each a substituted or unsubstituted alkyl, alkoxy, alkoxycarbonyl, aryl, aryloxy or aryloxycarbonyl group, the alkyl and aryl groups thereof may be the same as those for the substituted or unsubstituted alkyl and aryl groups in $R^6$ described above.

Of all the disazo compounds represented by the general formula (1), those represented by the following general formula (2) are most preferred in terms of (1) the capability of providing photoconductive compositions of high sensitivity, (2) the capability of providing electrophotographic layers of high sensitivity, and/or (3) low production cost because of ready availability of the raw materials:

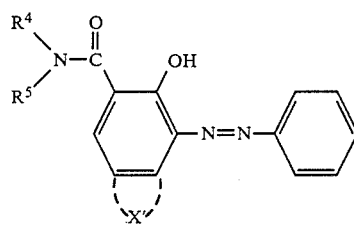 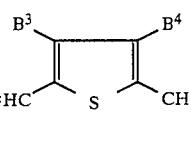 (2)

wherein $B^3$ and $B^4$ each represents a hydrogen atom, a chlorine atom or a bromine atom; $X'$ represents a benzene ring, a carbazole ring or a dibenzofuran ring; and $R^4$ and $R^5$ are as defined in the general formula (1).

Typical examples of the disazo compounds of this invention are listed below. However, the invention is not to be construed as being limited to these examples.

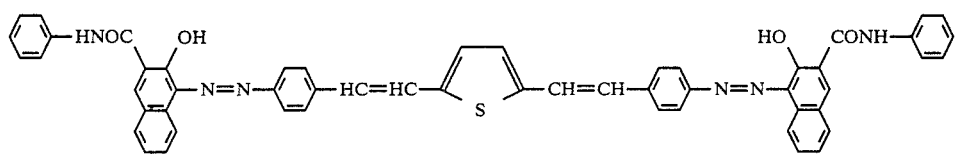 (I-1)

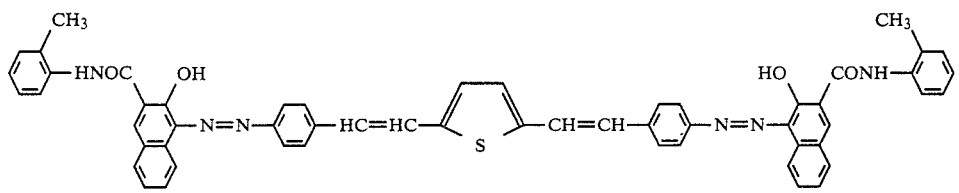 (I-2)

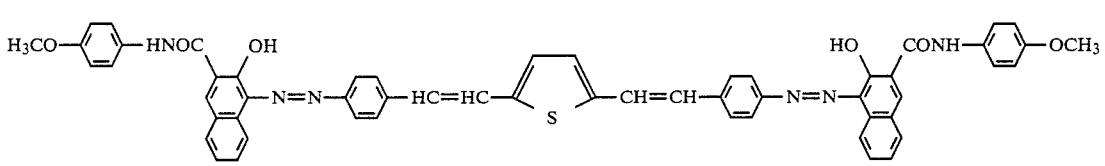 (I-3)

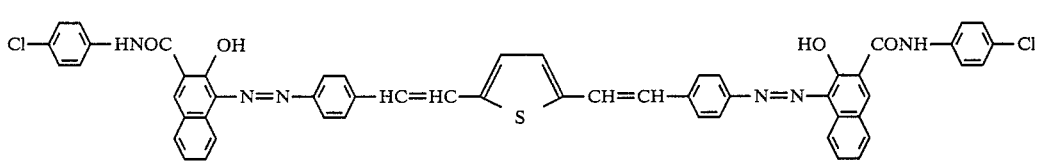 (I-4)

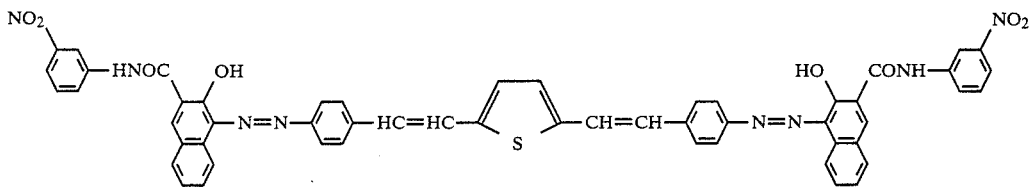 (I-5)

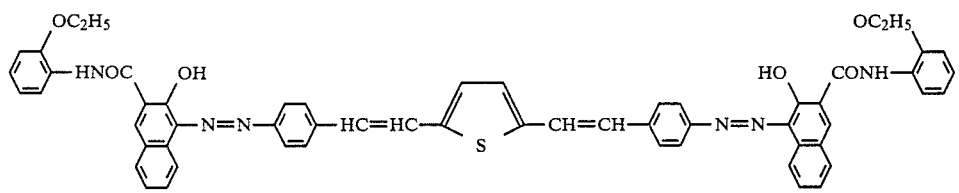 (I-6)

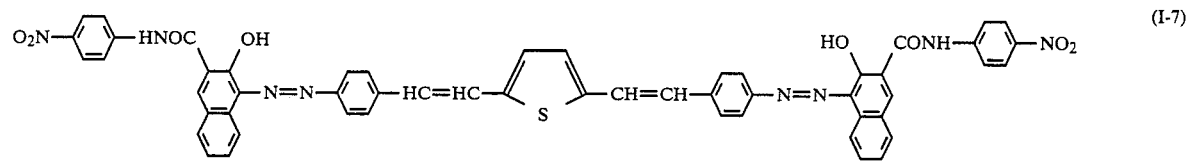
(I-7)
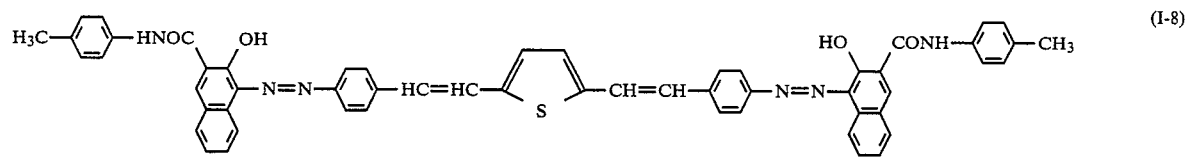
(I-8)
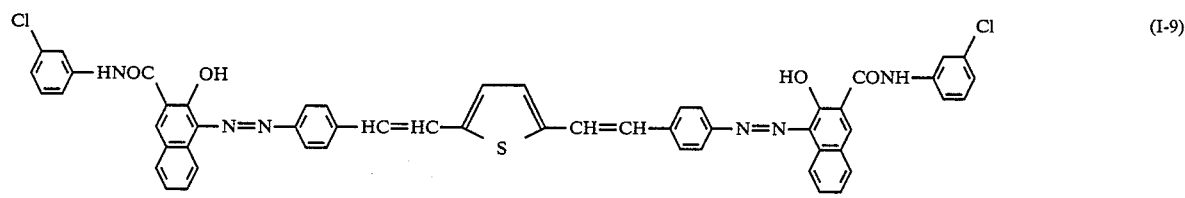
(I-9)
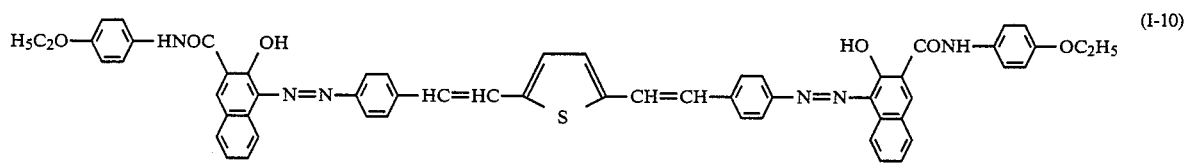
(I-10)
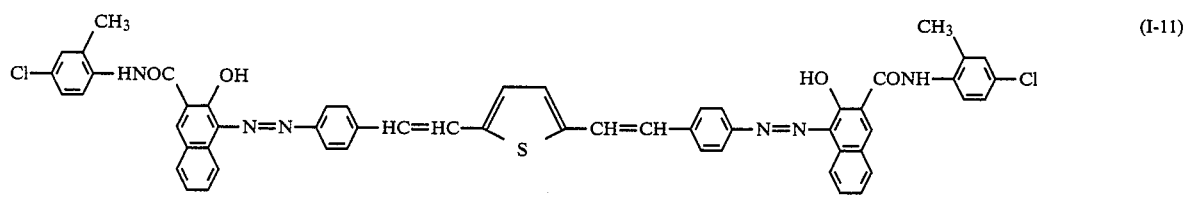
(I-11)
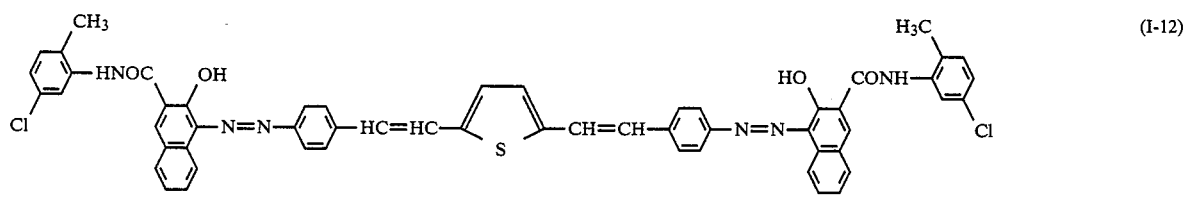
(I-12)
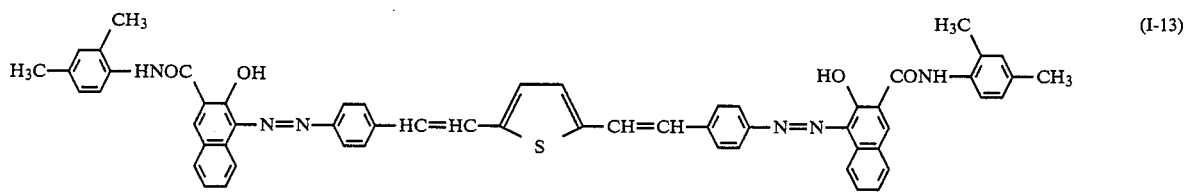
(I-13)

-continued
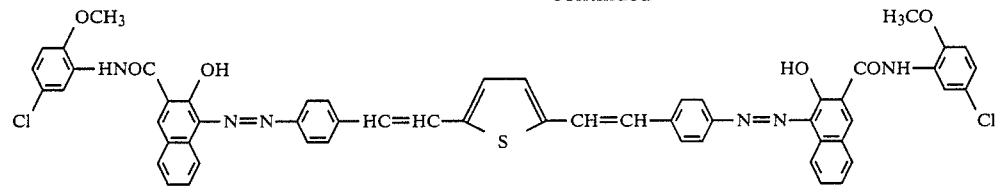
(I-14)
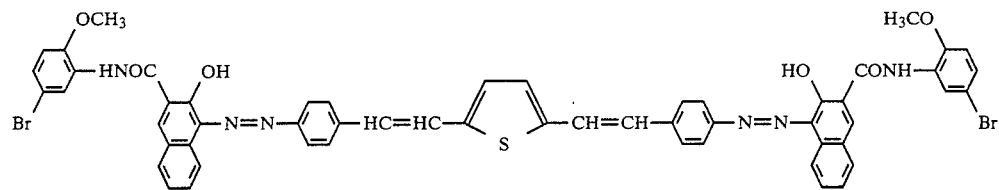
(I-15)
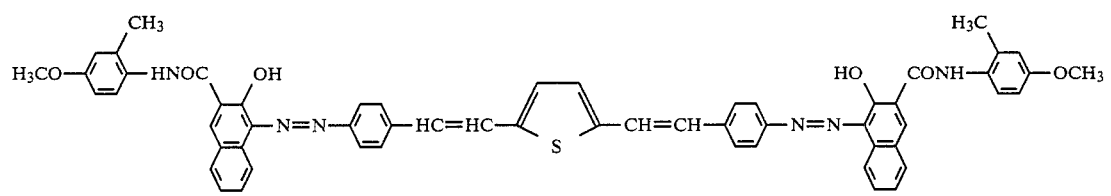
(I-16)
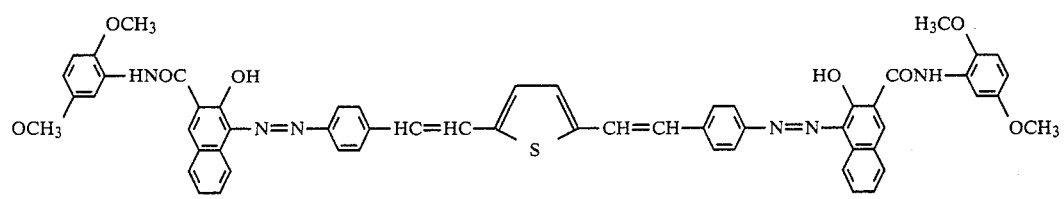
(I-17)
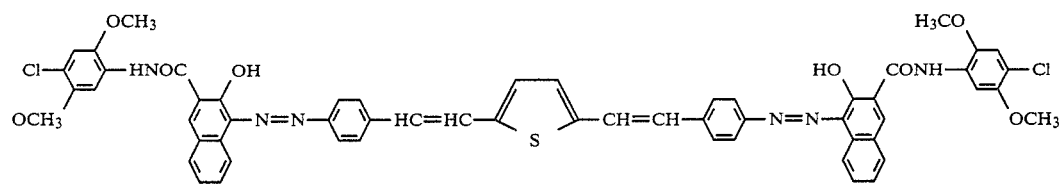
(I-18)
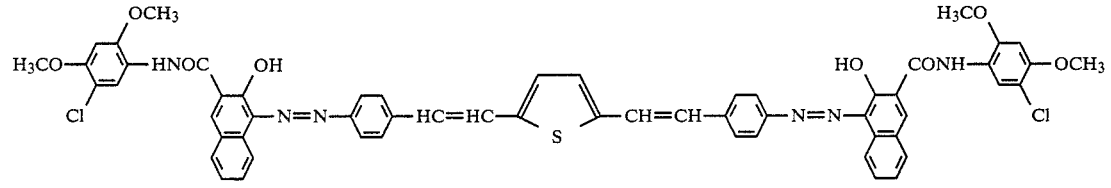
(I-19)
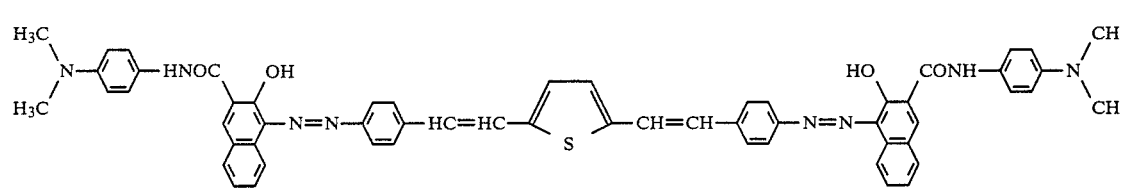
(I-20)

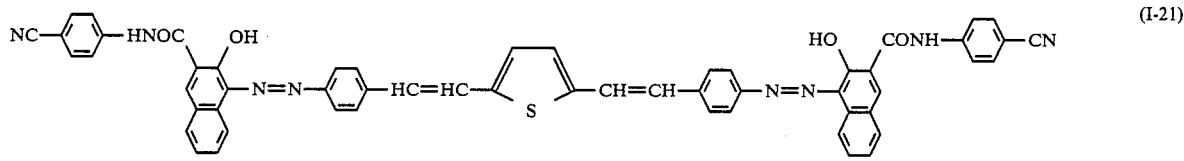
(I-21)
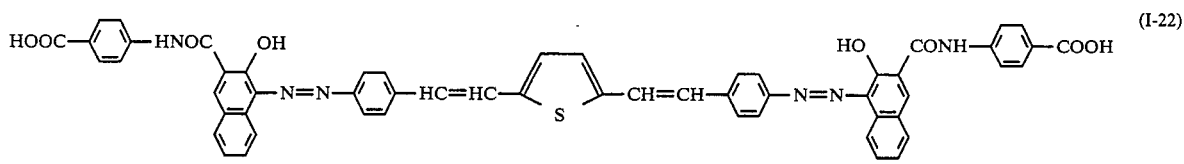
(I-22)
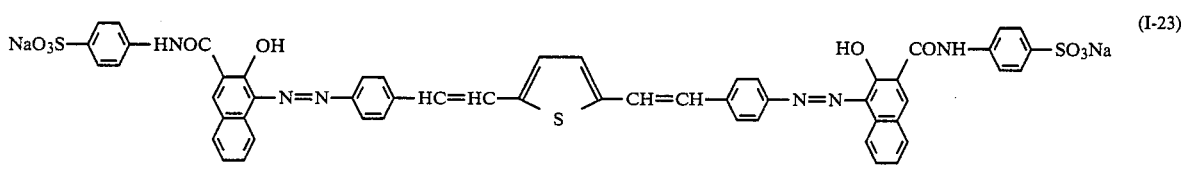
(I-23)
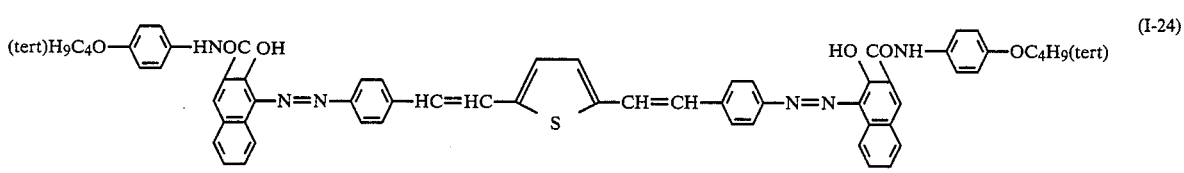
(I-24)
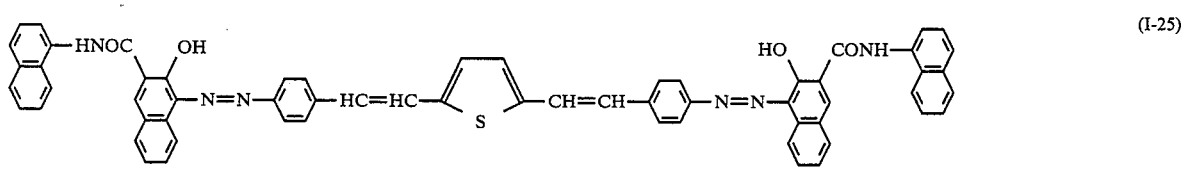
(I-25)
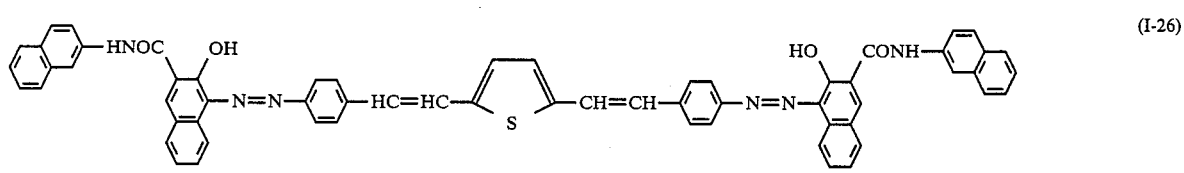
(I-26)
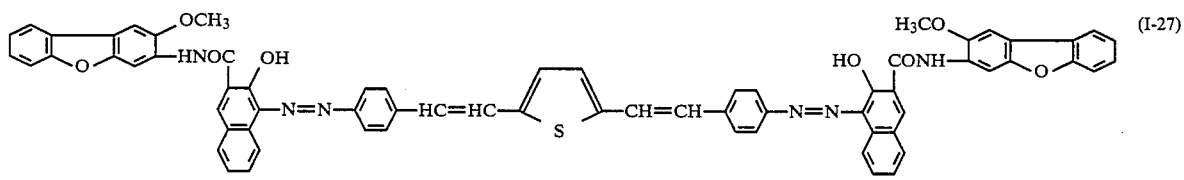
(I-27)
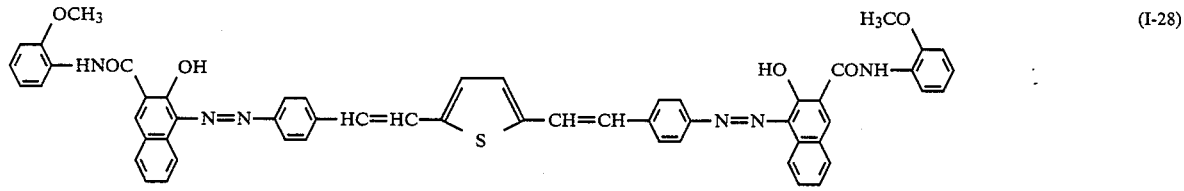
(I-28)

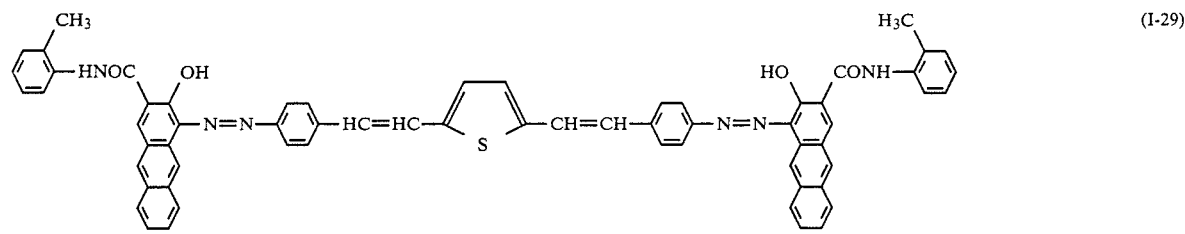
(I-29)
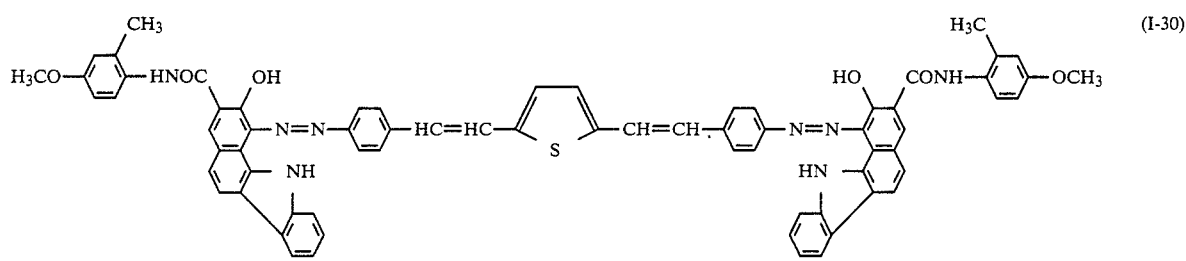
(I-30)
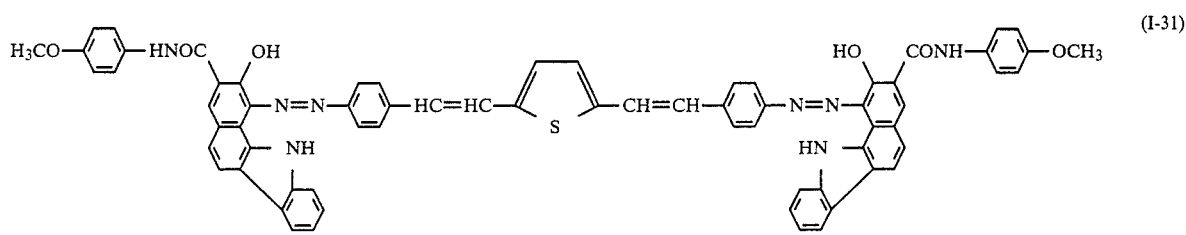
(I-31)
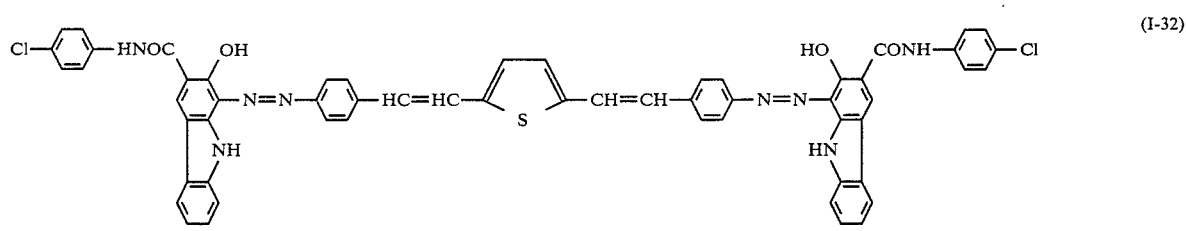
(I-32)
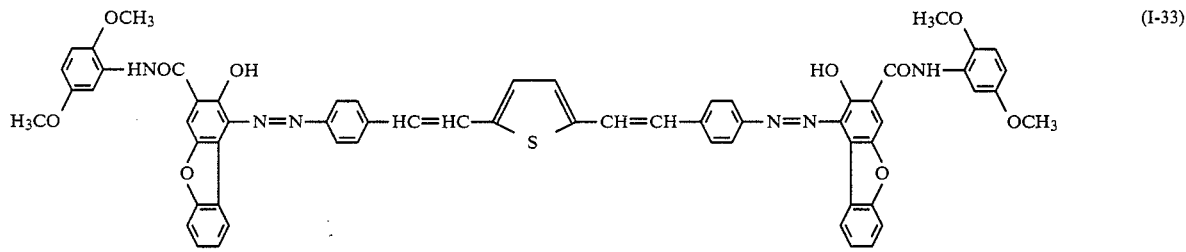
(I-33)

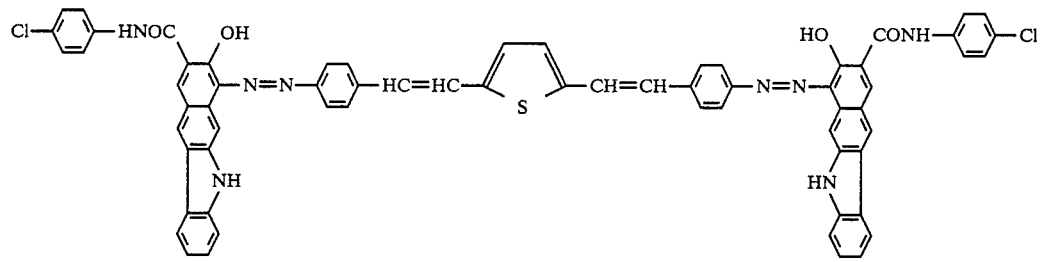
(I-34)
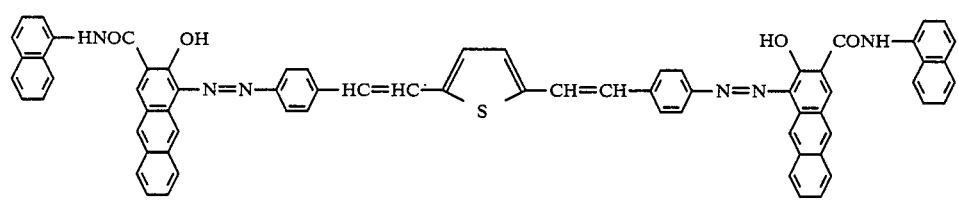
(I-35)
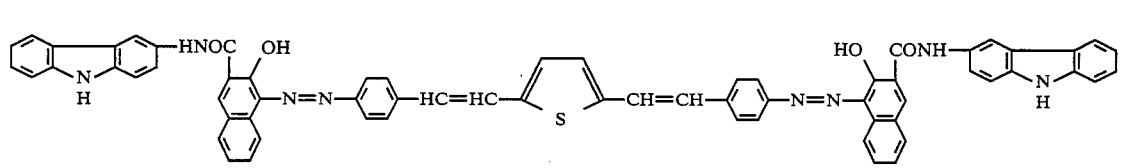
(I-36)
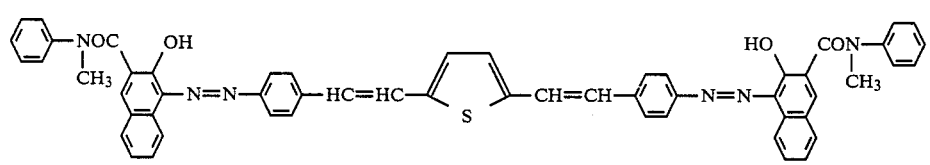
(I-37)
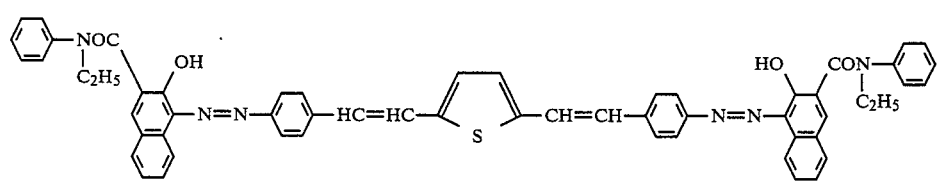
(I-38)
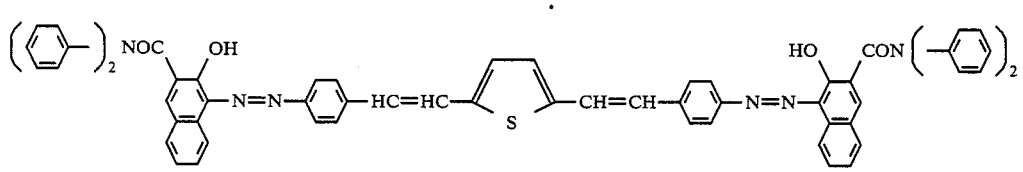
(I-39)
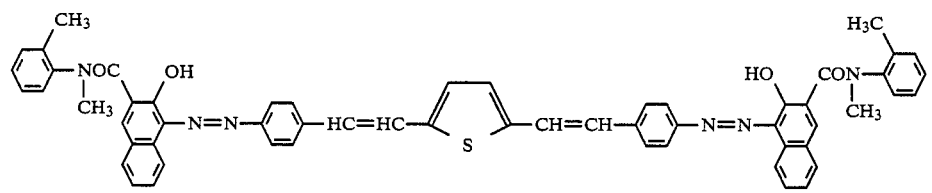
(I-40)

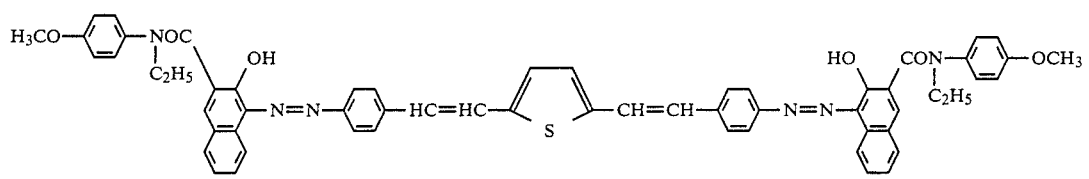 (I-41)
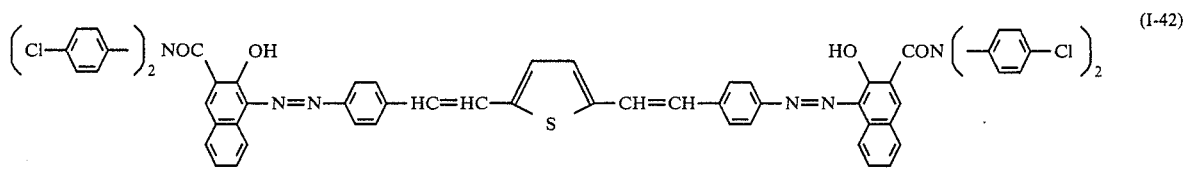 (I-42)
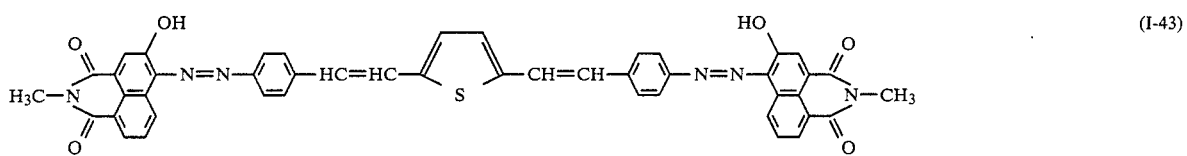 (I-43)
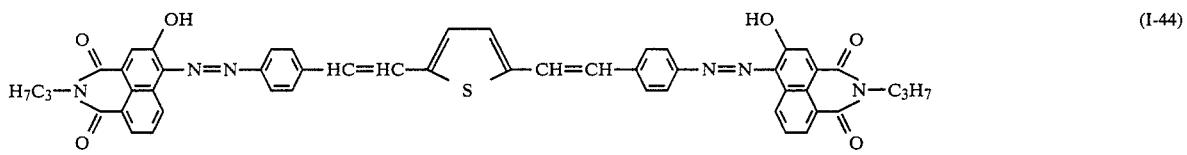 (I-44)
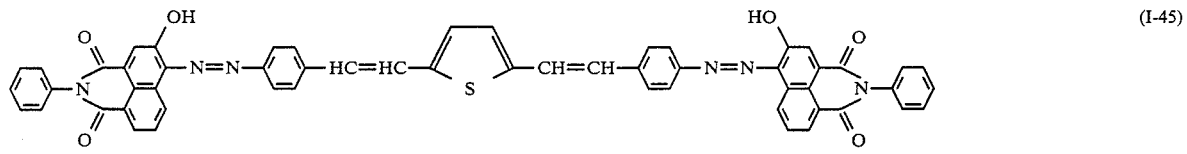 (I-45)
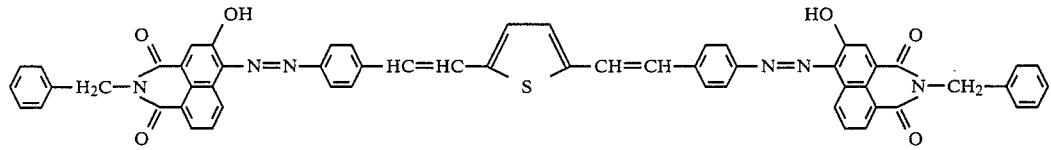 (I-46)
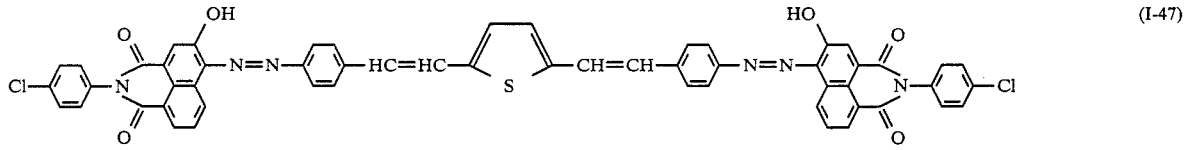 (I-47)
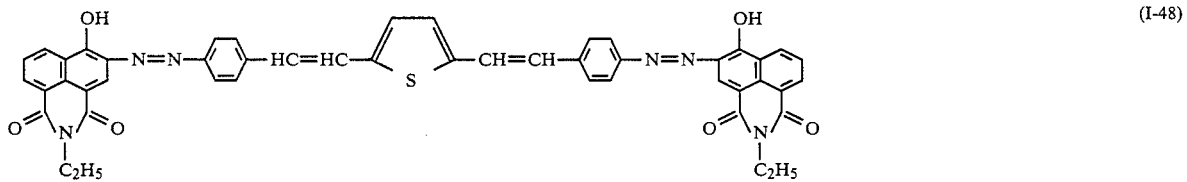 (I-48)

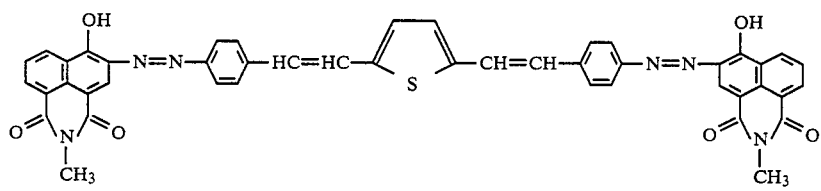
(I-49)
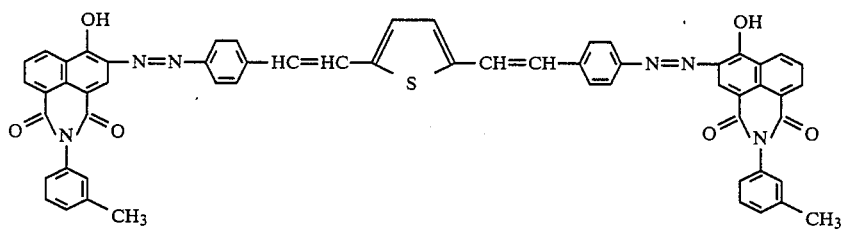
(I-50)
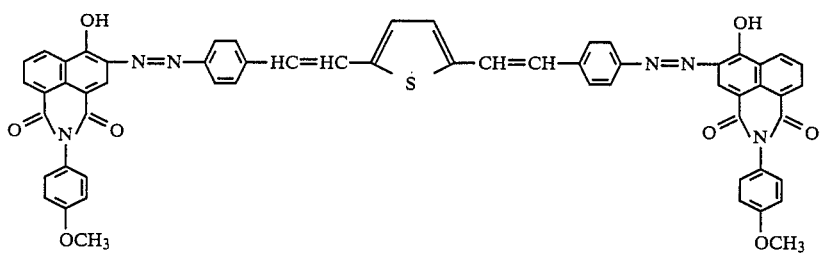
(I-51)
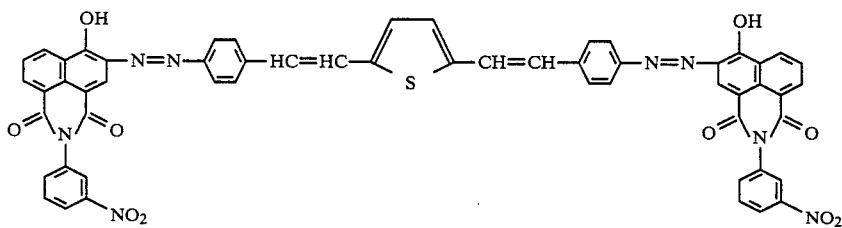
(I-52)
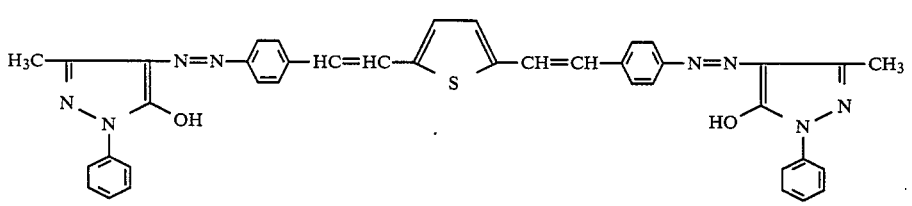
(I-53)
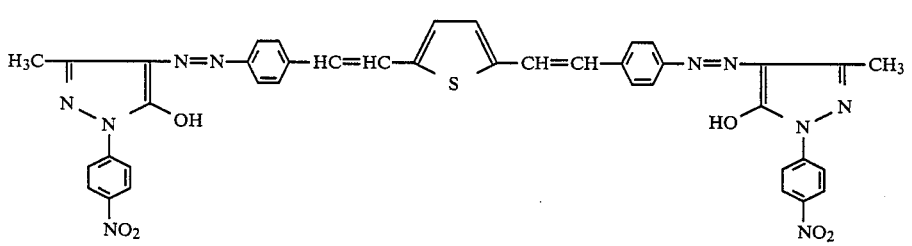
(I-54)

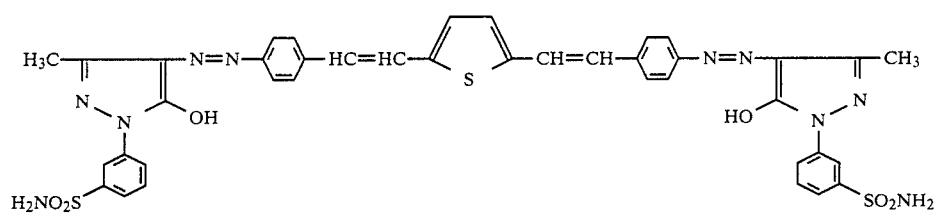 (I-55)
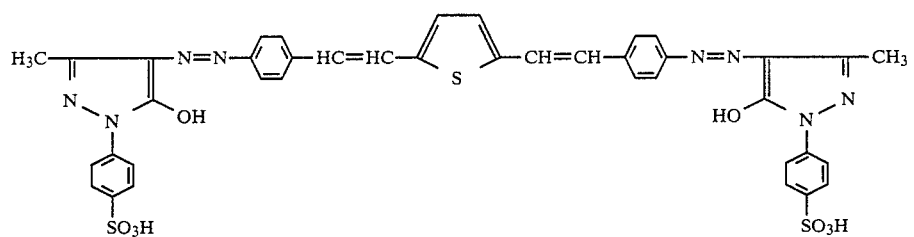 (I-56)
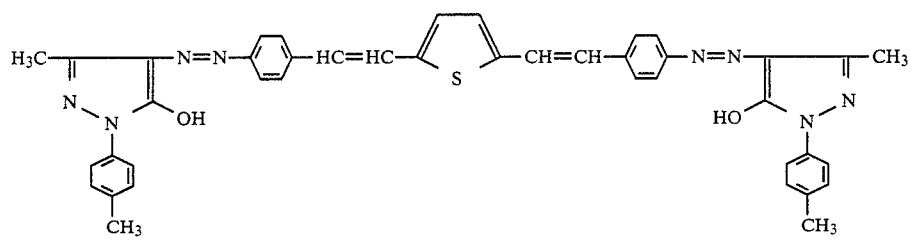 (I-57)
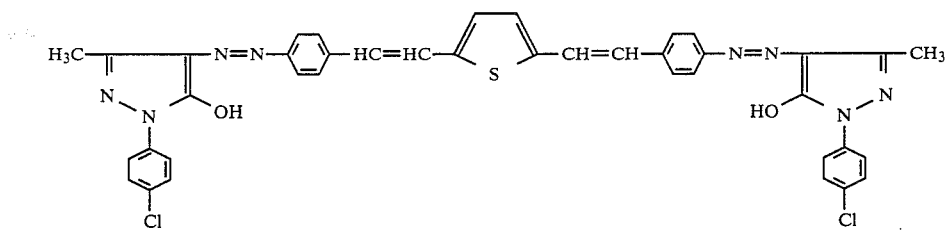 (I-58)
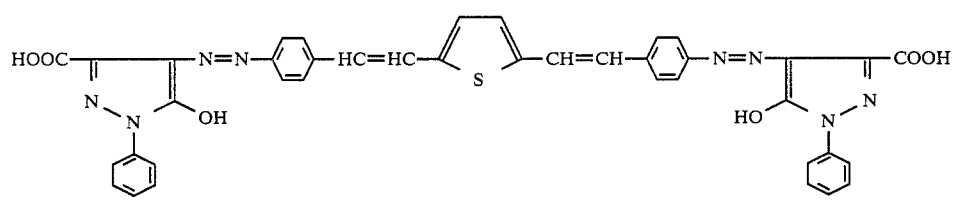 (I-59)
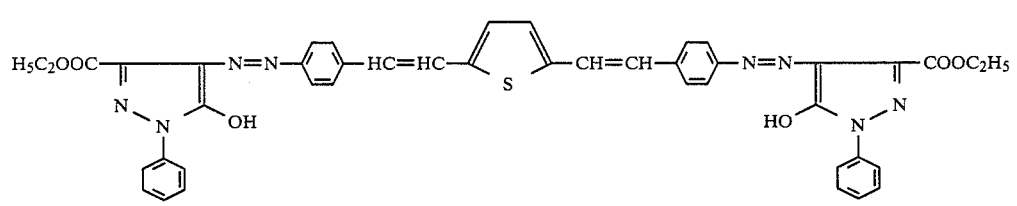 (I-60)

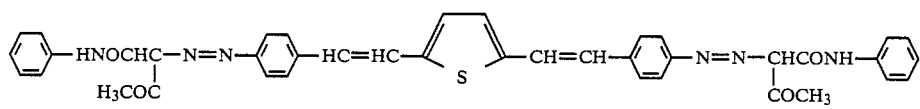
(I-61)
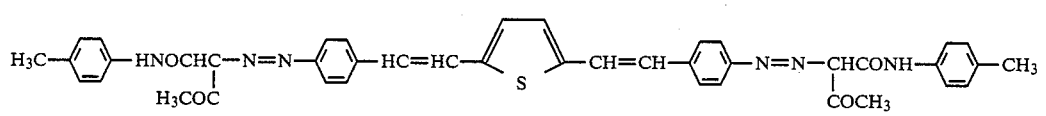
(I-62)
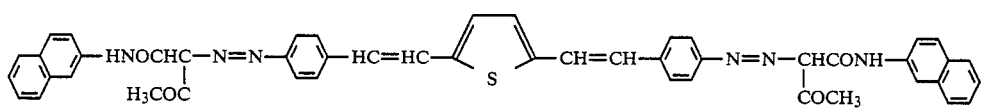
(I-63)
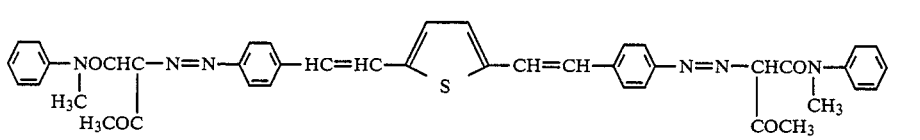
(I-64)
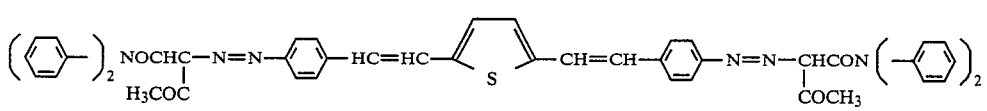
(I-65)
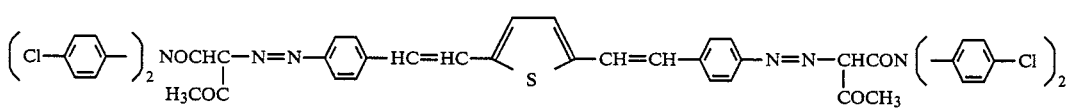
(I-66)
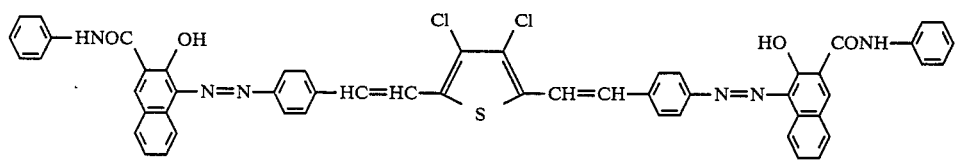
(II-1)
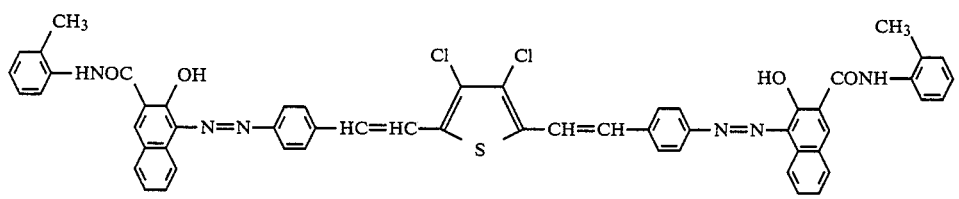
(II-2)
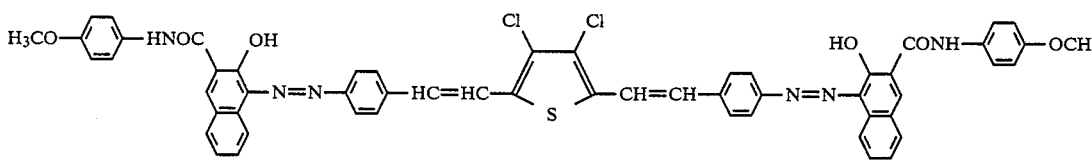
(II-3)

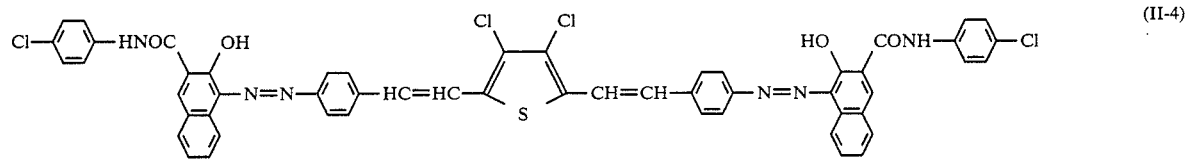
(II-4)
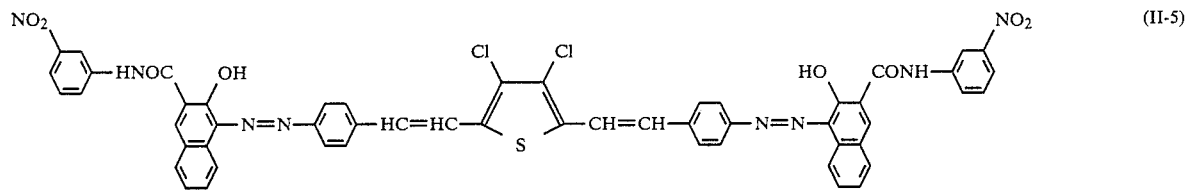
(II-5)
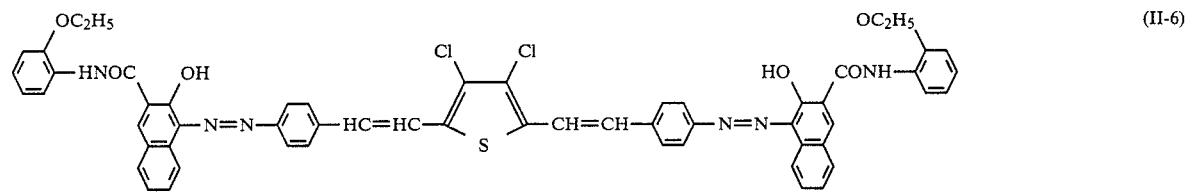
(II-6)
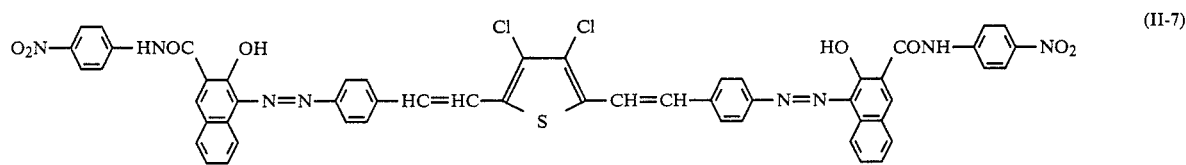
(II-7)
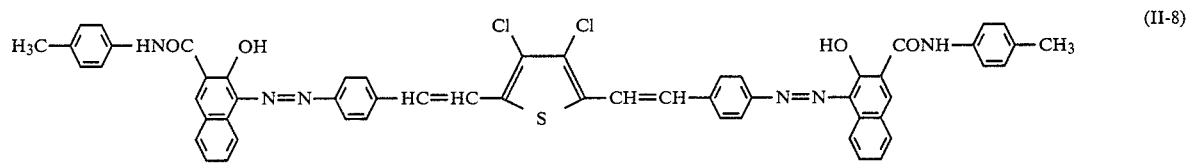
(II-8)
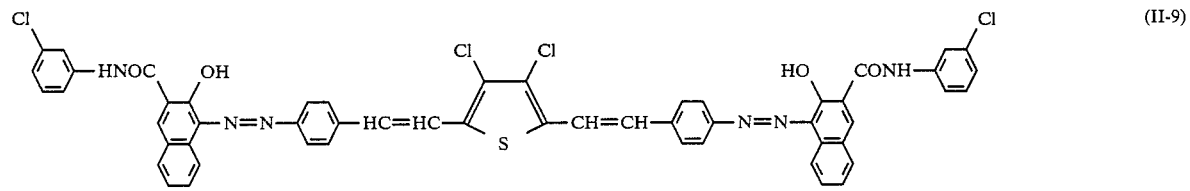
(II-9)
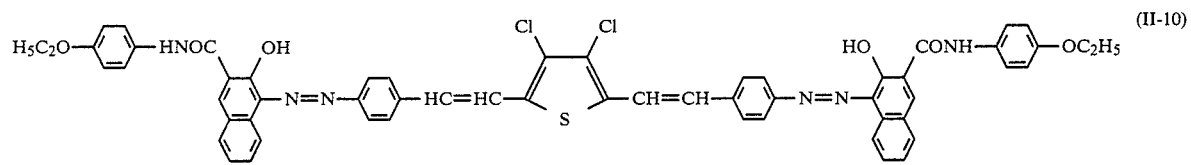
(II-10)

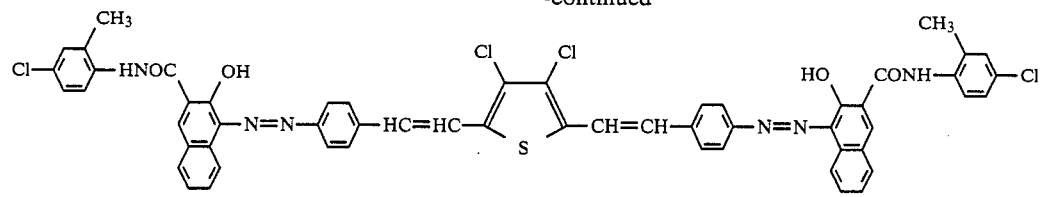
(II-11)
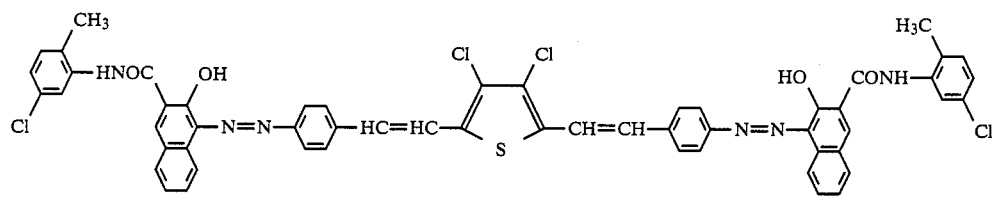
(II-12)
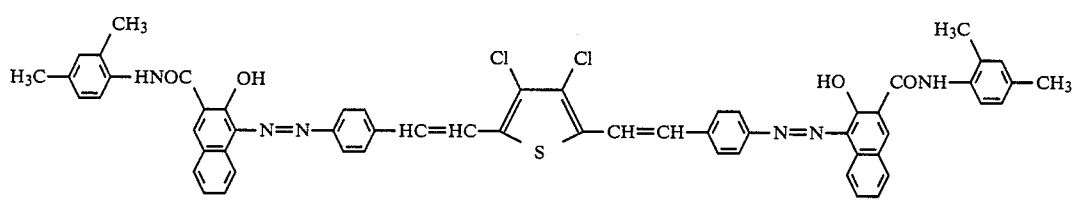
(II-13)
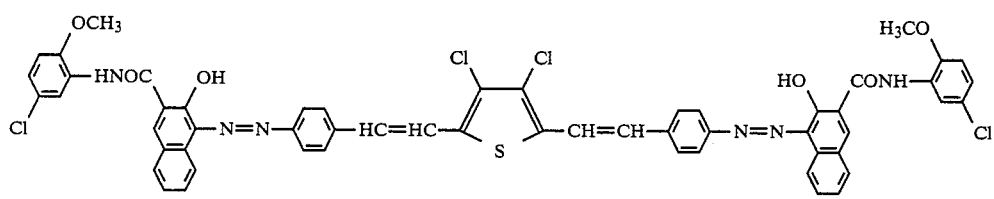
(II-14)
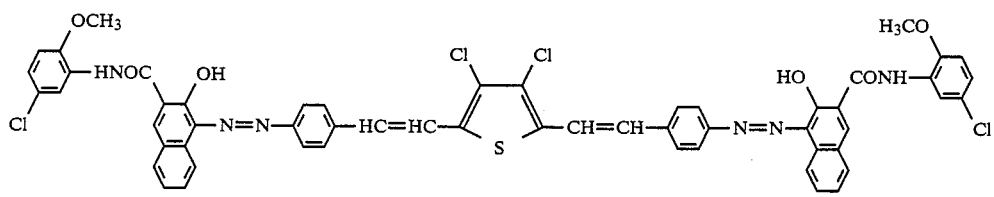
(II-15)
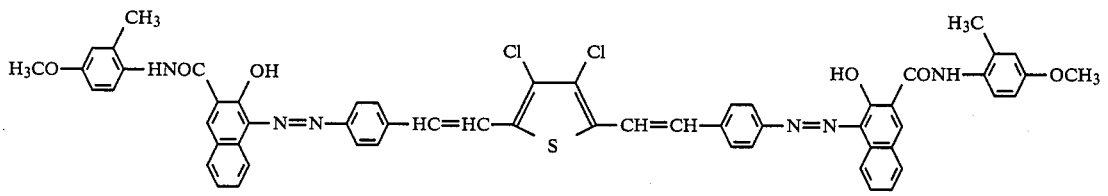
(II-16)
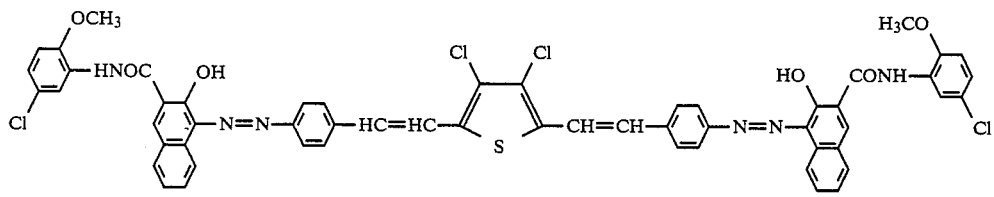
(II-17)

-continued
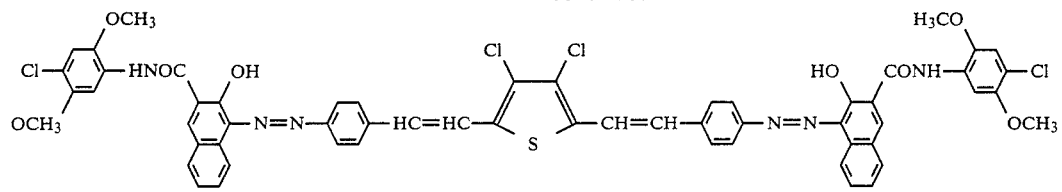
(II-18)
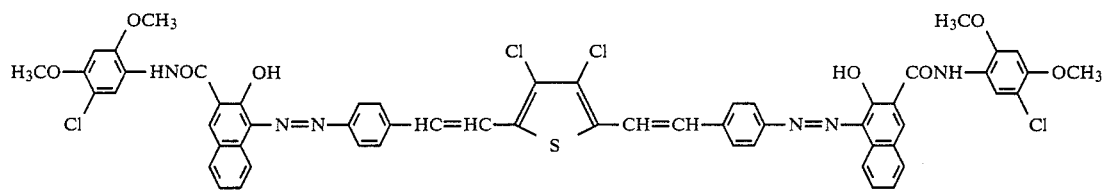
(II-19)
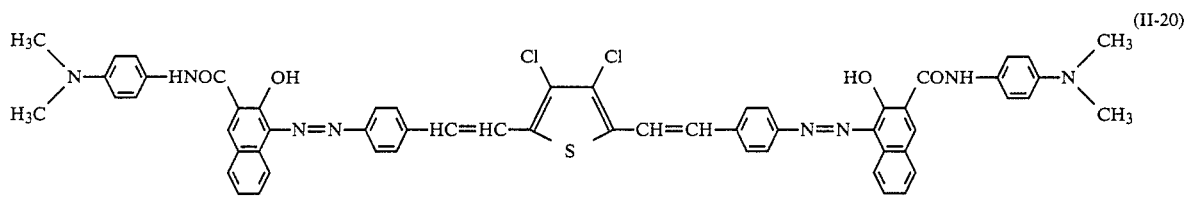
(II-20)
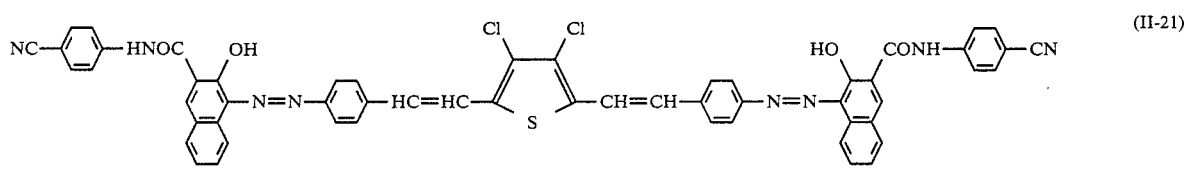
(II-21)
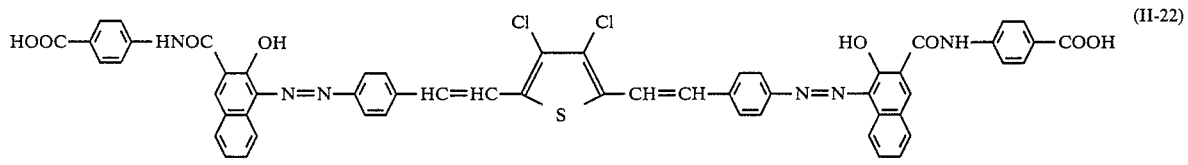
(II-22)
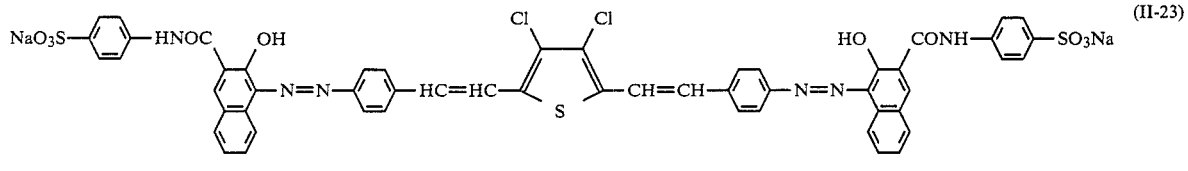
(II-23)
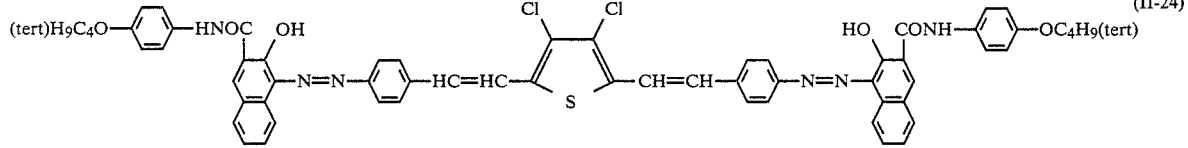
(II-24)

-continued
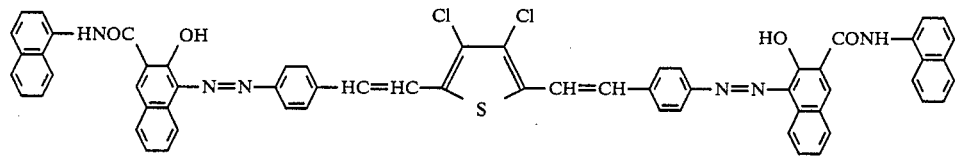
(II-25)
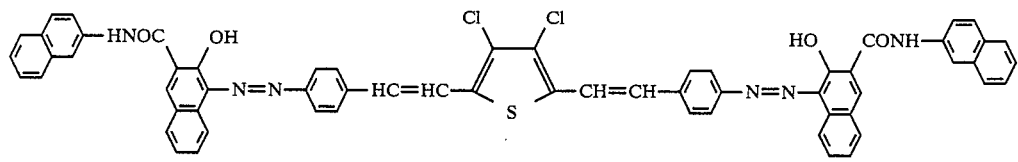
(II-26)
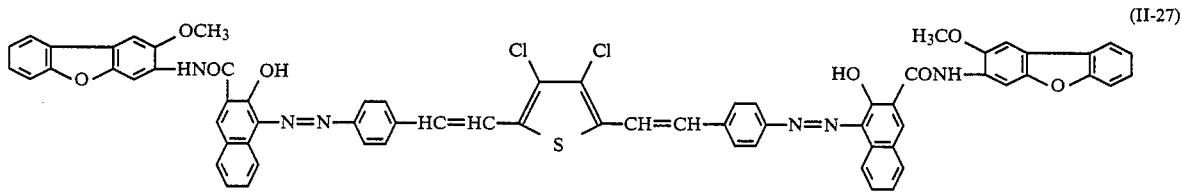
(II-27)
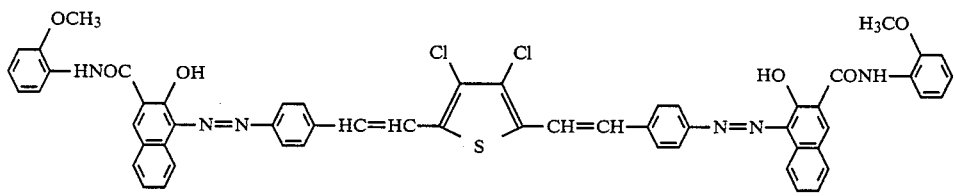
(II-28)
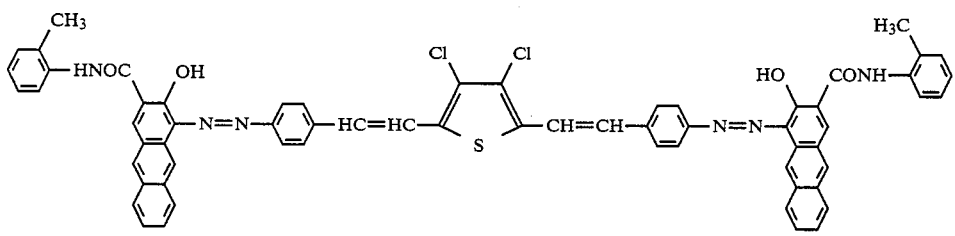
(II-29)
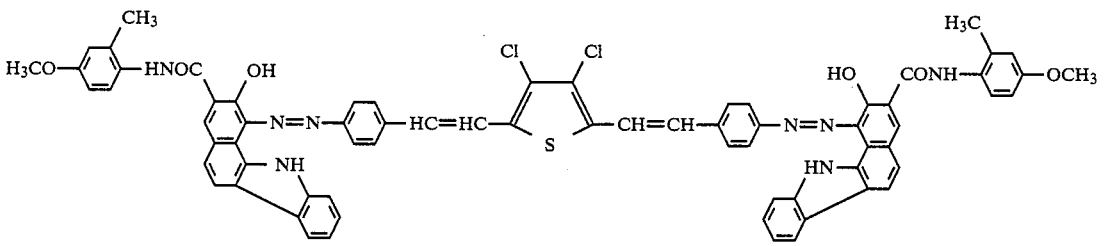
(II-30)
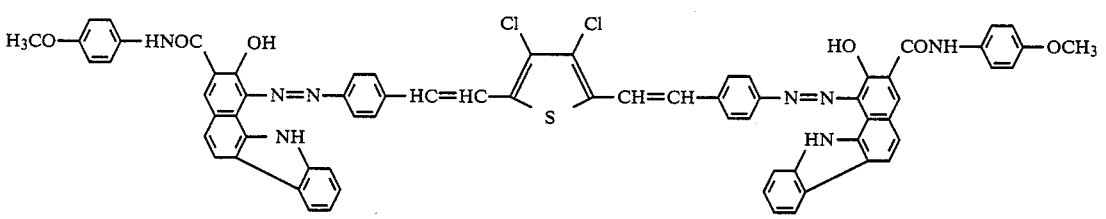
(II-31)

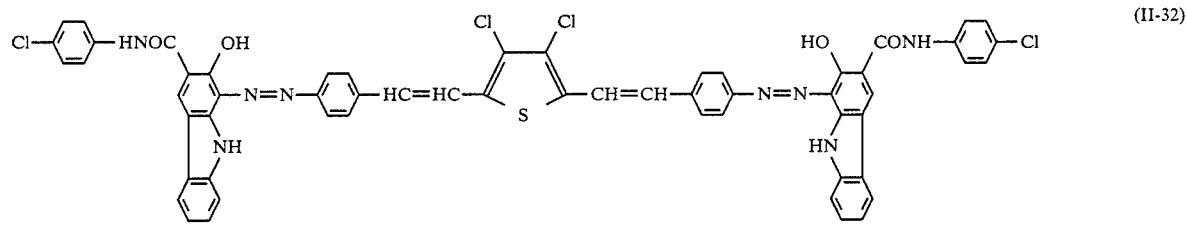
(II-32)
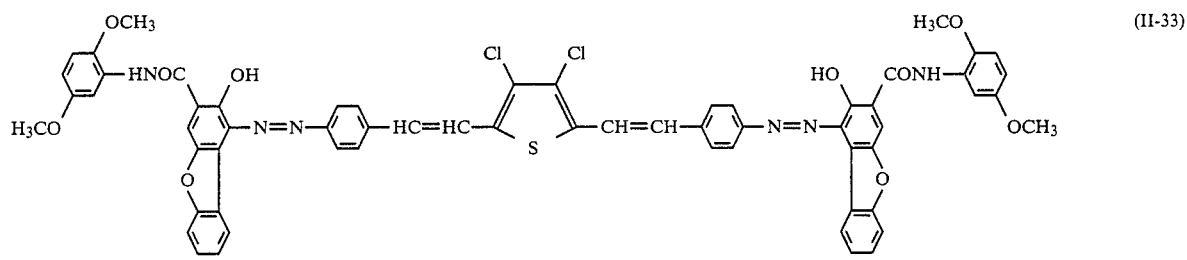
(II-33)
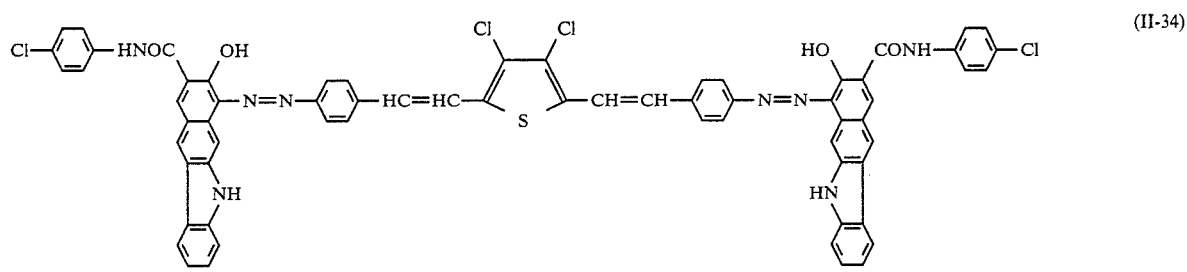
(II-34)
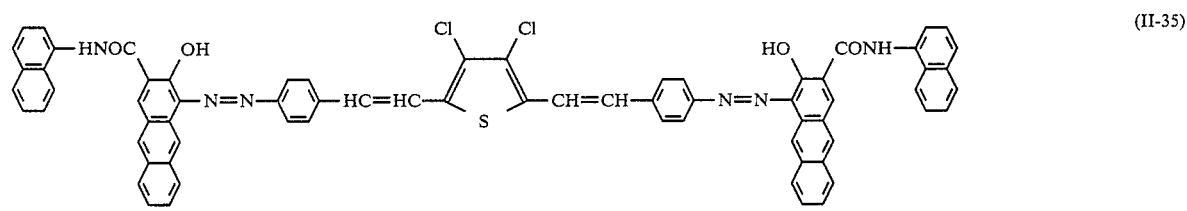
(II-35)
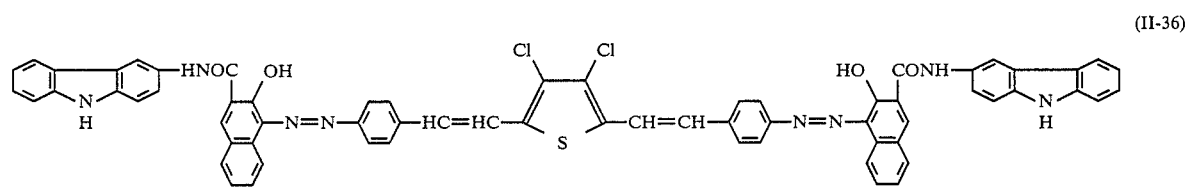
(II-36)
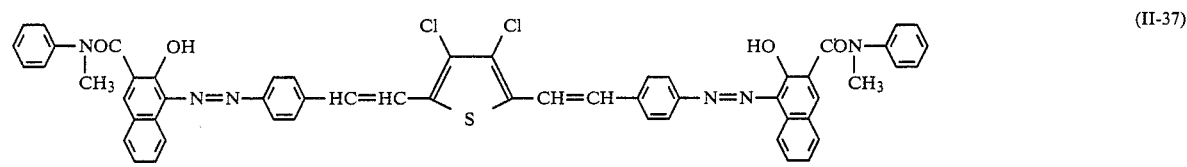
(II-37)

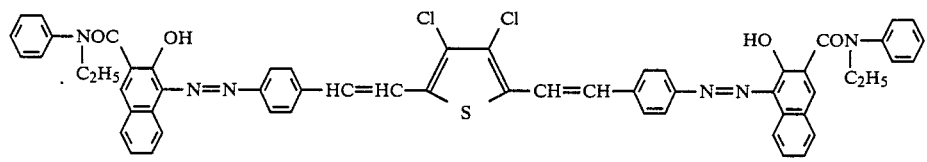
(II-38)
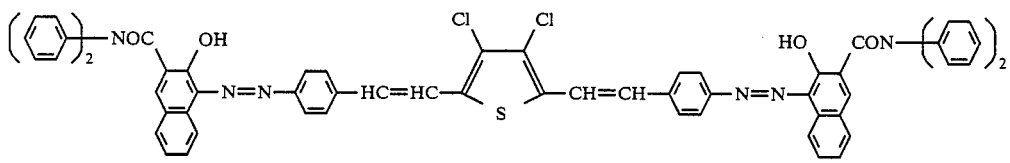
(II-39)
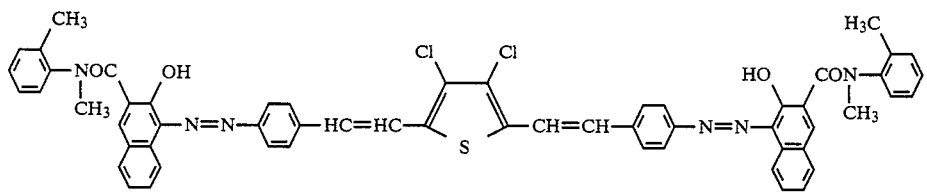
(II-40)
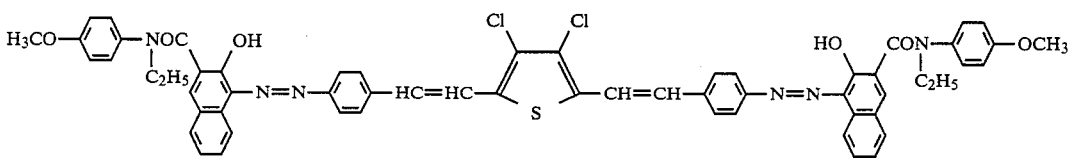
(II-41)
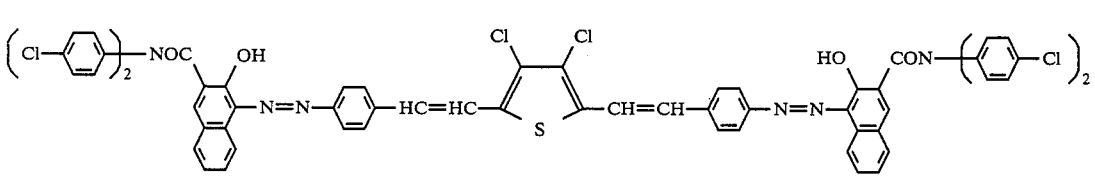
(II-42)
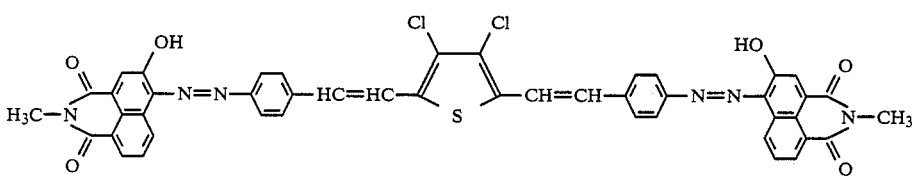
(II-43)
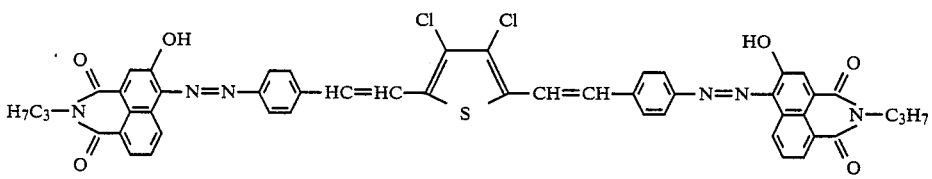
(II-44)

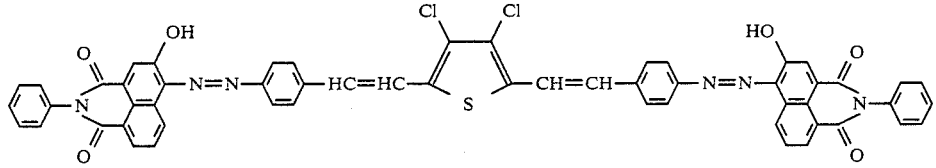
(II-45)
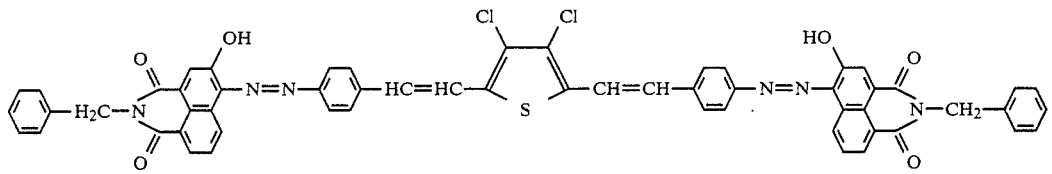
(II-46)
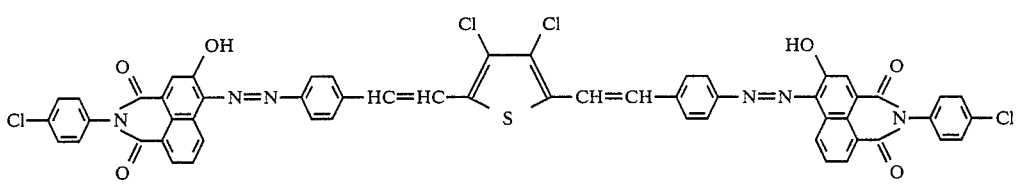
(II-47)
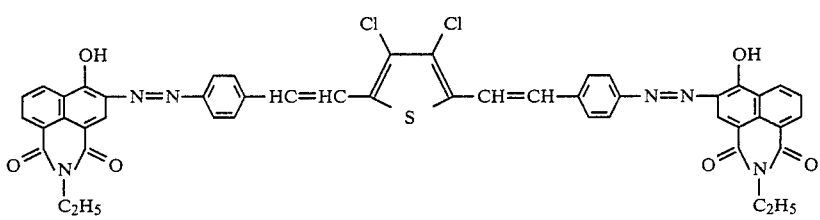
(II-48)
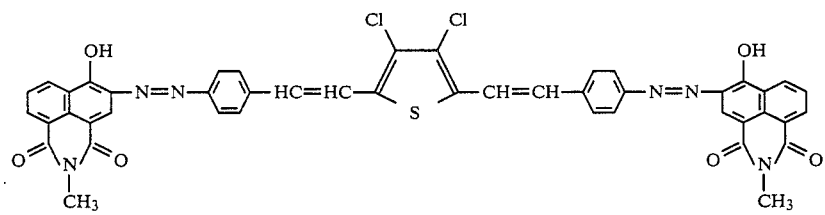
(II-49)
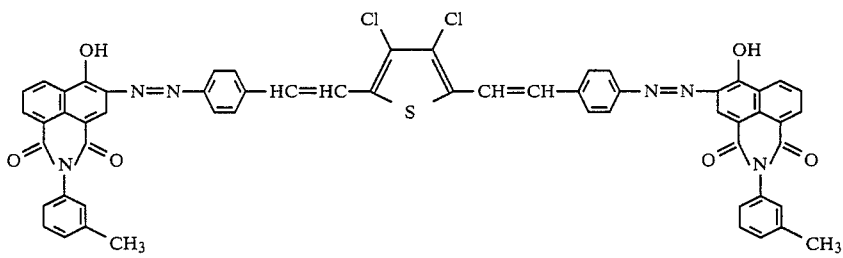
(II-50)

-continued
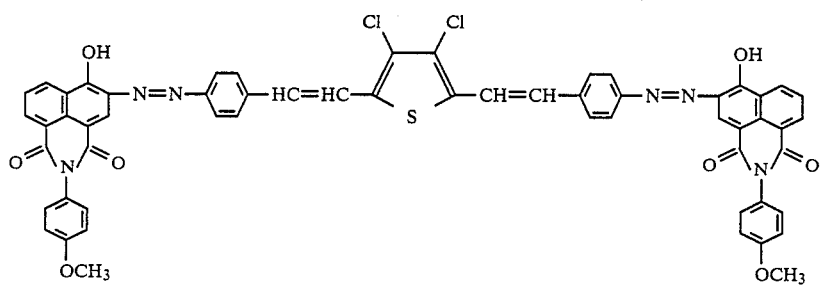
(II-51)
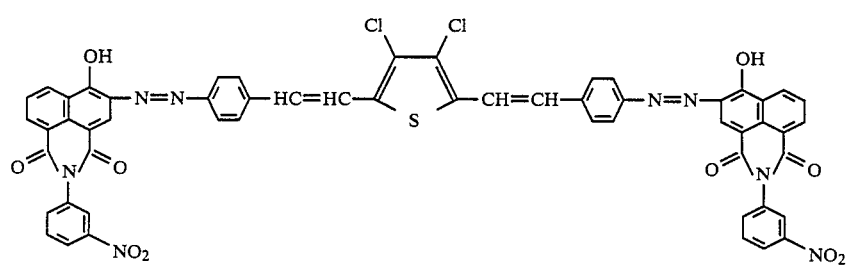
(II-52)
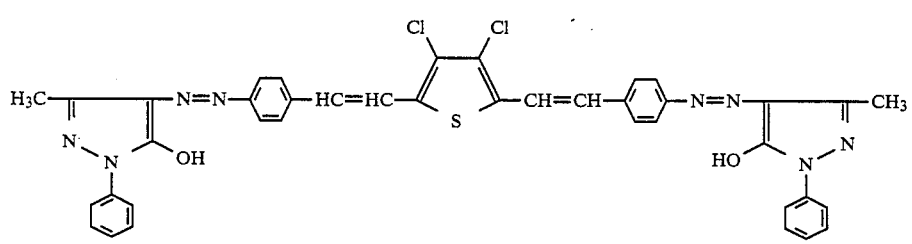
(II-53)
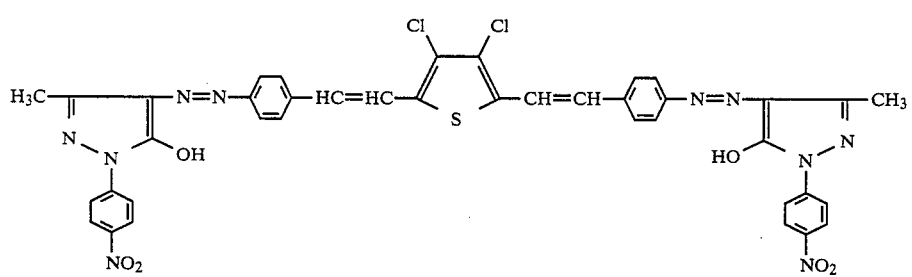
(II-54)
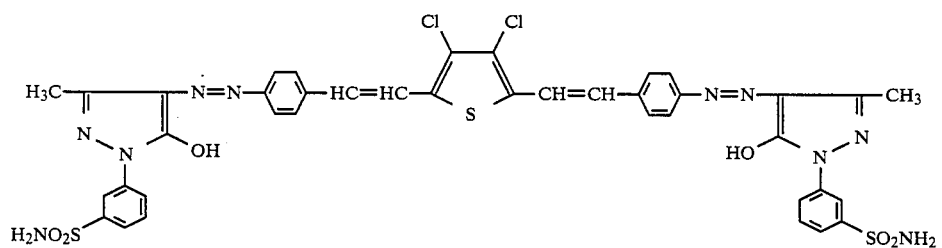
(II-55)

-continued
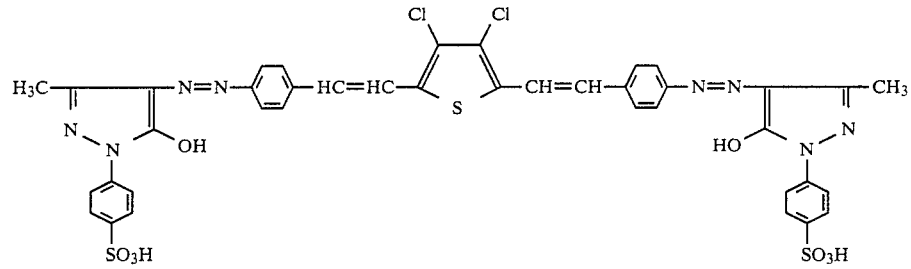 (II-56)
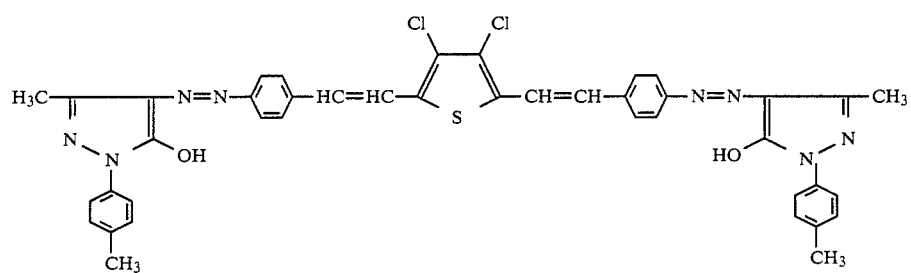 (II-57)
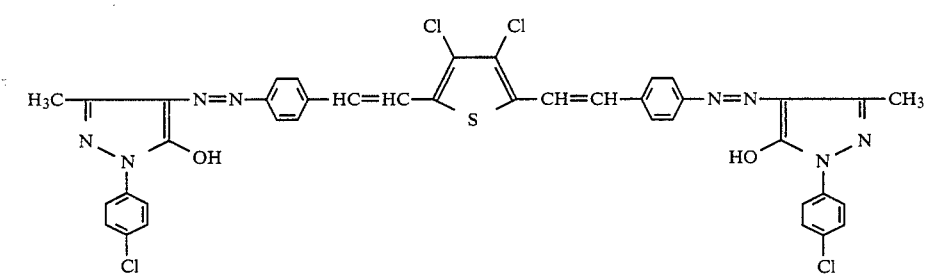 (II-58)
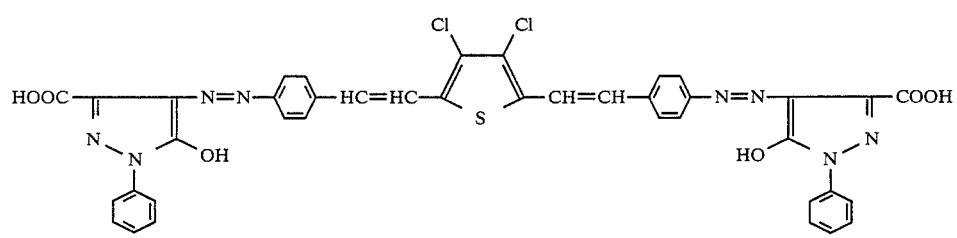 (II-59)
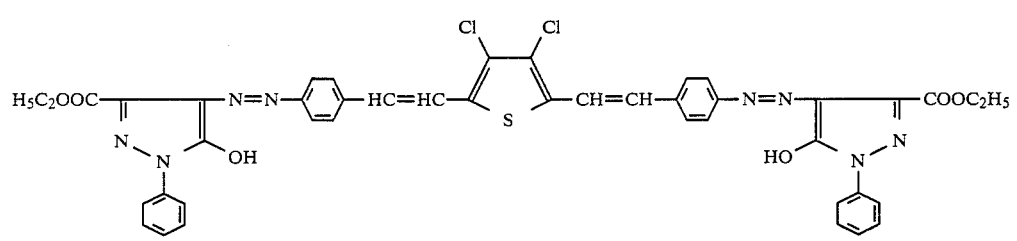 (II-60)
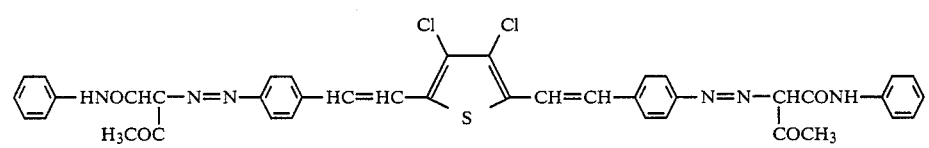 (II-61)

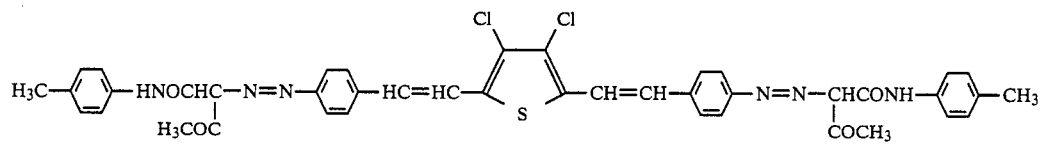
(II-62)
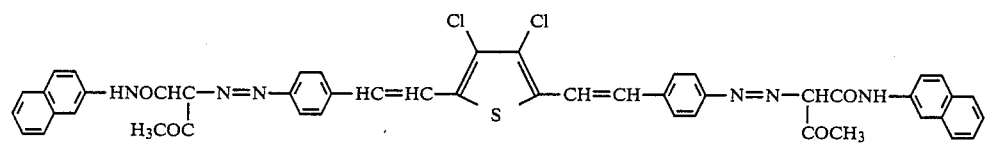
(II-63)
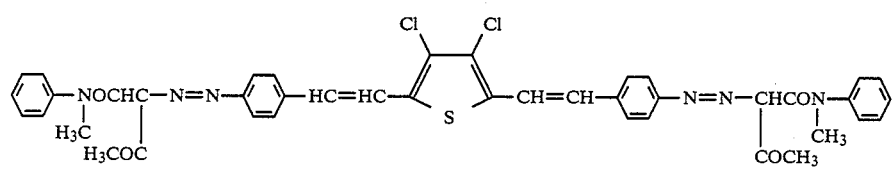
(II-64)
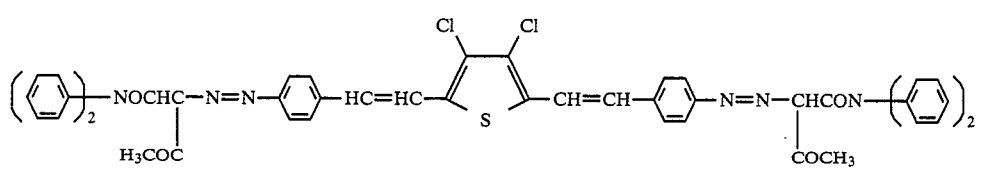
(II-65)
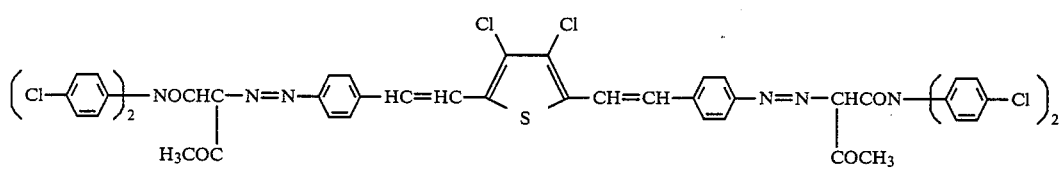
(II-66)
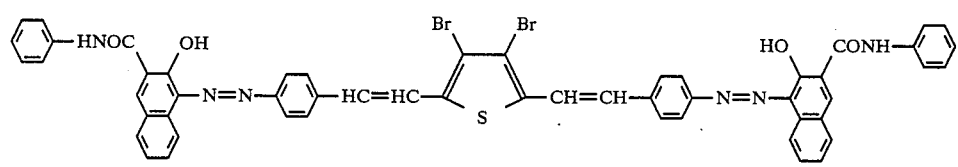
(III-1)
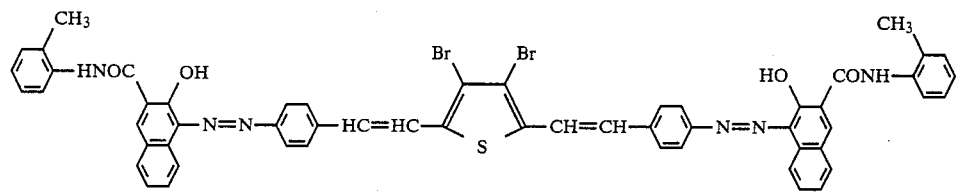
(III-2)
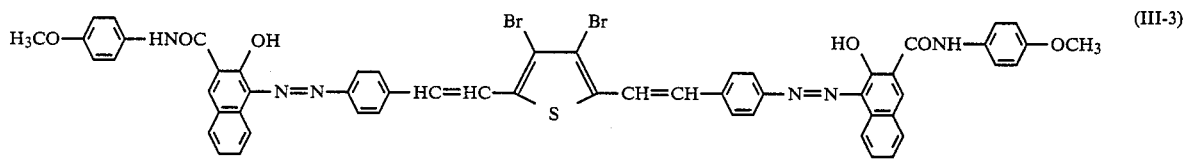
(III-3)

-continued
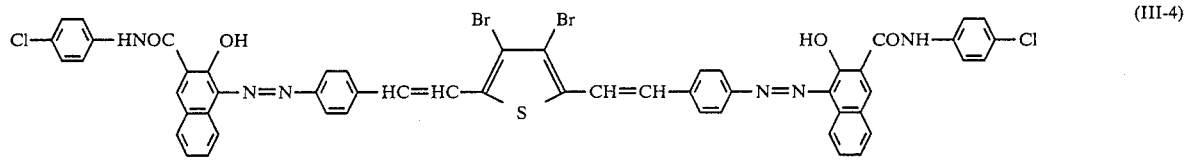
(III-4)
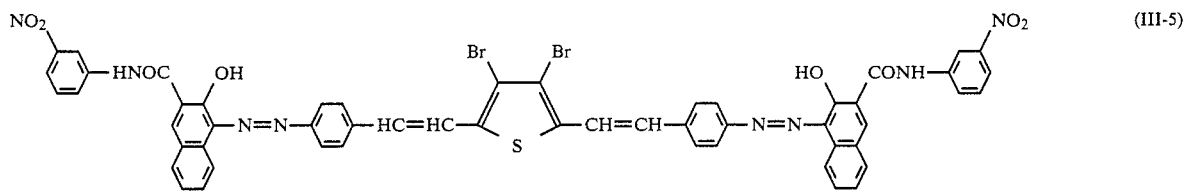
(III-5)
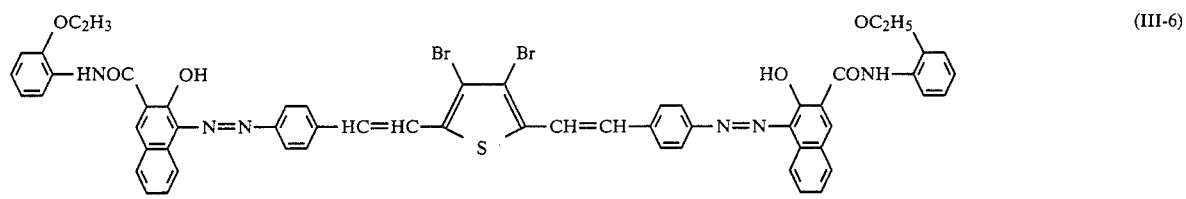
(III-6)
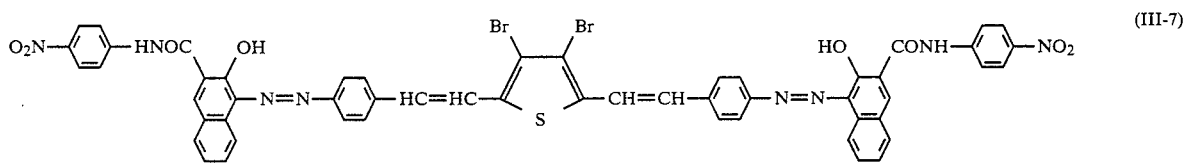
(III-7)
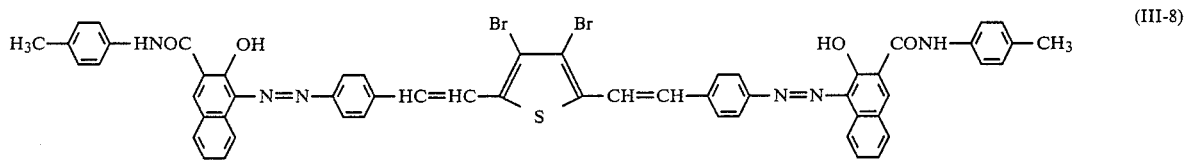
(III-8)
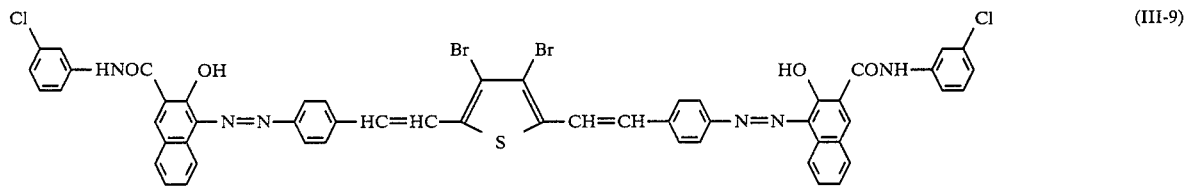
(III-9)
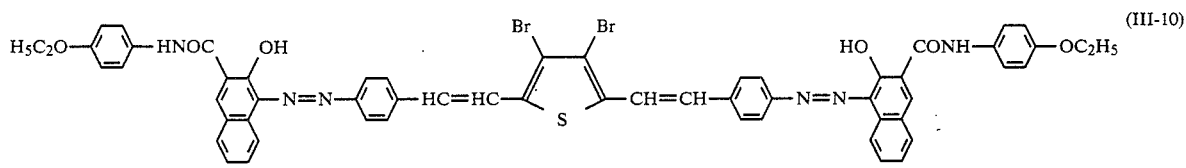
(III-10)

-continued
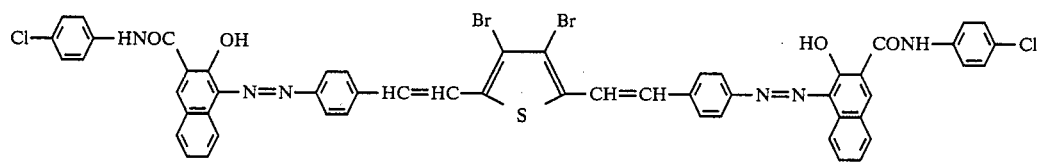
(III-11)
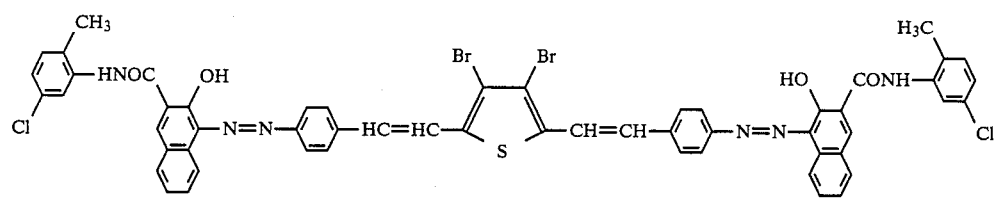
(III-12)
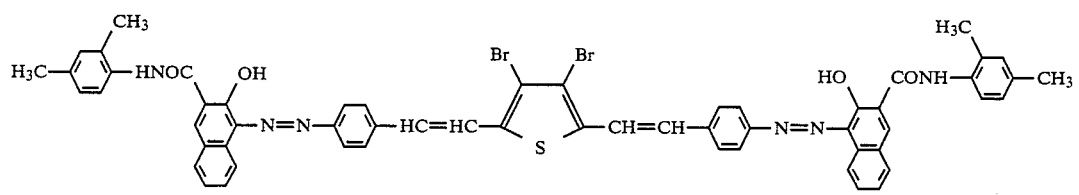
(III-13)
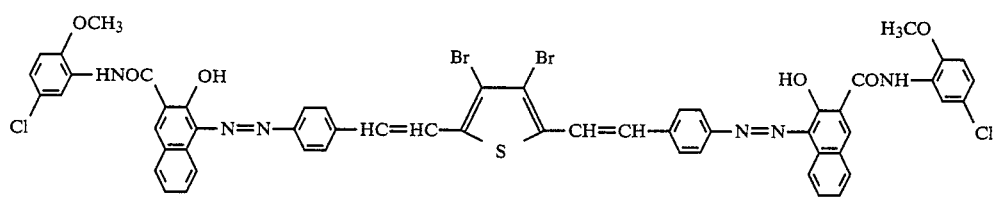
(III-14)
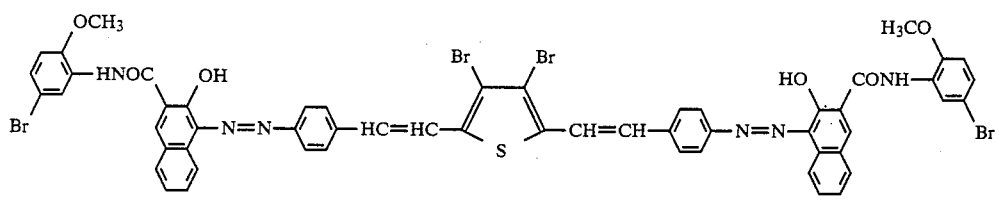
(III-15)
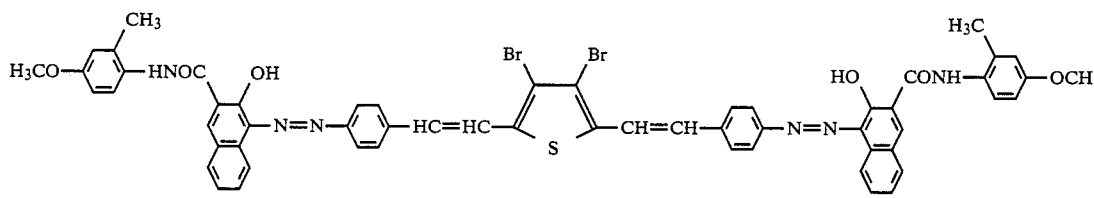
(III-16)
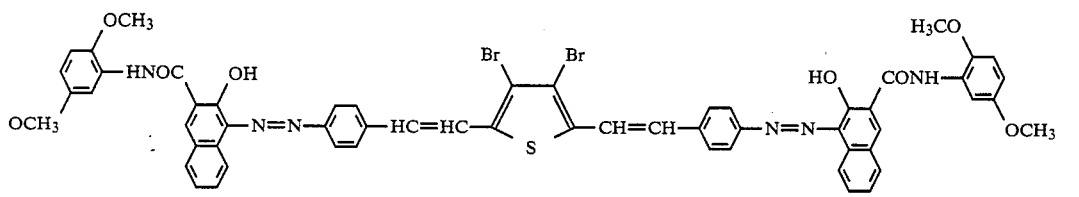
(III-17)

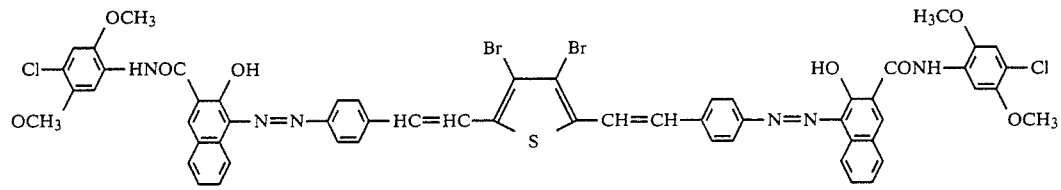
(III-18)
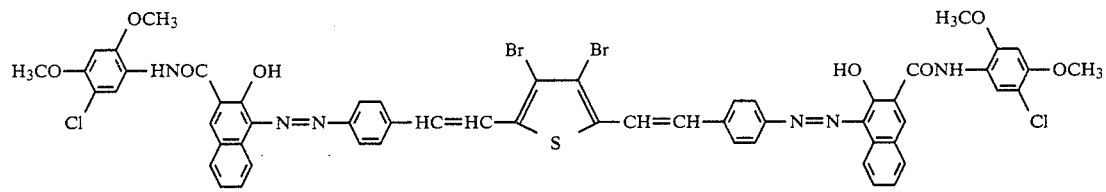
(III-19)
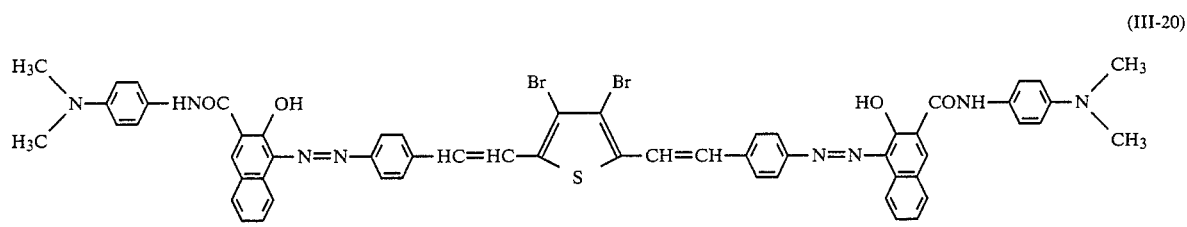
(III-20)
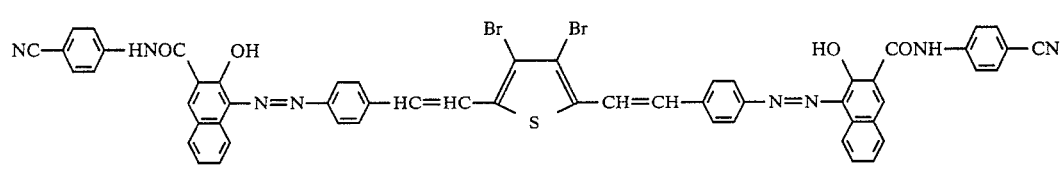
(III-21)
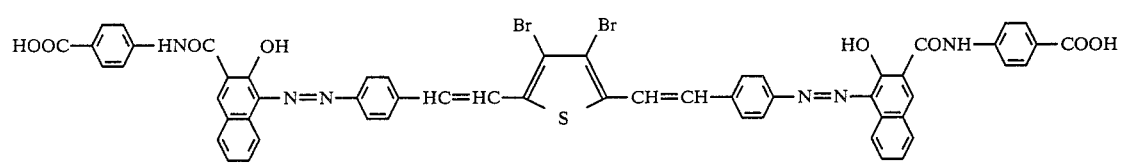
(III-22)
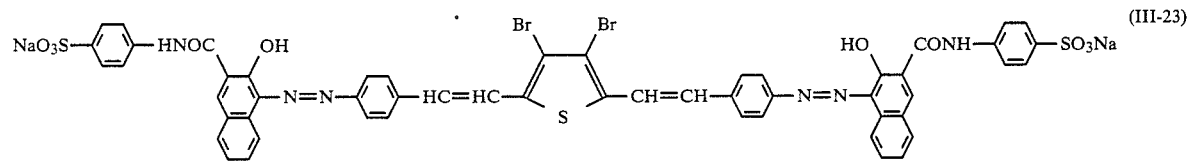
(III-23)
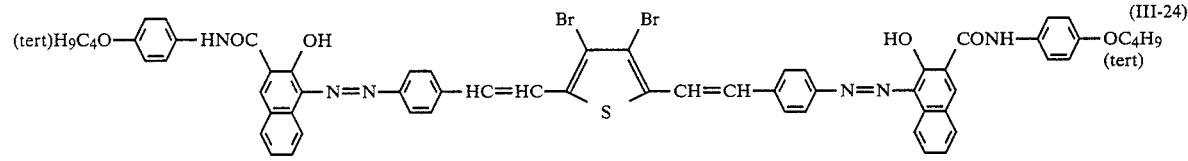
(III-24)

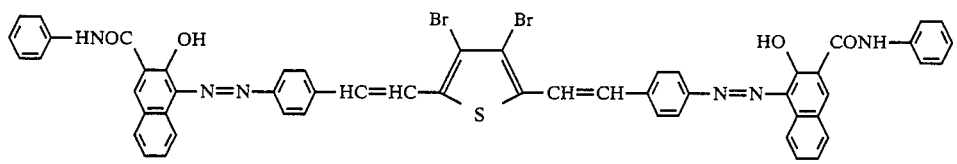
(III-25)
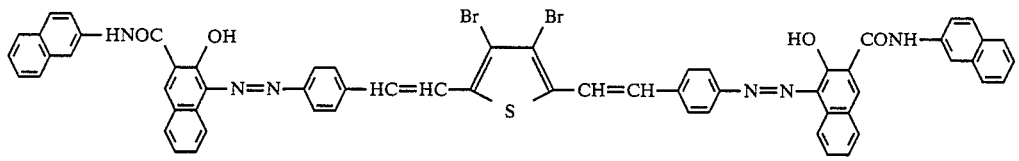
(III-26)
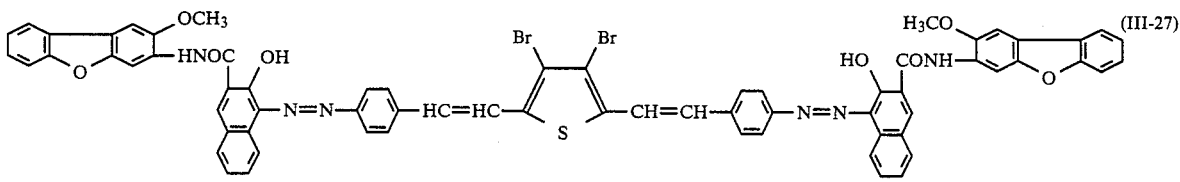
(III-27)
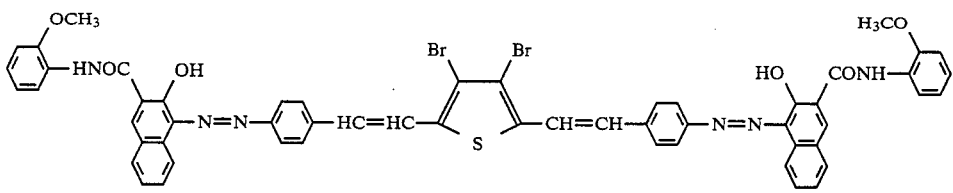
(III-28)
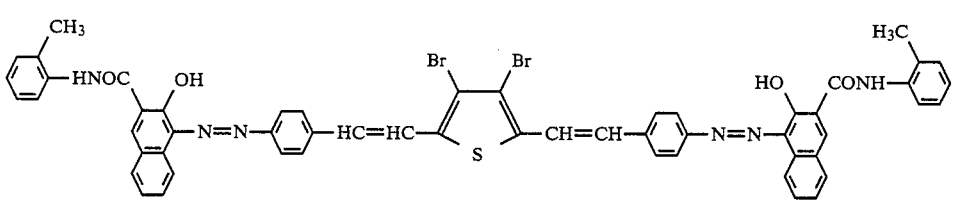
(III-29)
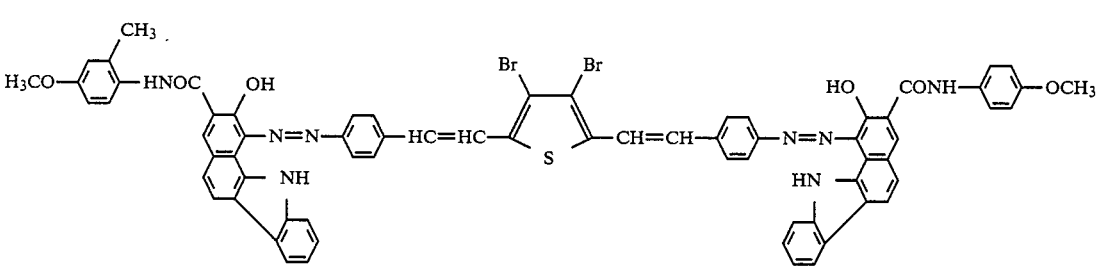
(III-30)
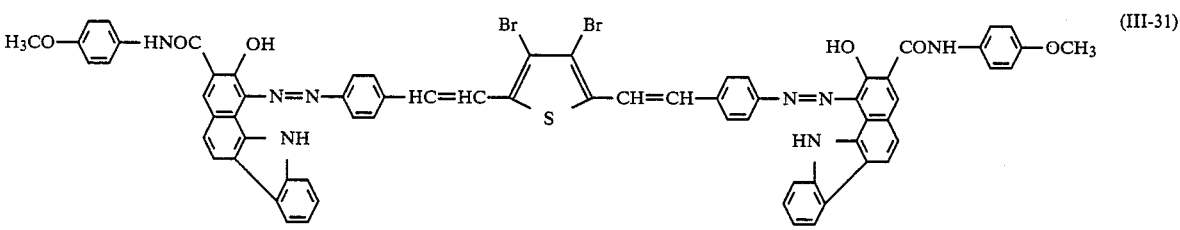
(III-31)

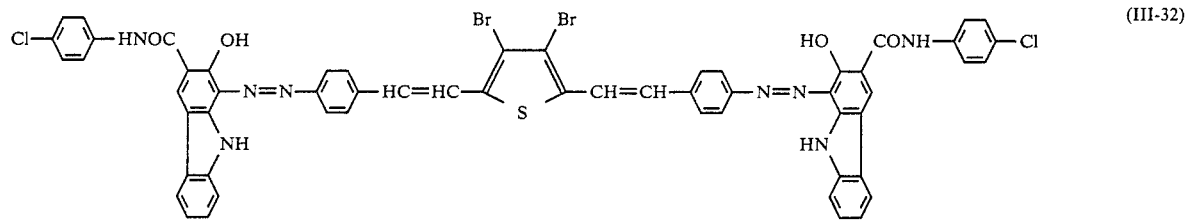
(III-32)
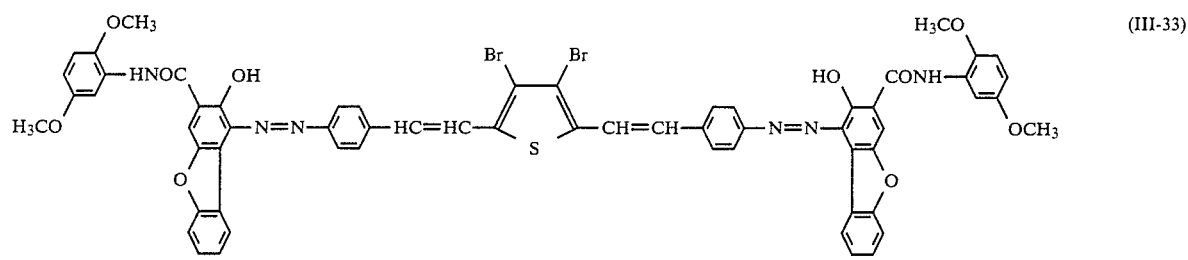
(III-33)
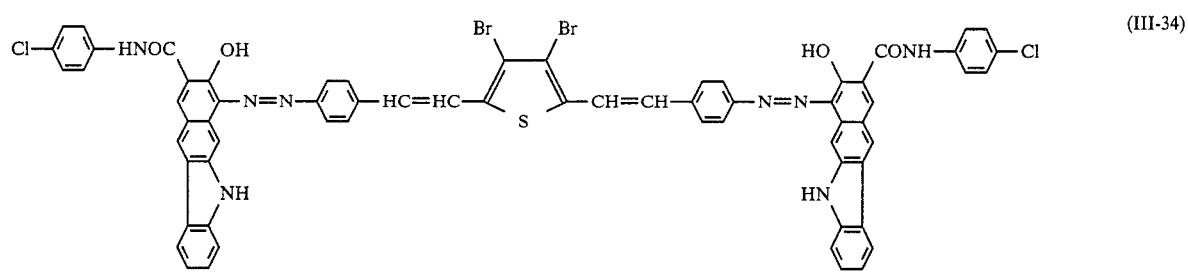
(III-34)
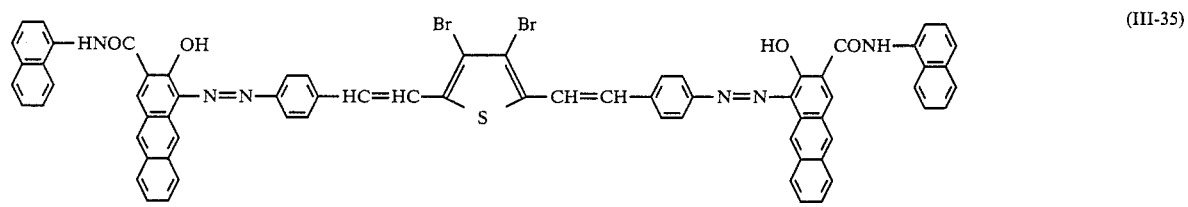
(III-35)
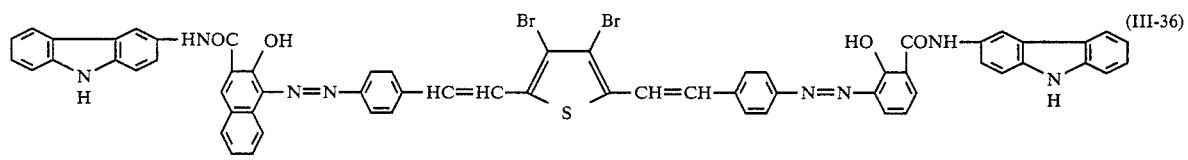
(III-36)
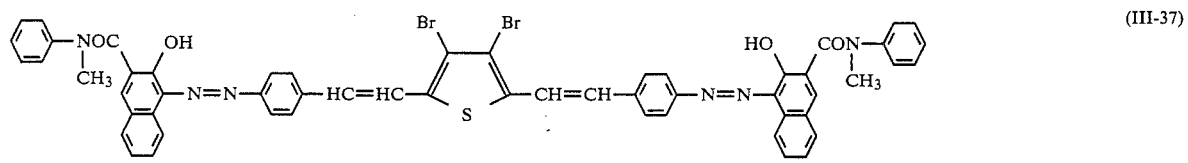
(III-37)

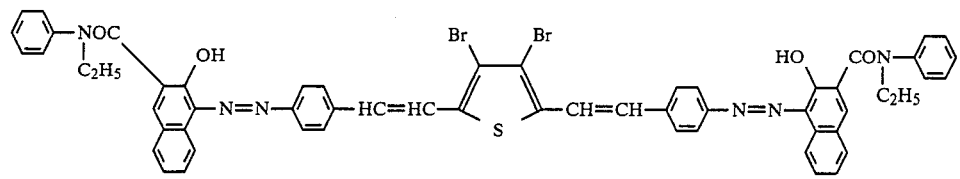
(III-38)
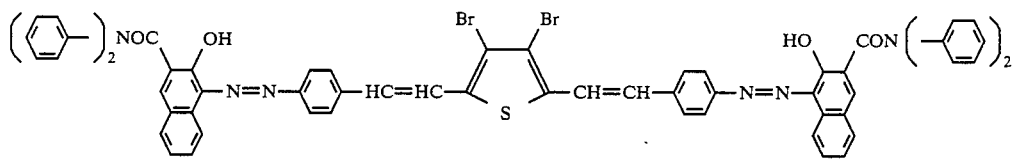
(III-39)
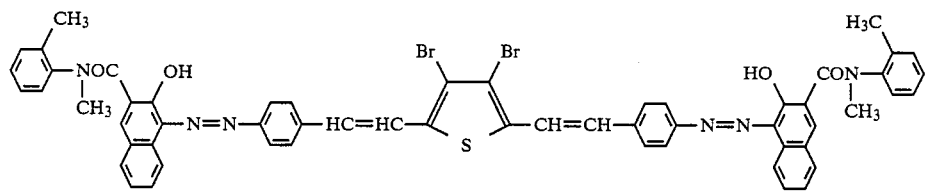
(III-40)
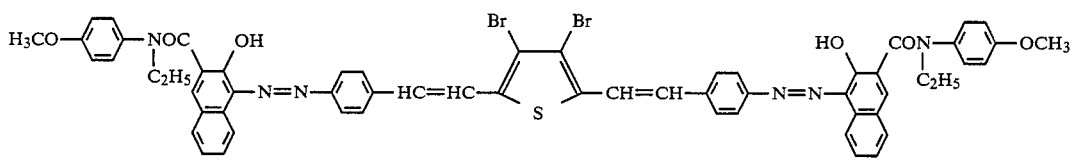
(III-41)
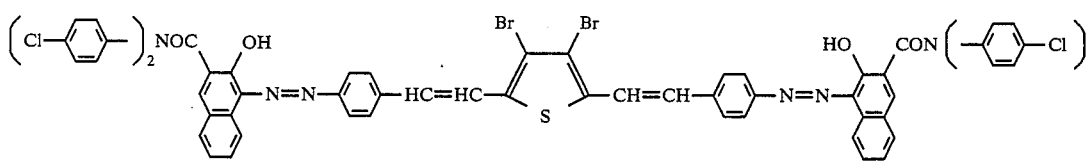
(III-42)
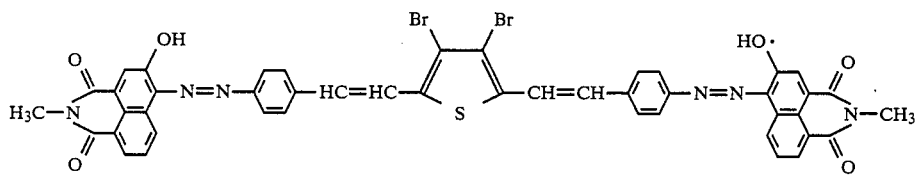
(III-43)
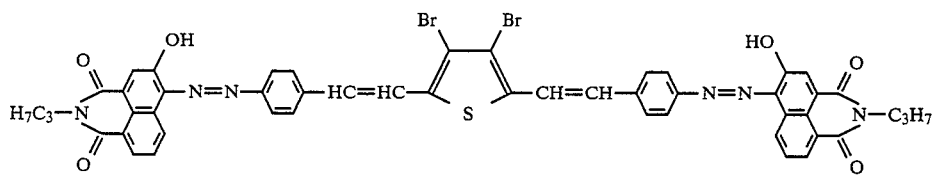
(III-44)

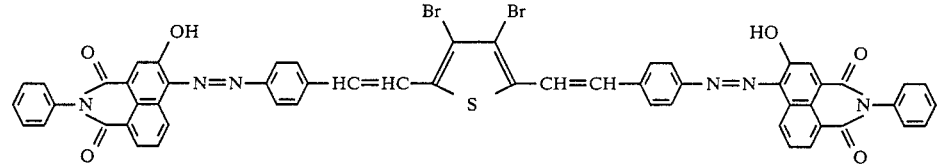
(III-45)
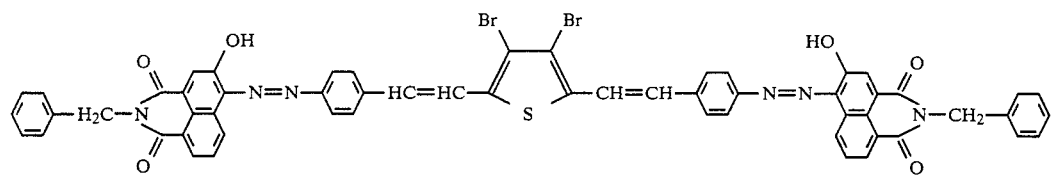
(III-46)
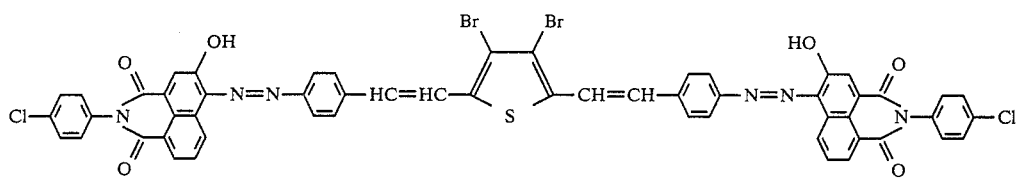
(III-47)
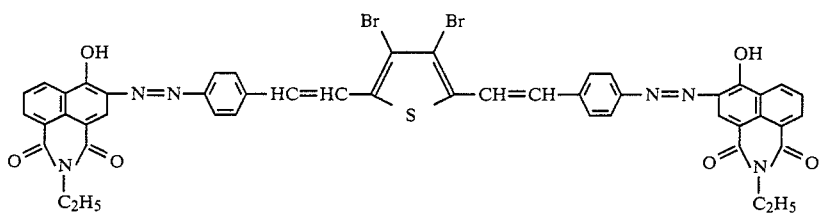
(III-48)
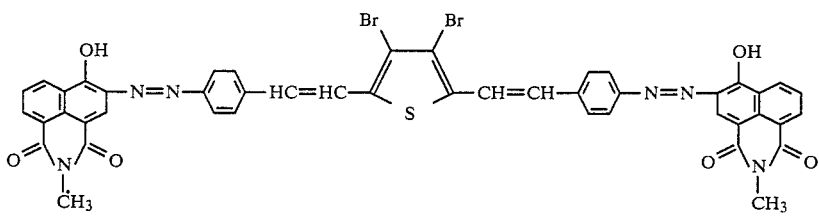
(III-49)
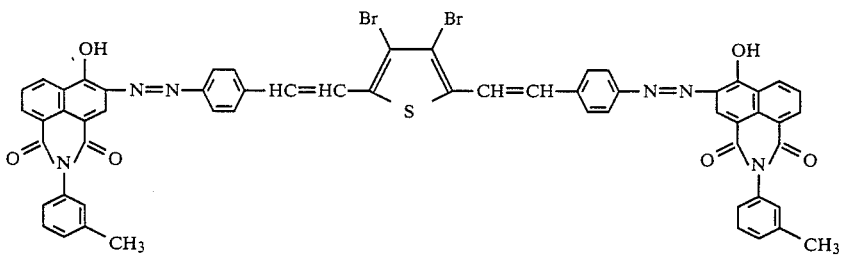
(III-50)

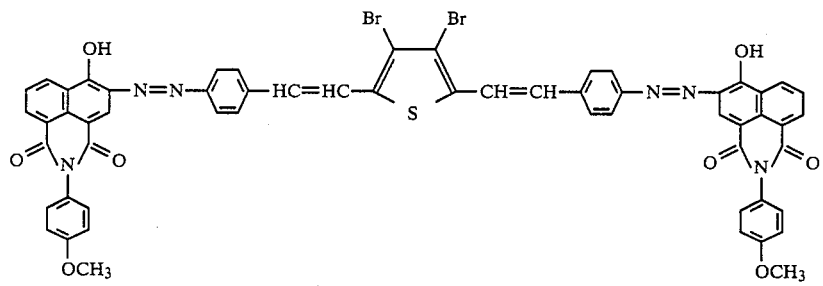
(III-51)
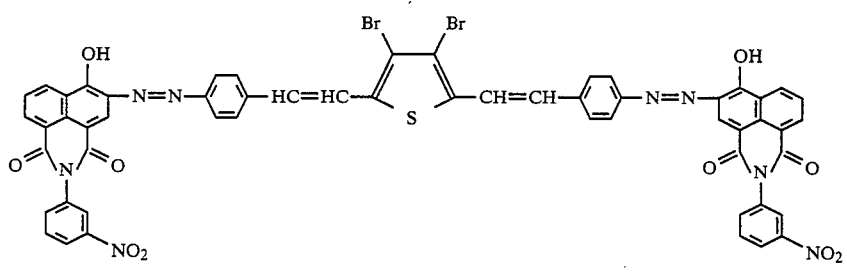
(III-52)
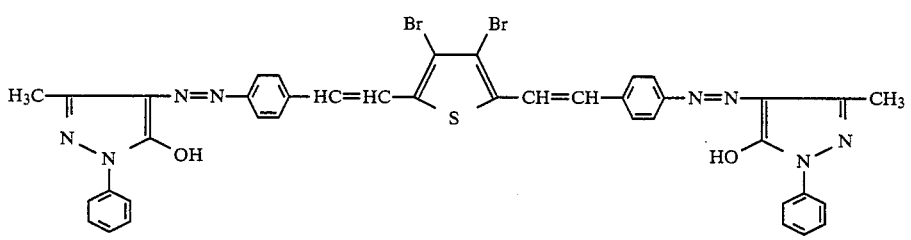
(III-53)
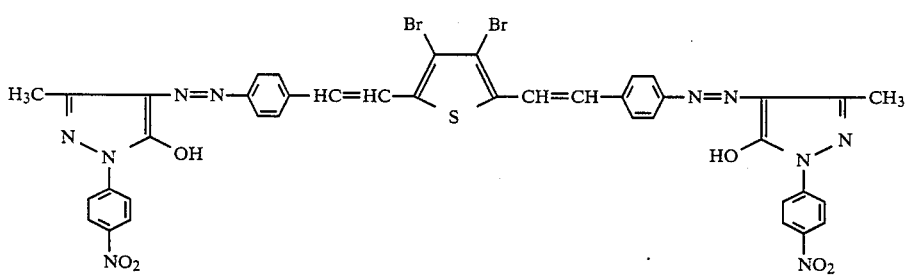
(III-54)
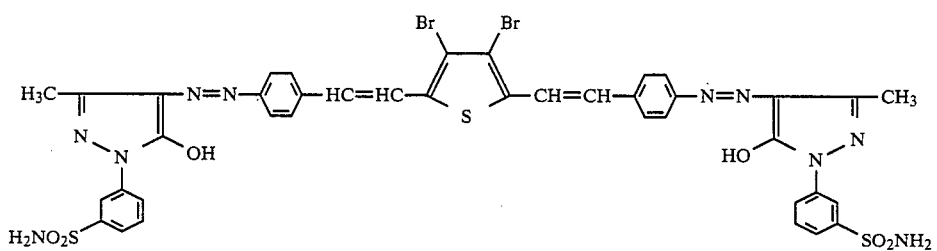
(III-55)

-continued
(III-56)
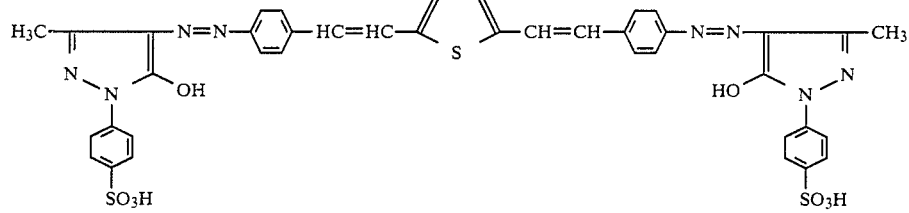
(III-57)
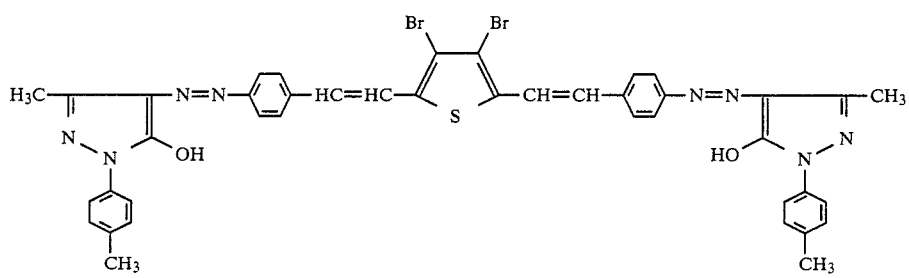
(III-58)
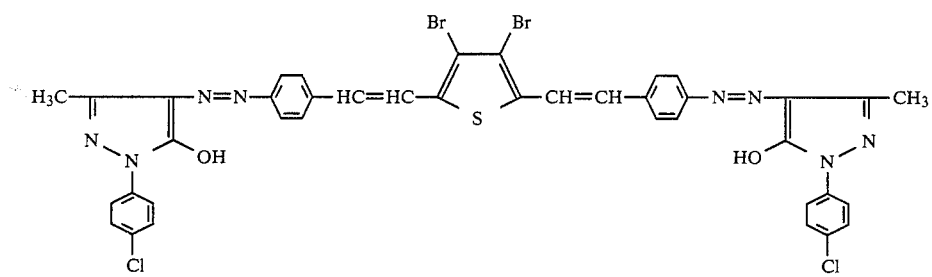
(III-59)
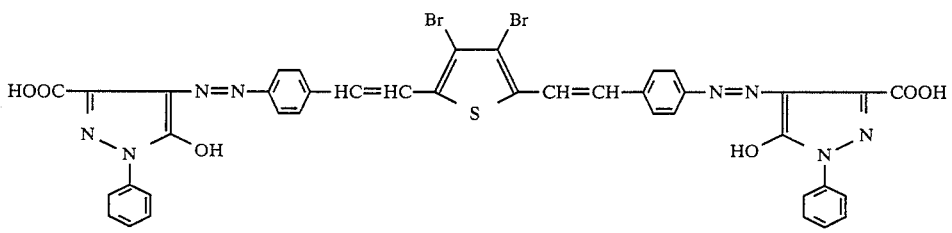
(III-60)
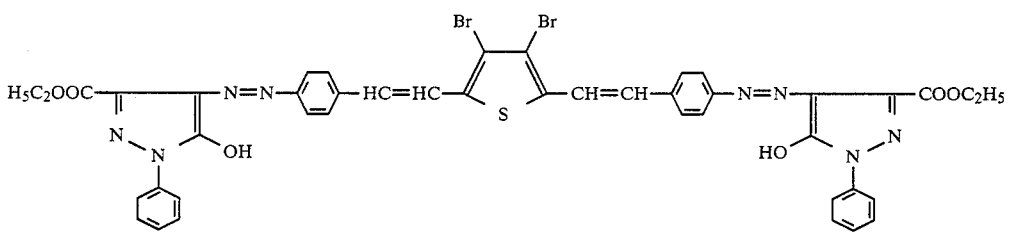
(III-61)
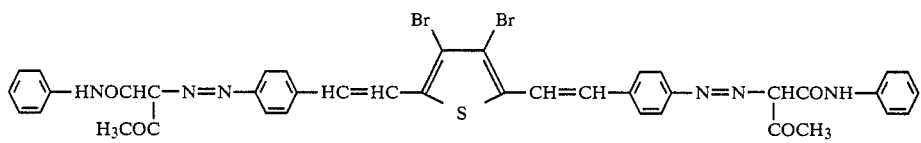

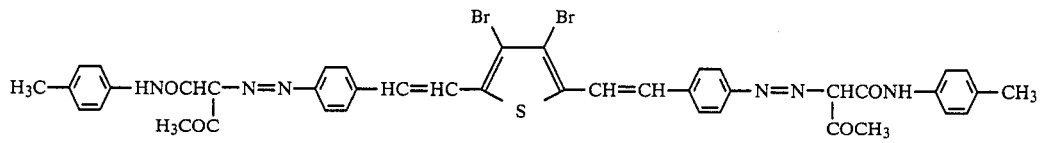
(III-62)
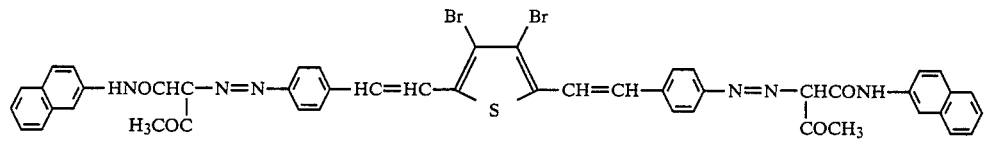
(III-63)
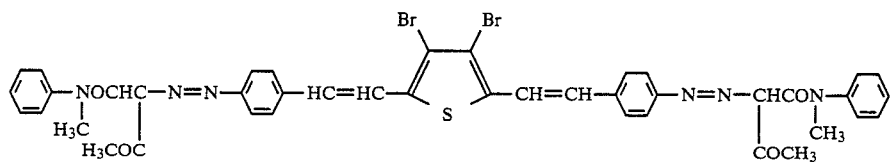
(III-64)
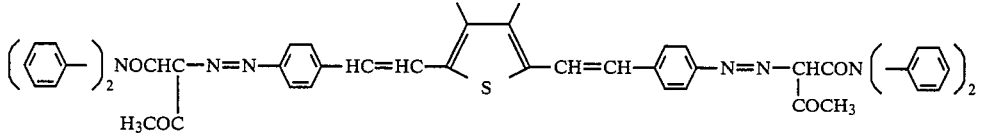
(III-65)
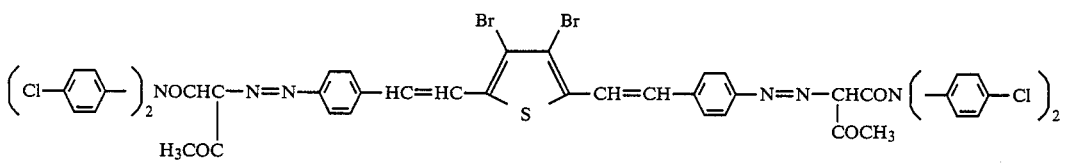
(III-66)
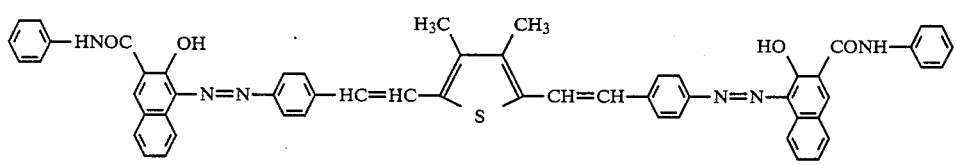
(N-1)
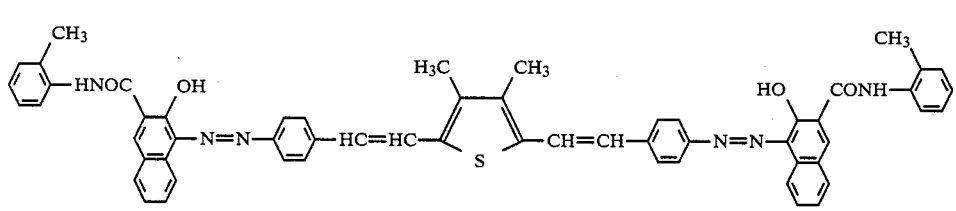
(N-2)

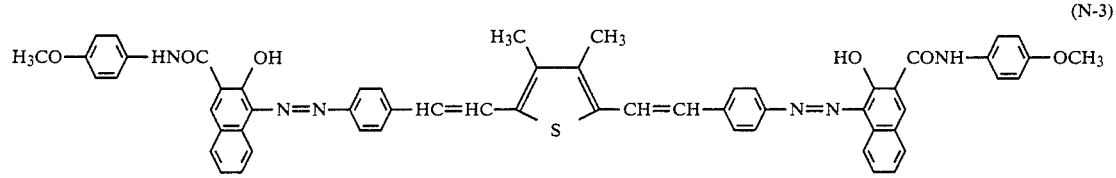
(N-3)
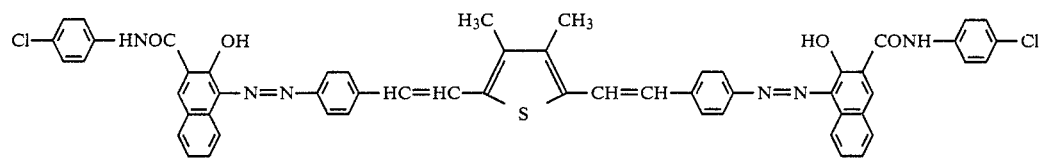
(N-4)
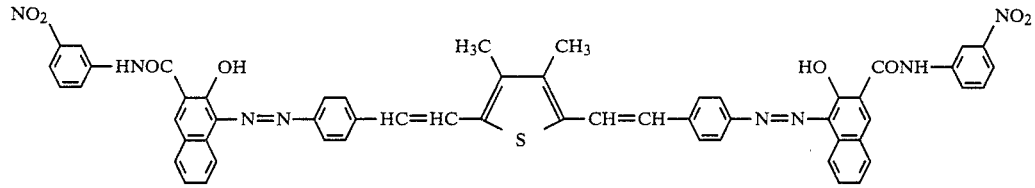
(N-5)
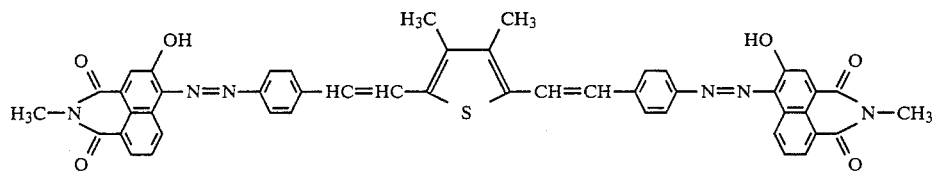
(N-6)
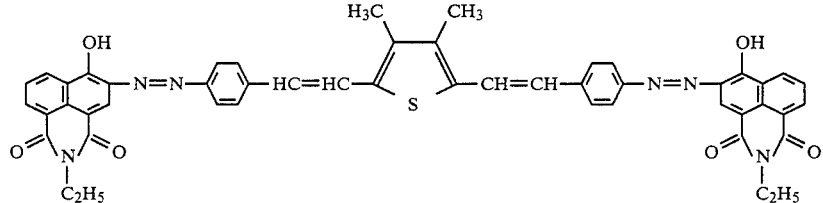
(N-7)
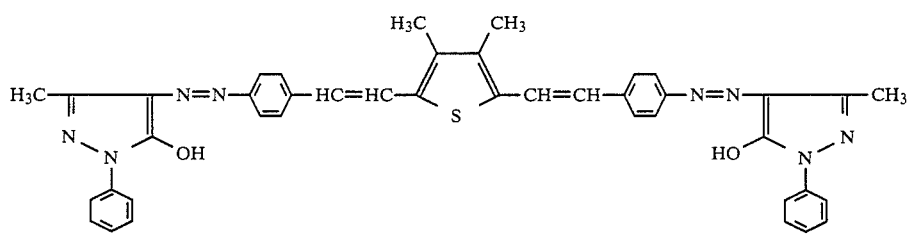
(N-8)
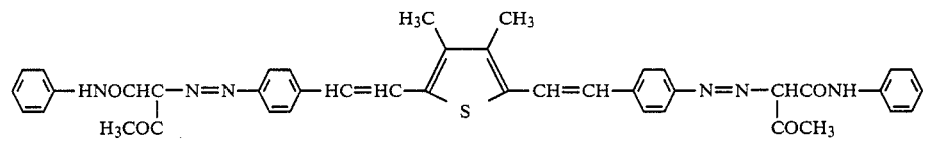
(N-9)

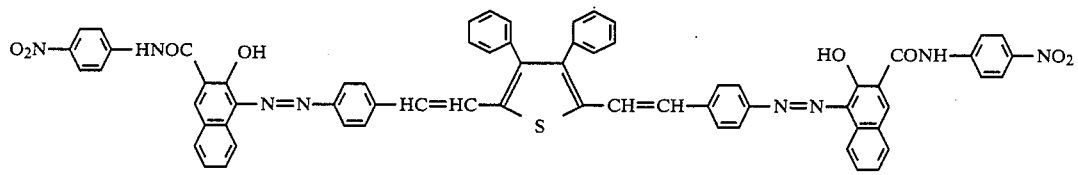
(V-1)
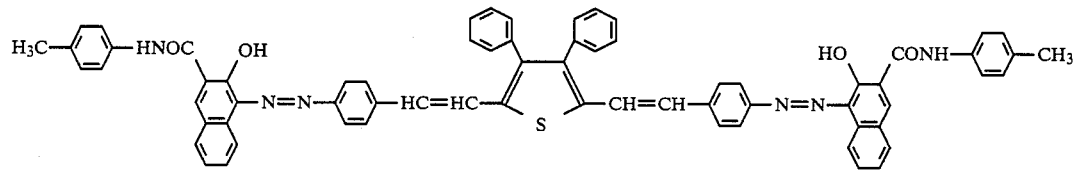
(V-2)
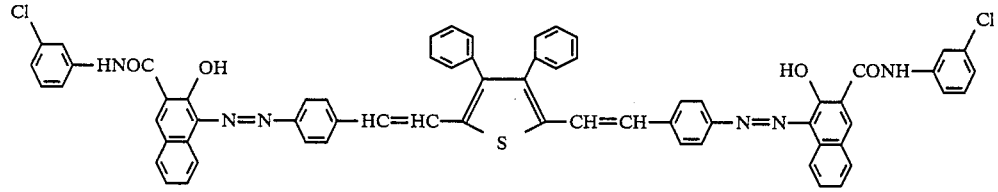
(V-3)
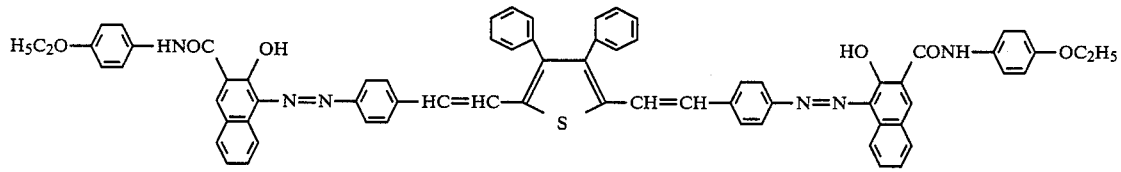
(V-4)
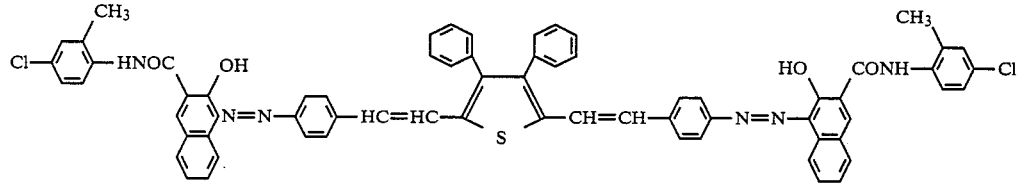
(V-5)
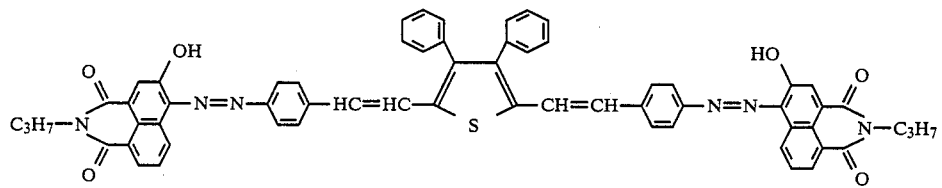
(V-6)

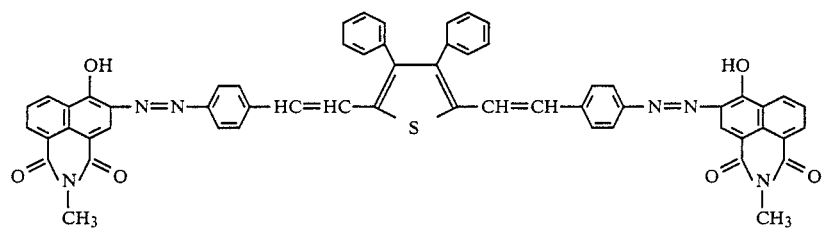
(V-7)
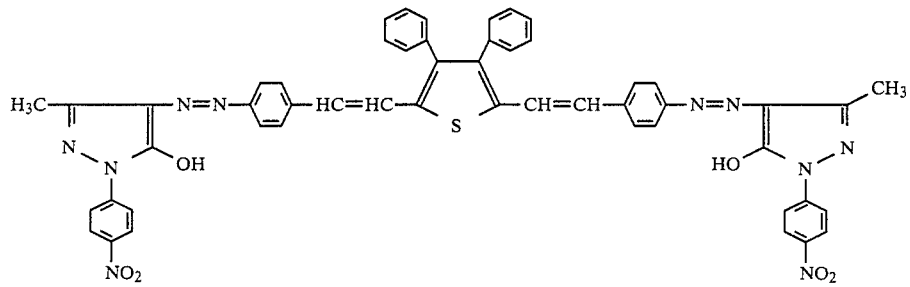
(V-8)
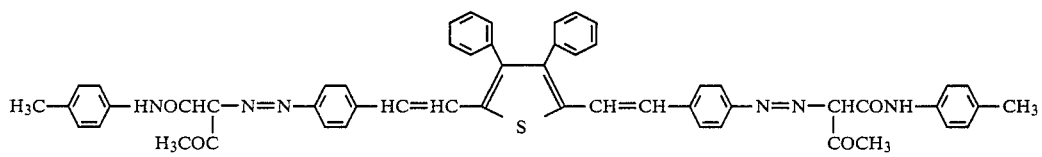
(V-9)
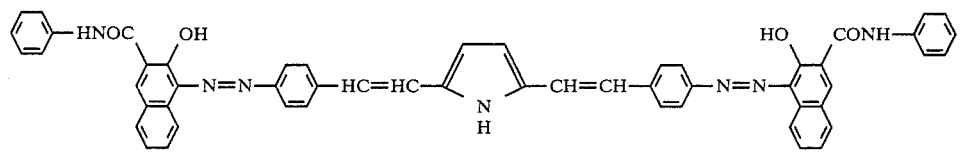
(VI-1)
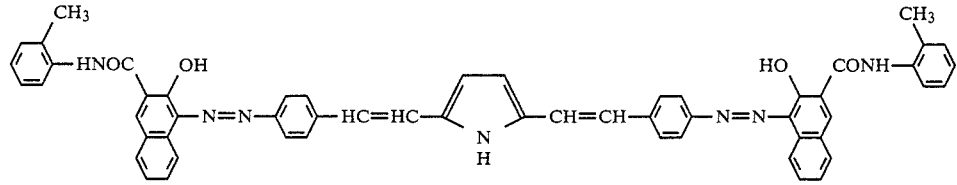
(VI-2)
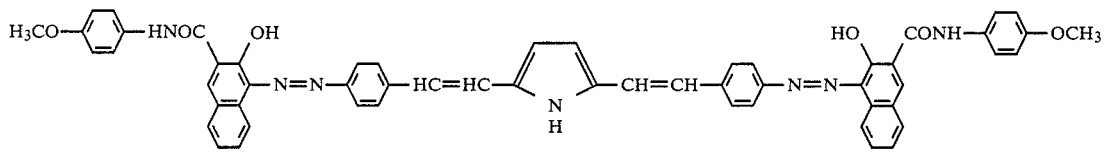
(VI-3)

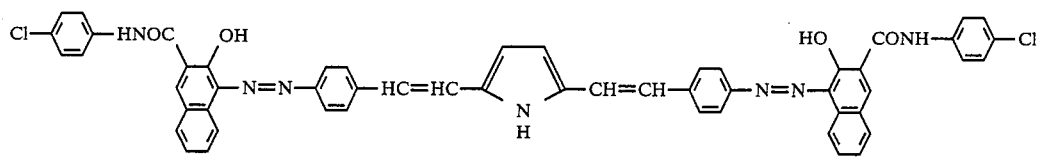
(VI-4)
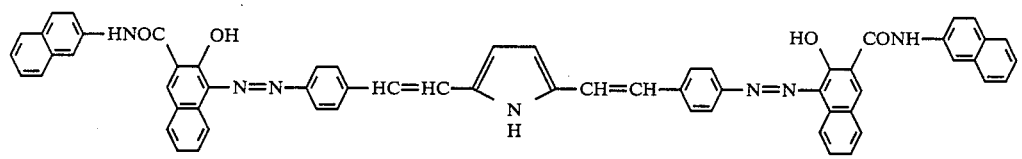
(VI-5)
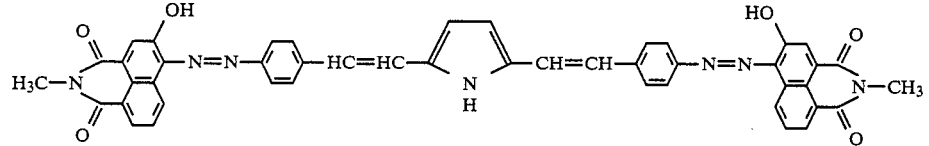
(VI-6)
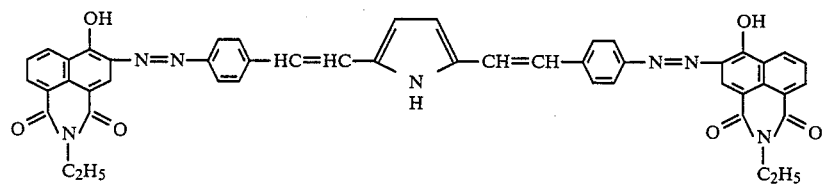
(VI-7)
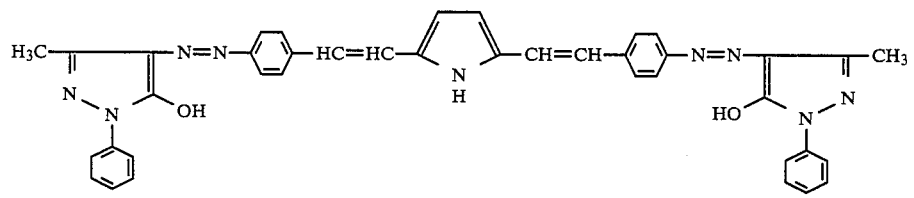
(VI-8)
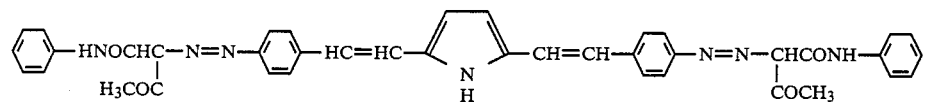
(VI-9)
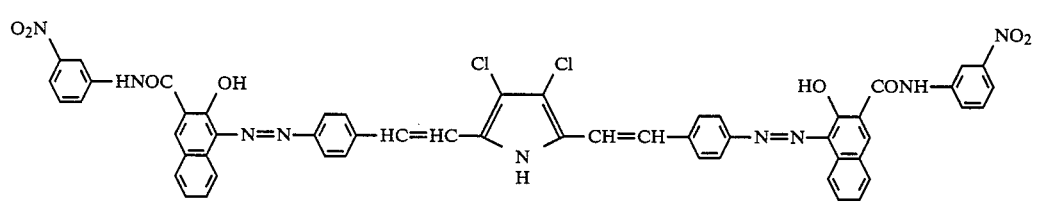
(VII-1)

-continued
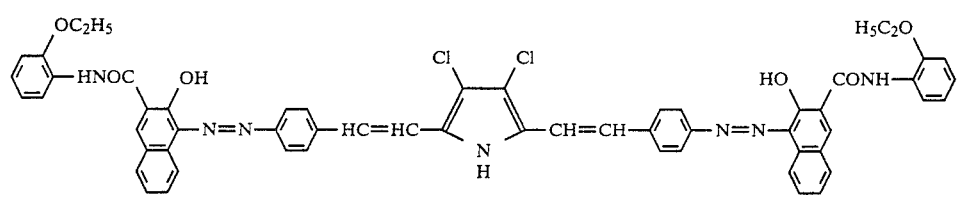
(VII-2)
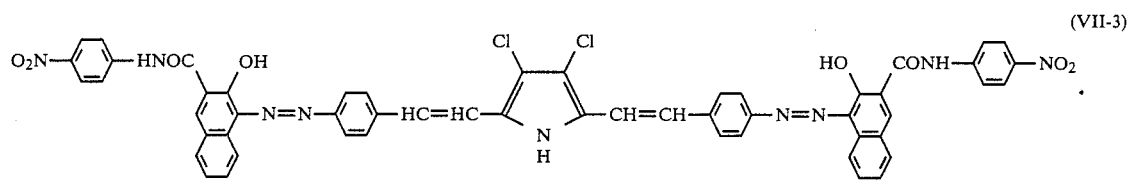
(VII-3)
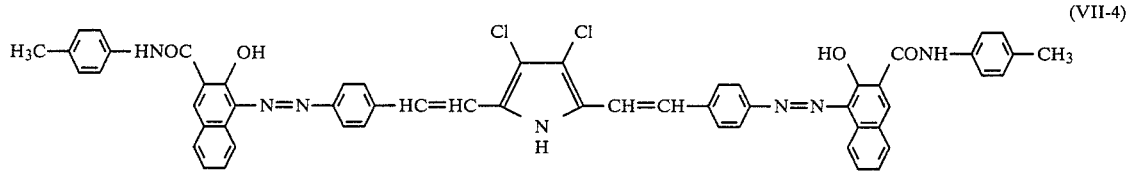
(VII-4)
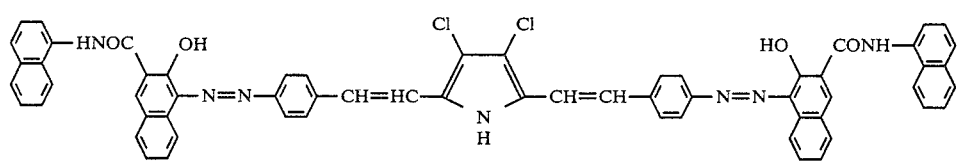
(VII-5)
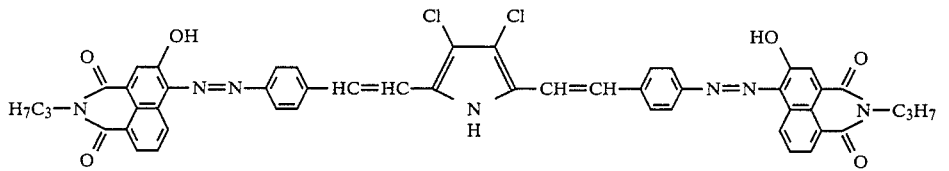
(VII-6)
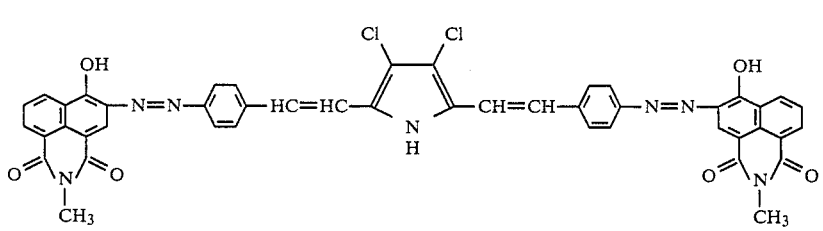
(VII-7)

-continued
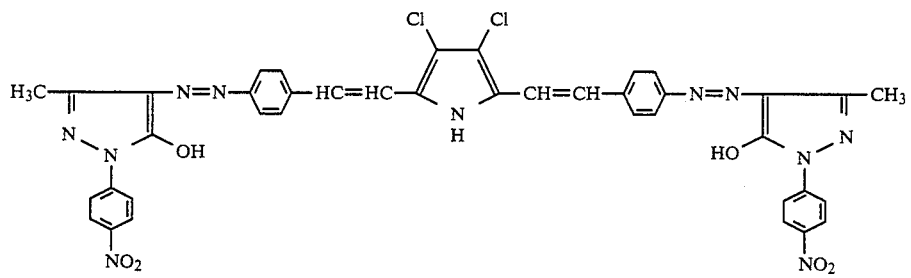
(VII-8)
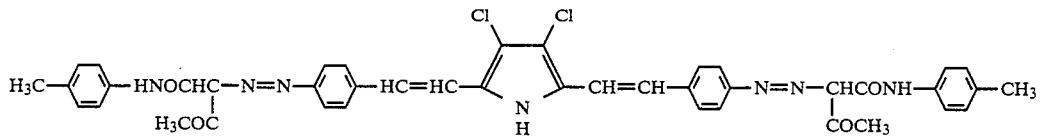
(VII-9)
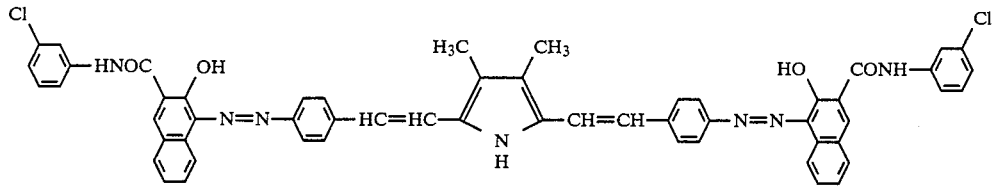
(VIII-1)
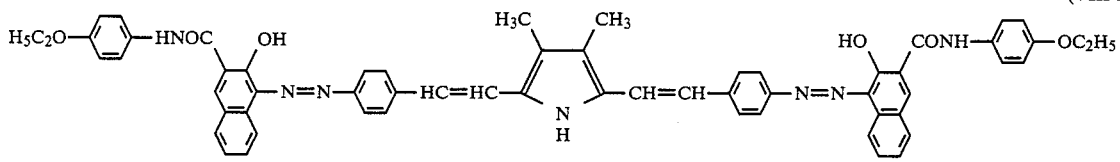
(VIII-2)
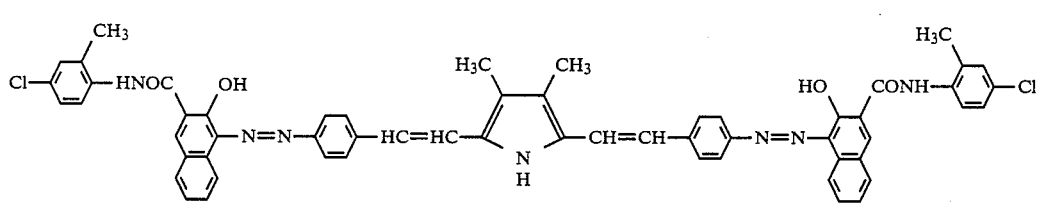
(VIII-3)
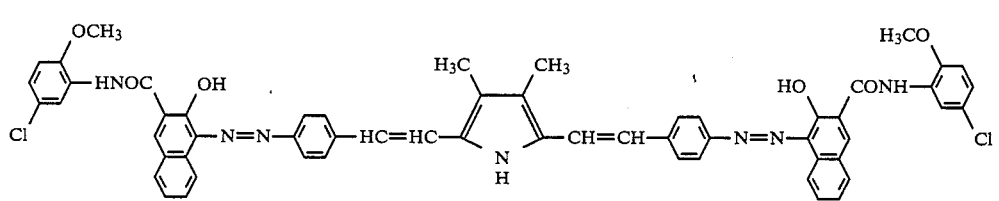
(VIII-4)

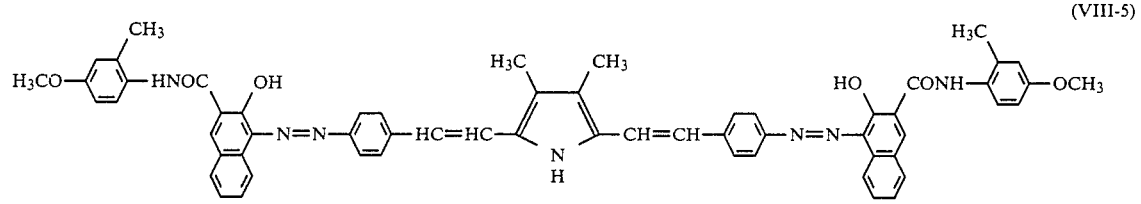
(VIII-5)
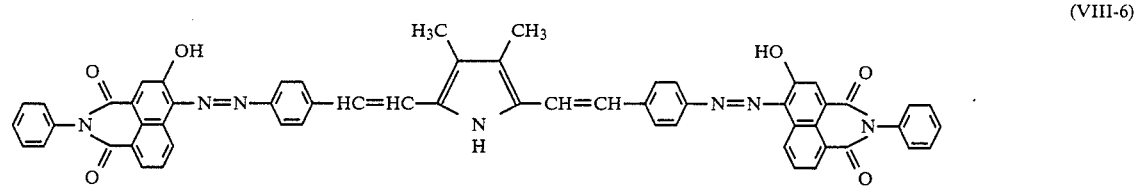
(VIII-6)
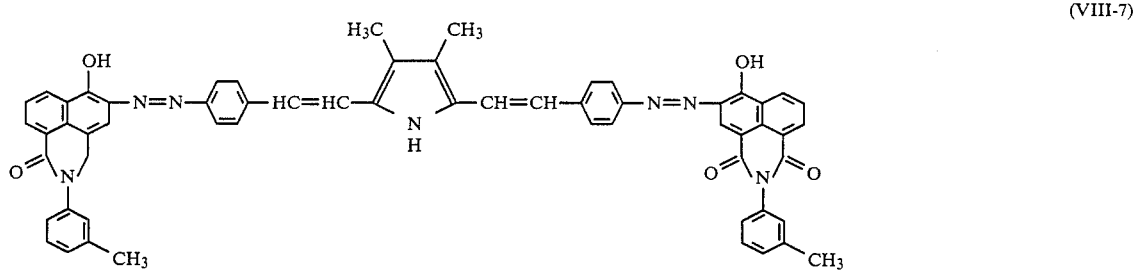
(VIII-7)
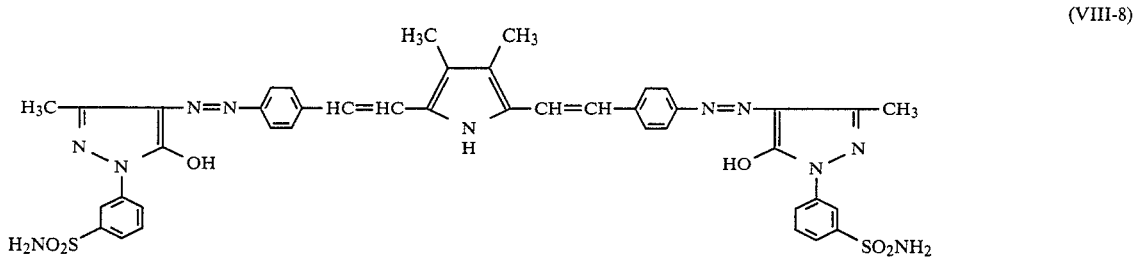
(VIII-8)
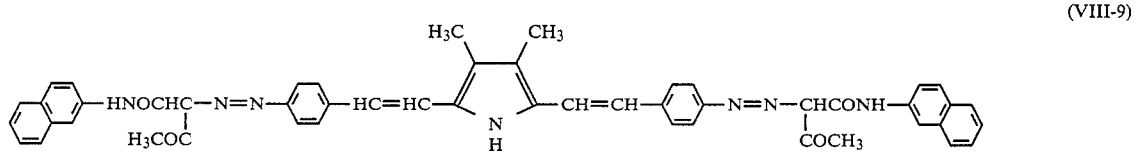
(VIII-9)
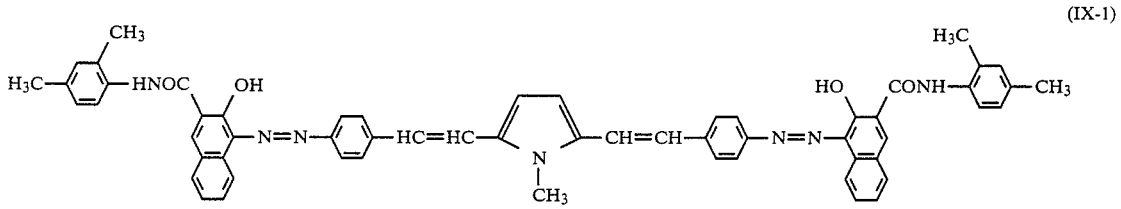
(IX-1)

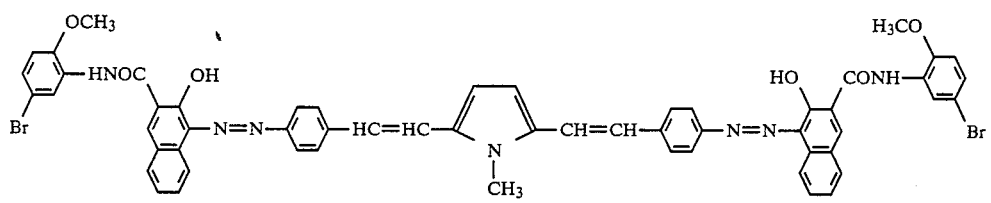
(IX-2)
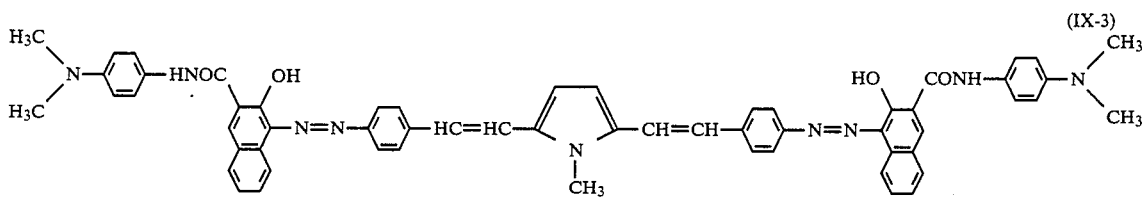
(IX-3)
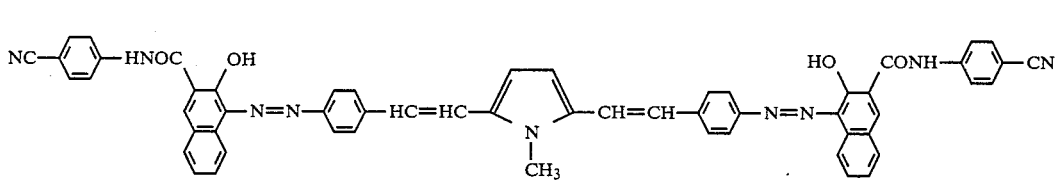
(IX-4)
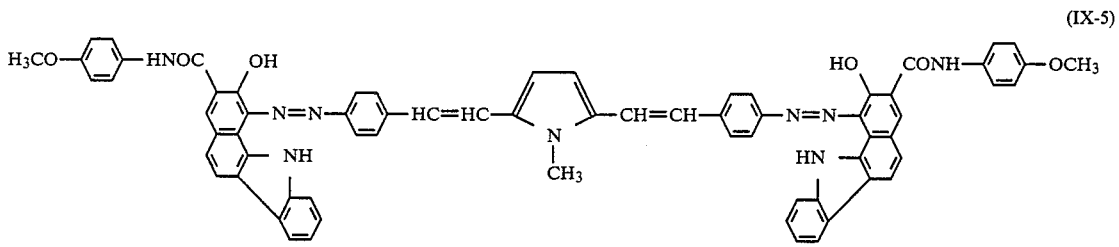
(IX-5)
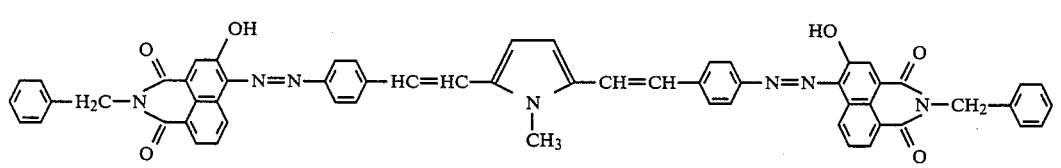
(IX-6)
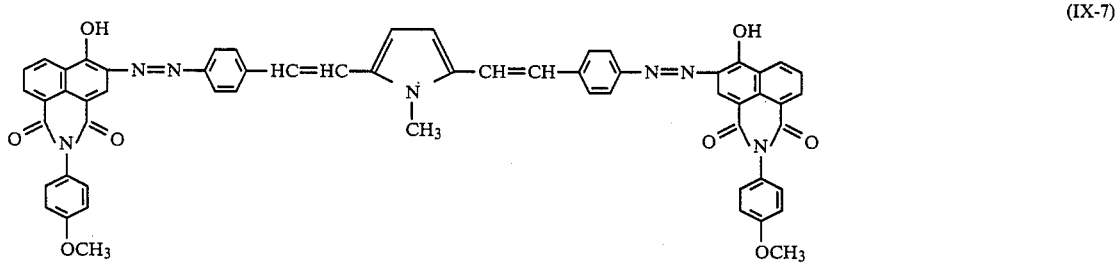
(IX-7)

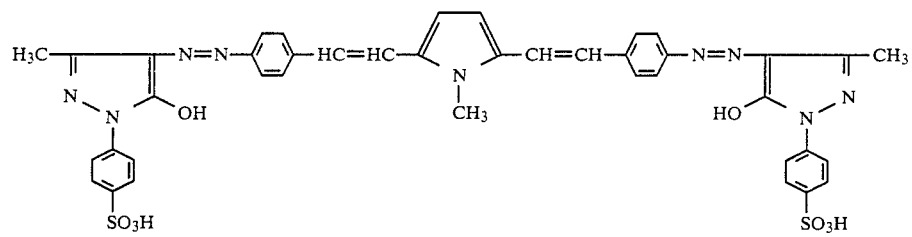
(IX-8)
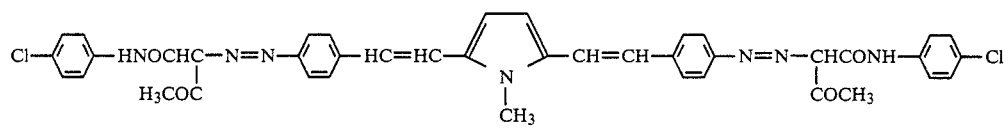
(IX-9)
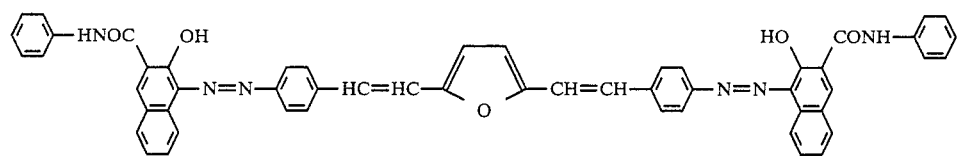
(X-1)
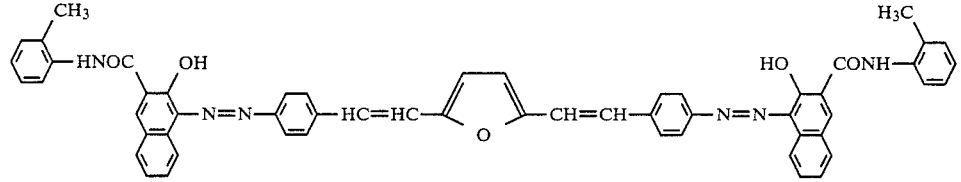
(X-2)
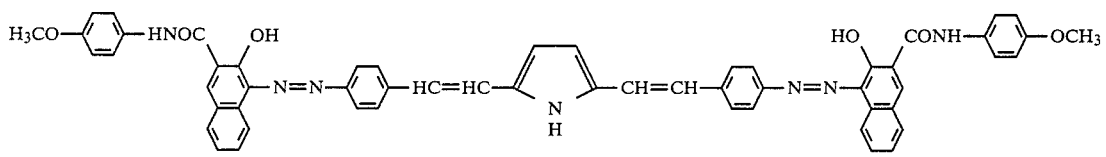
(X-3)
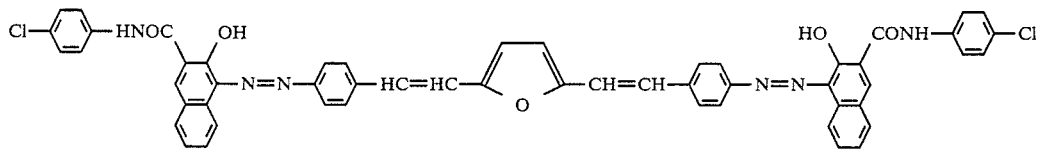
(X-4)
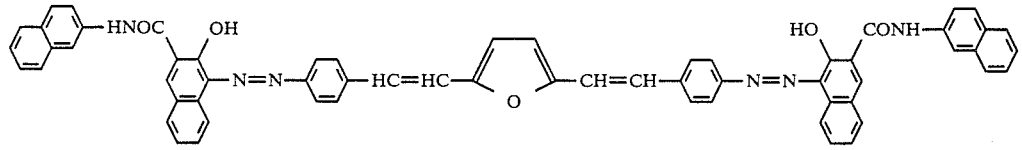
(X-5)

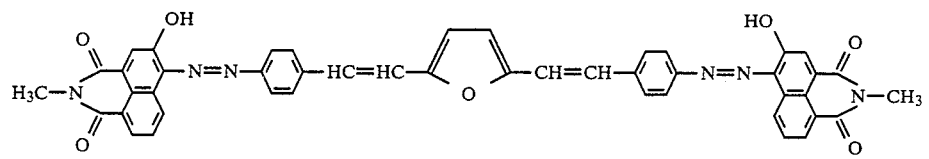
(X-6)
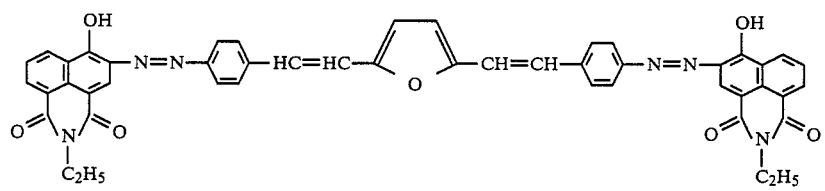
(X-7)
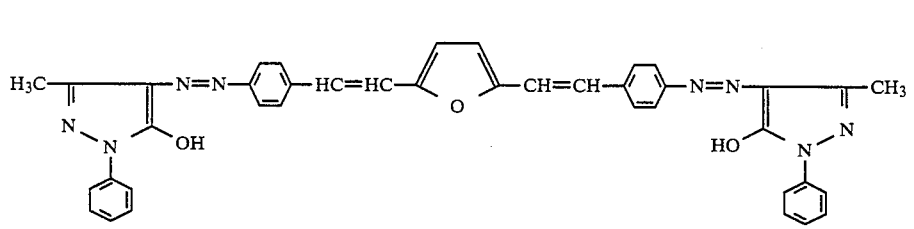
(X-8)
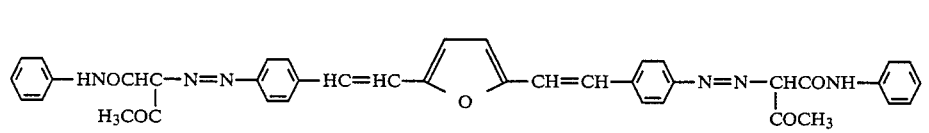
(X-9)
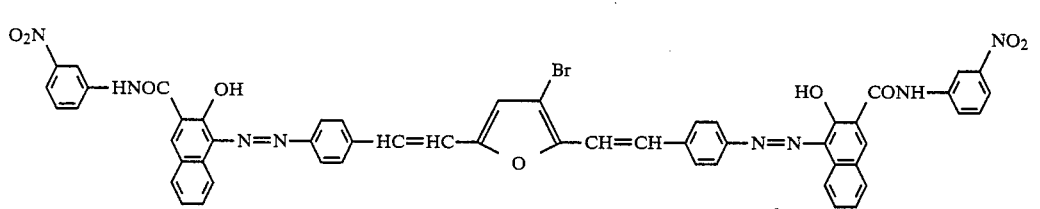
(XI-1)
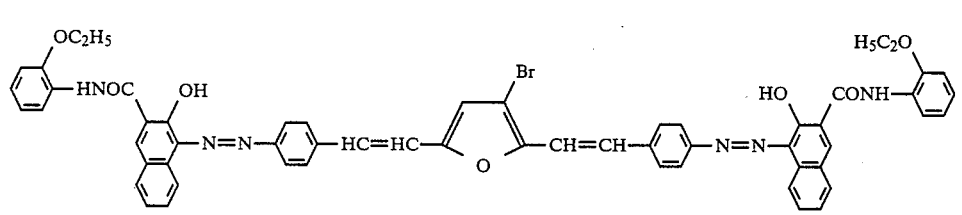
(XI-2)
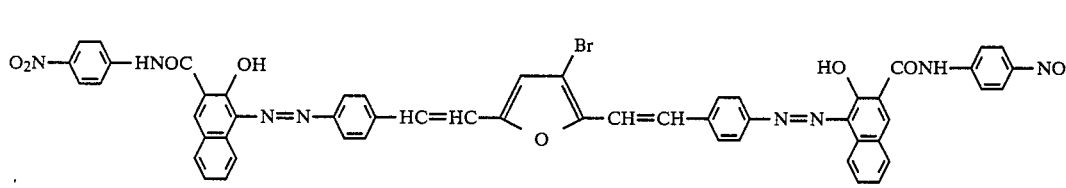
(XI-3)

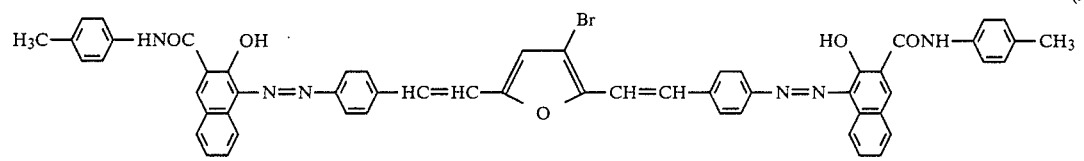
(XI-4)
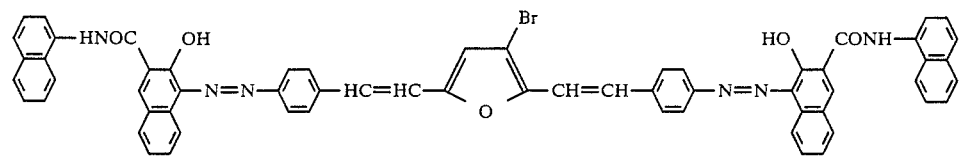
(XI-5)
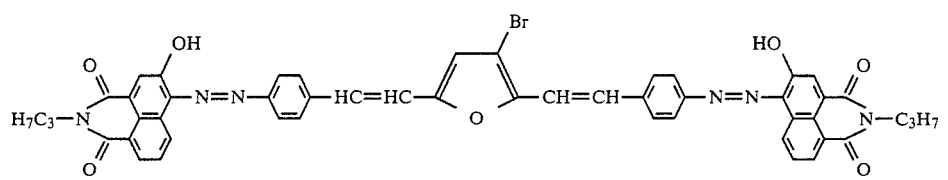
(XI-6)
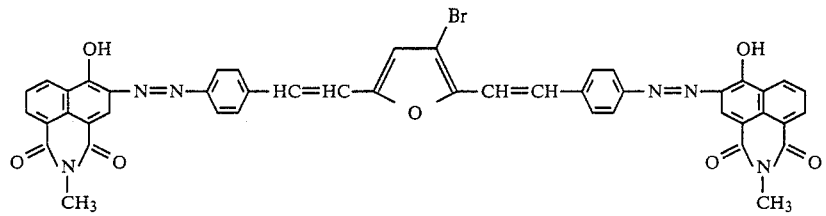
(XI-7)
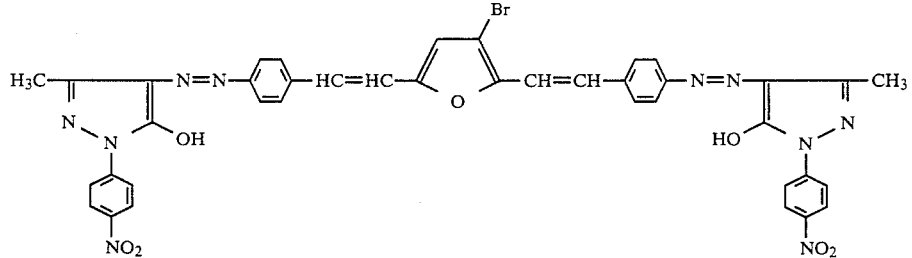
(XI-8)
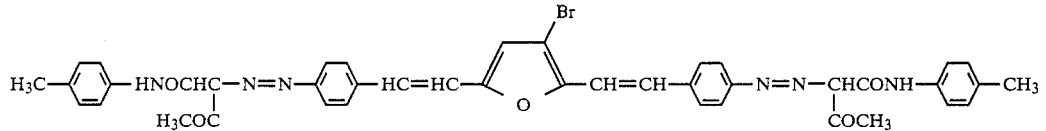
(XI-9)

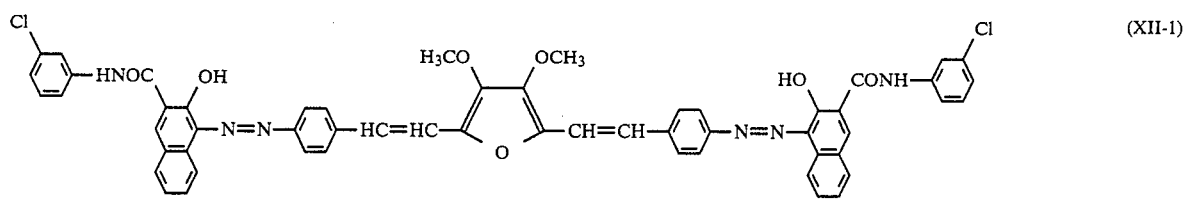
(XII-1)
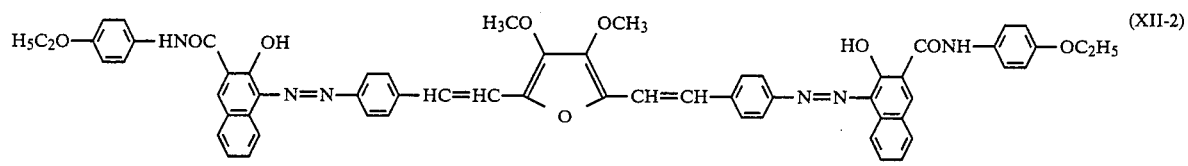
(XII-2)
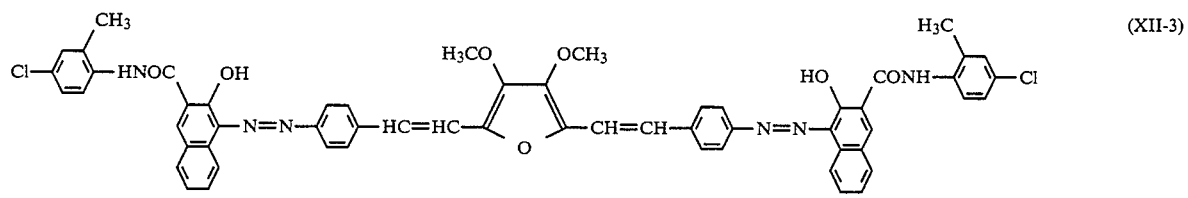
(XII-3)
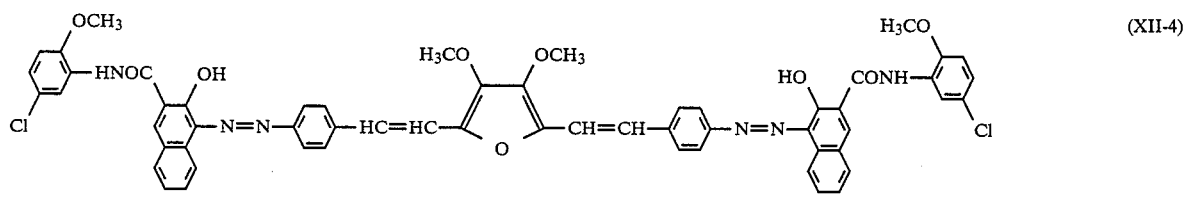
(XII-4)
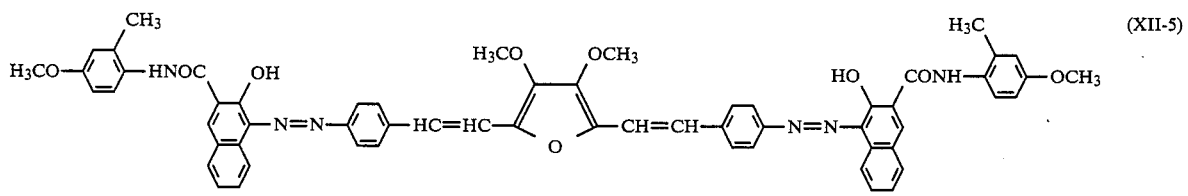
(XII-5)
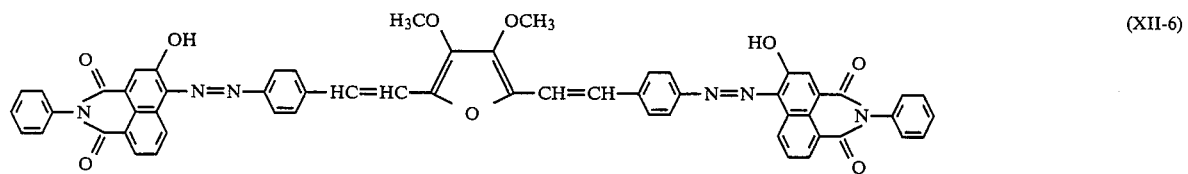
(XII-6)
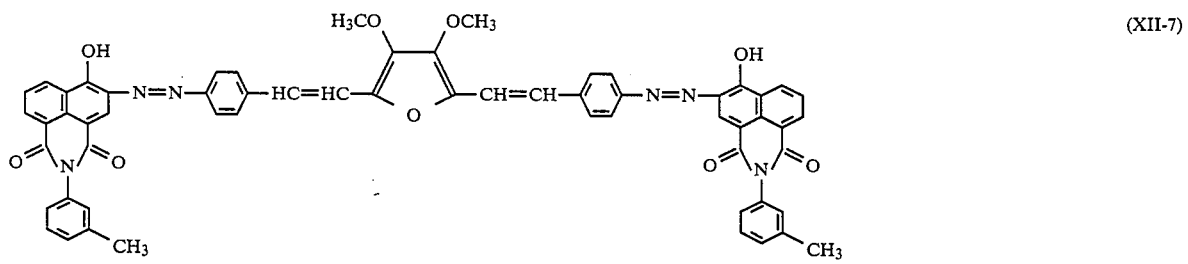
(XII-7)

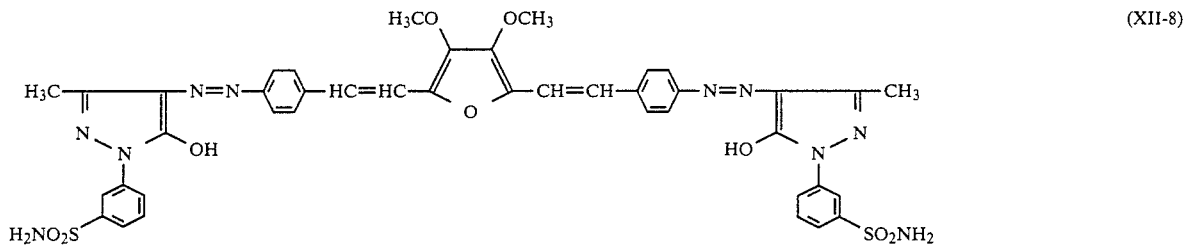
(XII-8)
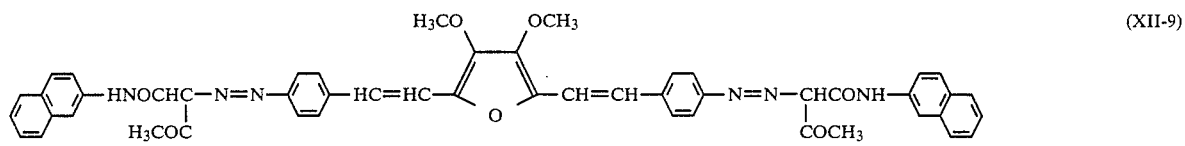
(XII-9)
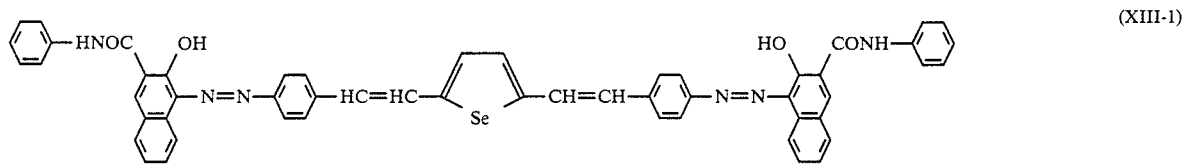
(XIII-1)
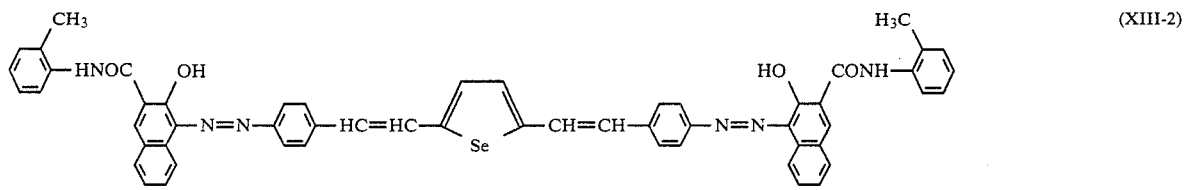
(XIII-2)
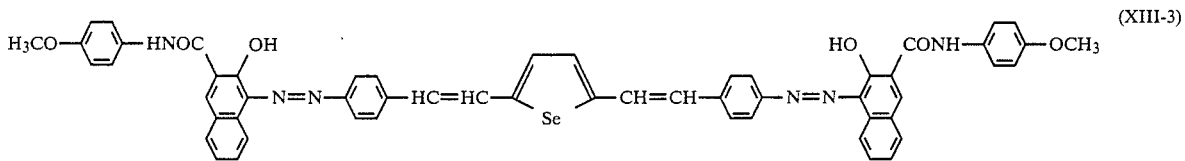
(XIII-3)
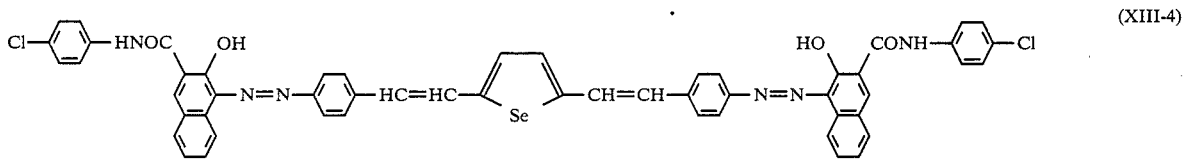
(XIII-4)
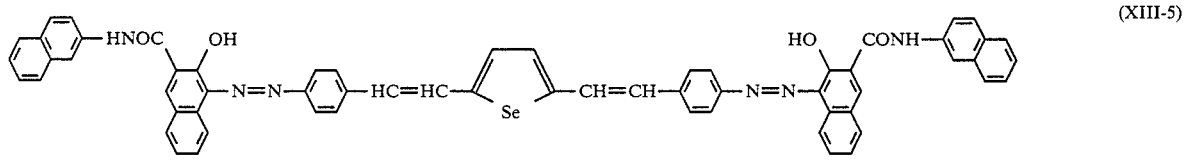
(XIII-5)

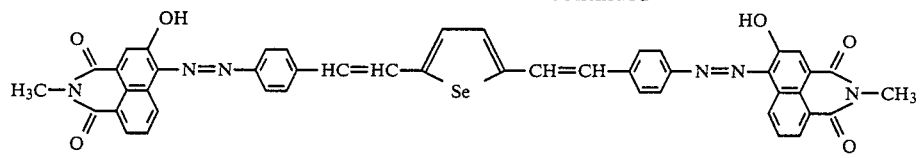
(XIII-6)
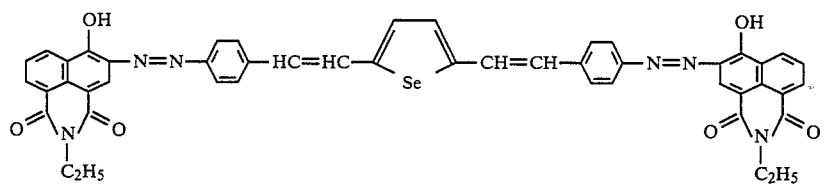
(XIII-7)
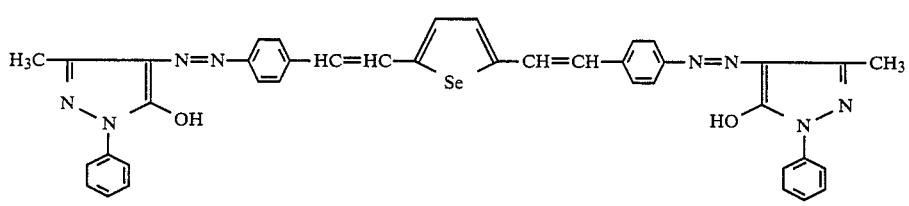
(XIII-8)
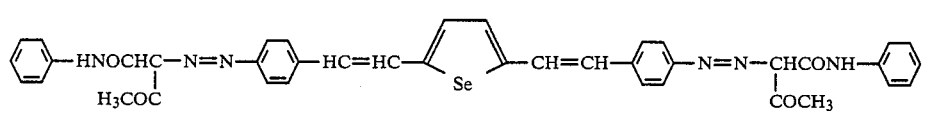
(XIII-9)
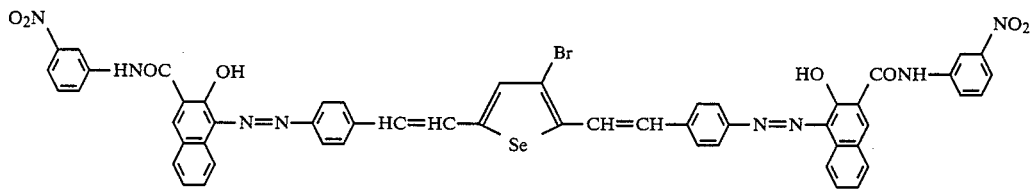
(XIV-1)
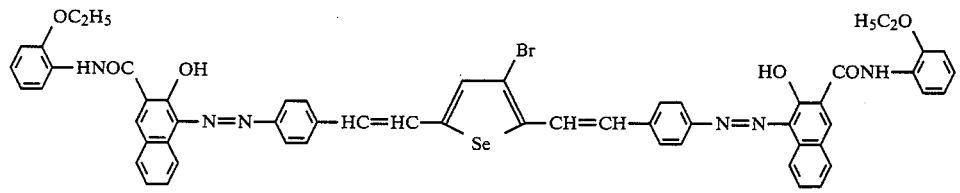
(XIV-2)
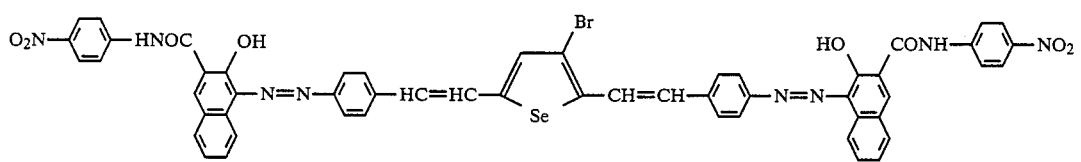
(XIV-3)

-continued

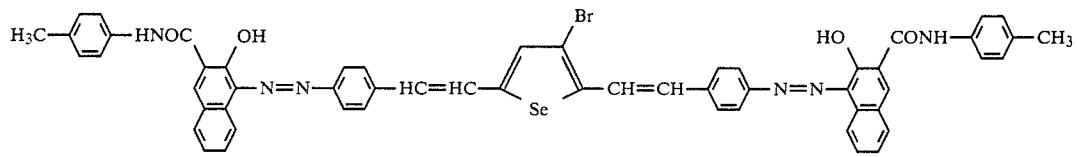
(XIV-4)

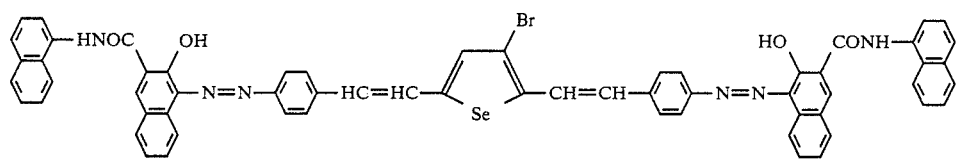
(XIV-5)

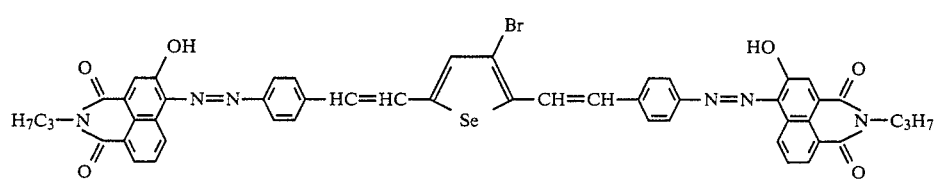
(XIV-6)

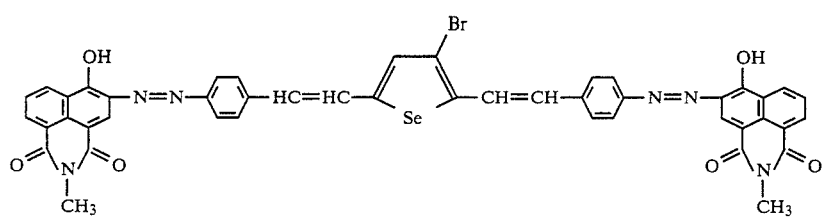
(XIV-7)

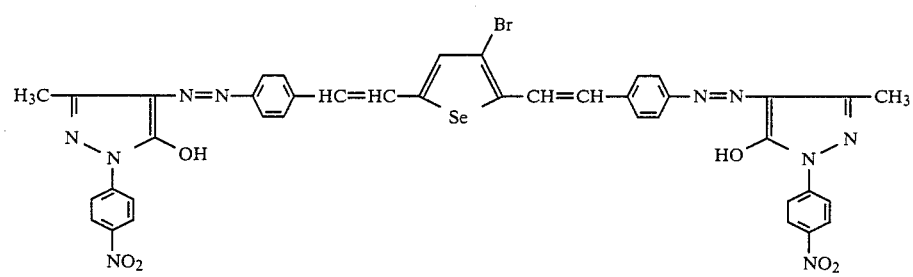
(XIV-8)

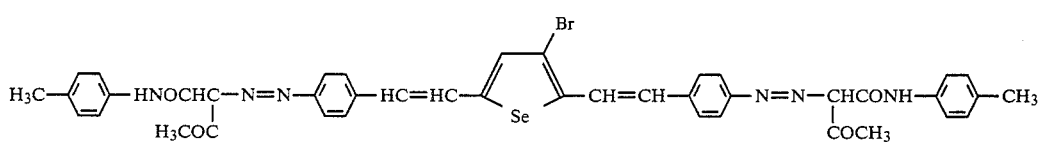
(XIV-9)

The novel disazo compounds of this invention can be prepared by known methods.

A dialkyl p-nitrobenzylphosphonate represented by the general formula (3)

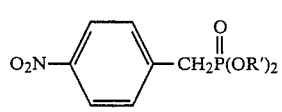
(3)

(where R' is a lower alkyl group of 1 to 4 carbon atoms) is allowed to react with a dialdehyde represented by the general formula (4)

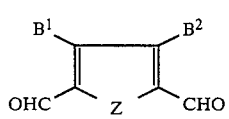
(4)

(where Z, B¹ and B² are as defined for the general formula (1)) in a suitable organic solvent, such as N,N- dimethylformamide, in the presence of an alkali, such as sodium methylate, sodium hydride, etc., to give a compound represented by the general formula (5)

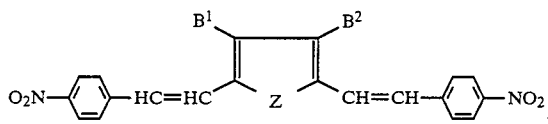
(5)

(where Z, B¹ and B² are as defined for the general formula (1)), which is then reduced under appropriate conditions, for example, by using iron powder and dilute hydrochloric acid, or stannous chloride and hydrochloric acid, affording a compound represented by the general formula (6)

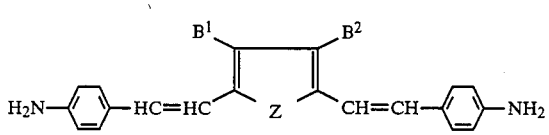
(6)

(where Z, B¹ and B² are as defined for the general formula (1)). This is diazotized and isolated as a bis-diazonium salt represented by the general formula (7)

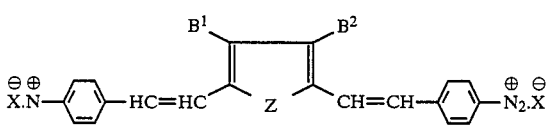
(7)

(where Z, B¹ and B² are as defined for the general formula (1); and X⁻ represents an anionic functional group such as $BF_4^-$ and $ClO_4^-$), from which each of the desired disazo compounds is obtained through coupling, in a suitable organic solvent such as N,N-dimethylformamide, with a corresponding counterpart compound, such as couplers of Naphthol AS, compounds represented by the general formula

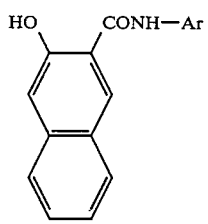

wherein Ar represents an aromatic group, etc.,

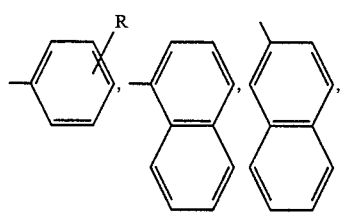

etc. For example, the disazo compound (I-1) can be synthesized according to the procedure described in Synthesis Example 1 below.

Dialkyl p-nitrobenzylsulfonates of formula (3), which are used as the starting materials, can be easily prepared by the method of M. Okazaki, *Nippon Kagaku Zasshi*, 91 (4), 390 (1970). Dialdehydes of formula (4) can also be prepared by known methods: the method of J. Bergman, *Tetrahedron Lett.*, 1972, 4723, when Z is nitrogen; the method of G. Drechsler, *Chem. Abs.*, 61, 4135 (1964), when Z is oxygen; the method of C. Sone, *Bull. Chem. Soc. Japan*, 37, 1197 (1964) and of Steinkopf, *Ann. Chem.*, 532, 250 (1937), when Z is sulfur; and the method of P. Dubus, *Bull. Soc. Chim. Fr.*, 1976, 623, when Z is selenium.

Unless otherwise indicated herein, all parts, percents, ratios and the like are by weight.

SYNTHESIS EXAMPLE 1

2,5-bis(4-Aminostyryl)thiophene (1.2 g) was added to dilute hydrochloric acid prepared from 4 ml of concentrated hydrochloric acid and 12 ml of water, the mixture was stirred on a water bath at 60° C. for about 30 minutes and then cooled to 0° C., and a solution of 0.52 g of sodium nitrite in 5 ml of water was added dropwise over a period of about 20 minutes while holding the temperature at 0° C. The mixture was stirred for an additional hour at that temperature, the small amount of unreacted material was filtered off, and 4 ml of 42% hydrofluoroboric acid was added to the filtrate. The crystals thus separated were collected by filtration, washed with a small amount of water and dried, giving red crystals of bisdiazonium fluoroborate (yield: 1.7 g, 86%).

To a solution of 2 g of this bisdiazonium salt and 2.04 g of 2-hydroxy-3-naphthanilide (coupler) in 150 ml of N,N-dimethylformamide was added dropwise a solution of 3 g of sodium acetate in 20 ml of water at 0° C. over a period of about 20 minutes, the mixture was stirred at room temperature (about 20°–30° C.) for about 2 hours, and the precipitate formed was collected by filtration, washed with 300 ml of water followed by 100 ml of acetone, and dried, affording 2.83 g (84%) of Disazo Compound (I-1) melting at 258°–262° C. (dec.).

| Elemental Analysis: ($C_{54}H_{38}O_4N_6S$) | | | | |
|---|---|---|---|---|
| | C | H | N | S |
| Calculated (%): | 74.81 | 4.42 | 9.69 | 3.70 |
| Found (%): | 74.62 | 4.66 | 9.39 | 3.77 |

IR Absorption Spectrum (KBr disc): Amide 1670 $cm^{-1}$.

Visible Absorption Spectrum: Peak absorption wavelength 571 nm (in DMF containing 5% ethylenediamine).

SYNTHESIS EXAMPLES 2-4

Disazo Compounds (I-2), (I-13) and (I-28) were prepared in the same manner as Synthesis Example 1, except that the couplers listed in Table 1 below were used. Decomposition point, elemental analysis, and IR and visible spectra of these compounds are shown in Table 1 below.

SYNTHESIS EXAMPLES 5-16

Disazo Compounds (III-1), (III-2), (III-3), (III-4), (III-5), (III-11), (III-13), (III-25), (III-26), (III-28), (III-30) and (III-31) were prepared in the same manner as in Synthesis Example 1, except that 3,4-dibromo-2,5-bis(4-aminostyryl)thiophene was used as the starting diamine compound and that the couplers listed in Table 2 below were used. Decomposition point, elemental analysis, and IR and visible spectra are also shown in Table 2 below.

TABLE 1

| Synthesis Example No. | Coupler | Disazo Compound (dec. pt.) | Elemental Analysis Calcd. (%) | Found (%) | IR Spectrum $V_{c=0}$ cm$^{-1}$ (KBr) | $\lambda_{max}$: nm (in DMF contg. 5% ethylene-diamine) |
|---|---|---|---|---|---|---|
| 2 | [structure: HO, CONH-phenyl with H₃C, naphthalene] | (I-2) (258–262° C.) | C: 75.15 H: 4.73 N: 9.39 S: 3.58 | 75.32 4.86 9.55 3.39 | 1,670 | 576 |
| 3 | [structure: HO, CONH-phenyl with H₃C and CH₃, naphthalene] | (I-13) (281–285° C.) | C: 75.47 H: 5.02 N: 9.10 S: 3.47 | 75.43 5.31 9.22 3.55 | 1,670 | 576 |
| 4 | [structure: HO, CONH-phenyl with H₃CO, naphthalene] | (I-18) (258–262° C.) | C: 72.25 H: 4.57 N: 9.07 S: 3.46 | 72.39 4.58 9.29 3.36 | 1,670 | 582 |

TABLE 2

| Synthesis Example No. | Coupler | Disazo Compound (dec. pt.) | Elemental Analysis Calcd. (%) | Found (%) | IR Spectrum $V_{c=0}$ cm$^{-1}$ (KBr) | $\lambda_{max}$: nm (in DMF contg. 5% ethylene-diamine) |
|---|---|---|---|---|---|---|
| 5 | [structure: HO, CONH-phenyl, naphthalene] | (III-1) (280–285° C.) | C: 63.29 H: 3.54 N: 8.20 S: 3.13 Br: 15.60 | 63.33 3.82 8.29 3.08 15.40 | 1,670 | 572 |
| 6 | [structure: HO, CONH-phenyl with H₃C, naphthalene] | (III-2) (267–268° C.) | C: 63.89 H: 3.83 N: 7.98 S: 3.05 Br: 15.18 | 63.81 3.81 7.78 3.21 15.23 | 1,670 | 580 |

TABLE 2-continued

| Synthesis Example No. | Coupler | Disazo Compound (dec. pt.) | Elemental Analysis Calcd. (%) | Found (%) | IR Spectrum $V_{c=o}$ cm$^{-1}$ (KBr) | $\lambda_{max}$: nm (in DMF contg. 5% ethylenediamine) |
|---|---|---|---|---|---|---|
| 7 | 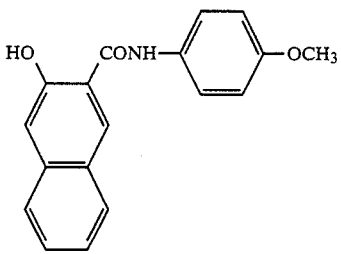 | (III-3) (259–260° C.) | C: 62.00<br>H: 3.72<br>N: 7.75<br>S: 2.96<br>Br: 14.73 | 62.31<br>3.82<br>7.88<br>2.87<br>14.66 | 1,660 | 589 |
| 8 | 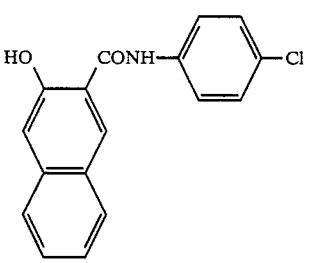 | (III-4) (>300° C.) | C: 59.30<br>H: 3.13<br>N: 7.68<br>S: 2.93<br>Br: 14.61<br>Cl: 6.48 | 59.18<br>3.08<br>7.66<br>2.65<br>14.39<br>6.25 | 1,670 | 570 |
| 9 | 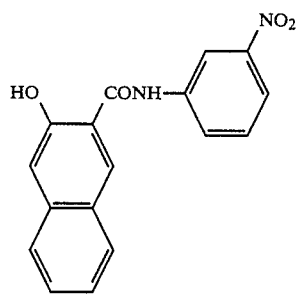 | (III-5) (>300° C.) | C: 58.18<br>H: 3.07<br>N: 10.05<br>S: 2.88<br>Br: 14.34 | 58.10<br>3.02<br>10.31<br>2.65<br>14.18 | 1,670 | 572 |
| 10 | 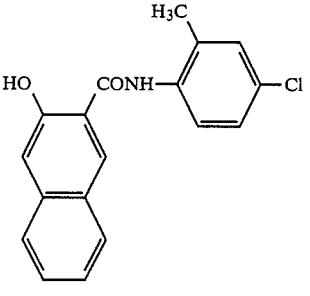 | (III-11) (>300° C.) | C: 59.96<br>H: 3.41<br>N: 7.49<br>S: 2.86<br>Br: 14.25<br>Cl: 6.32 | 59.83<br>3.29<br>7.66<br>2.93<br>4.53<br>6.65 | 1,675 | 580 |
| 11 | 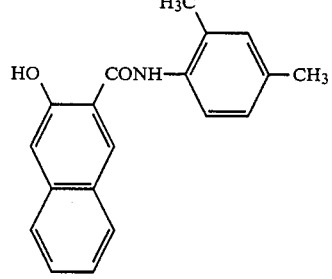 | (III-13) (255–260° C.) | C: 64.45<br>H: 4.10<br>N: 7.77<br>S: 2.97<br>Br: 14.79 | 64.48<br>4.29<br>7.81<br>2.88<br>14.52 | 1,665 | 576 |

TABLE 2-continued

| Synthesis Example No. | Coupler | Disazo Compound (dec. pt.) | Elemental Analysis Calcd. (%) | Found (%) | IR Spectrum $V_{c=0}$ cm$^{-1}$ (KBr) | $\lambda_{max}$: nm (in DMF contg. 5% ethylenediamine) |
|---|---|---|---|---|---|---|
| 12 | (naphthalen-1-yl amide of 3-hydroxy-2-naphthoic acid) | (III-25) (267–269° C.) | C: 66.20<br>H: 3.58<br>N: 7.47<br>S: 2.85<br>Br: 14.21 | 66.35<br>3.87<br>7.62<br>2.99<br>14.05 | 1,670 | 576 |
| 13 | (naphthalen-2-yl amide of 3-hydroxy-2-naphthoic acid) | (III-26) (203–205° C.) | C: 66.20<br>H: 3.58<br>N: 7.47<br>S: 2.85<br>Br: 14.21 | 66.29<br>3.66<br>7.55<br>2.92<br>14.08 | 1,670 | 582 |
| 14 | (2-methoxyphenyl amide of 3-hydroxy-2-naphthoic acid) | (III-28) (277–278° C.) | C: 62.00<br>H: 3.72<br>N: 7.75<br>S: 2.96<br>Br: 14.73 | 62.23<br>3.76<br>7.78<br>2.63<br>14.84 | 1,660 | 578 |
| 15 | (2-methyl-4-methoxyphenyl amide of carbazole-hydroxynaphthoic acid) | (III-30) (286–289° C.) | C: 65.12<br>H: 3.90<br>N: 8.68<br>S: 2.48<br>Br: 12.38 | 65.21<br>3.92<br>8.74<br>2.66<br>12.45 | 1,660 | 599 |

TABLE 2-continued

| Synthesis Example No. | Coupler | Disazo Compound (dec. pt.) | Elemental Analysis Calcd. (%) | Found (%) | IR Spectrum $V_{c=o}$ cm$^{-1}$ (KBr) | $\lambda_{max}$: nm (in DMF contg. 5% ethylenediamine) |
|---|---|---|---|---|---|---|
| 16 | [structure: 2-hydroxy-3-(N-(4-methoxyphenyl)carbamoyl)-substituted naphthalene with HN-phenyl group] | (III-31) (298–300° C.) | C: 64.47<br>H: 3.67<br>N: 8.87<br>S: 2.54<br>Br: 12.65 | 64.67<br>3.87<br>8.83<br>2.64<br>12.82 | 1,670 | 600 |

The IR absorption spectrum (KBr disc) of Disazo Compound (I-13) is shown in the Figure.

The other disazo compounds of this invention can be prepared in a similar manner to the above using the corresponding couplers and bisdiazonium salts derived from diamines corresponding to the diamines represented by the general formula (3).

The electrophotographic photoreceptors of this invention has a photosensitive layer containing at least one disazo compound represented by the general formula (1). Various types of electrophotographic photoreceptors are known, and the photoreceptors of this invention may be any of these types. However, the photoreceptors of this invention normally have either of the following two types of structures:

(1) a structure comprising an electrically conductive support material and a photosensitive layer thereupon, wherein the latter comprises the disazo compound dispersed in a charge-carrier transporting medium, and (2) a structure comprising an electrically conductive support material, a charge generating layer and a charge transporting medium one upon another in that order, wherein the charge generating layer contains the disazo compound as a main component.

The disazo compound of this invention serves as a photoconductive substance, which, upon absorption of light, generates charge carriers at an extremely high efficiency. Transportation of the generated charge carriers may be effected with the disazo compound used as a transporting medium, but it is more effective to use a separate charge transporting substance as the medium for transportation.

The electrophotographic photoreceptors of Type (1) can be prepared by dispersing a fine powder of the disazo compound in a solution of a binder or in a solution containing a binder and a charge transporting substance, and by coating this solution on a support material, followed by drying. The thickness of the electrophotographic photosensitive layer should be in the range of about 3 to about 30μ, preferably 5 to 20μ.

The electrophotographic photoreceptors of Type (2) can be prepared as follows. First, the disazo compound is fixed to the surface of a support material through vacuum deposition, by coating a solution thereof in a suitable solvent (e.g., amines), or by coating a suspension of a finely powdered disazo compound in a suitable solvent which contains a binder as required; and this is followed by coating a solution of a charge transporting substance and binder. The thickness of the charge generating layer containing the disazo compound should be not larger than about 4μ, preferably not larger than 2μ, and that of the charge transporting layer should be in the range of about 3 to 30μ, preferably from 5 to 20μ.

The disazo compound, whether it be employed in Type (1) or Type (2) photoreceptors, is used in the form of fine powder having a particle size not larger than about 5μ, preferably not larger than 2μ, prepared by the use of a mill, such as a ball mill, a sand mill and a vibrating ball mill.

In Type (1) electrophotographic photoreceptors, if the amount of disazo compound used is too small, the photosensitivity will be low. Use of an excessive amount, on the other hand, will adversely affect charging characteristics and lower the mechanical strength of the photosensitive layer. Hence, the amount of disazo compound should be about 0.01 to about 2, preferably 0.05 to 1, times the weight of the binder. The amount of the charge transporting substance, when added as required, should be about 0.1 to about 2, preferably 0.3 to 1.3, times the weight of the binder. When a charge transporting substance that also serves as a binder is used, the preferable amount of the disazo compound is in the range of 0.01 to 0.5 part by weight per part of the binder.

In Type (2) electrophotographic photoreceptors, the amount of disazo compound in the charge generating layer should be not less than about 0.2 part by weight per part of the binder resin, because sufficient photosensitivity cannot be achieved with a lesser amount. The amount of the charge transporting substance in the charge transporting medium should be about 0.2 to about 2, preferably 0.3 to 1.3, times the weight of the binder. When a polymeric charge transporting substance that also serves as a binder is used, there is no need to use any other binders.

In preparing electrophotographic photoreceptors of this invention, other additives, such as plasticizers and sensitizers, may optionally be used in combination with the binder.

Examples of electrically conductive support materials which can be used in the electrophotographic photoreceptors of this invention include metal sheets, such as sheets of aluminum, copper and zinc; plastic sheets or films, such as those of polyester, on which an electrically conductive substance, such as aluminum, indium oxide and $SnO_2$, is vacuum-deposited or coated in the form of a dispersion; and paper rendered electrically conductive by special treatment, such as a coating of a quaternary ammonium salt of polystyrene derivative.

Typical examples of binders which can be used include condensation polymers, such as polyamides, polyesters, epoxies, polyketones and polycarbonates; and vinyl polymers, such as polyvinylketones, polystyrenes, poly-N-vinylcarbazole and polyacrylamides. However, other electrically insulating and adherent resins may also serve the purpose.

Plasticizers which can be used in this invention include biphenyl, chlorinated biphenyls, o-terphenyl, p-terphenyl, dibutyl phthalate, dimethylglycol phthalate, dioctyl phthalate, triphenyl phosphate, methylnaphthalene, benzophenone, chlorinated paraffins, polypropylene, polystyrene, dilauryl thiodipropionate, 3,5-dinitrosalicyclic acid and fluorohydrocarbons, such as a fluorine-contained surface active agent, e.g., $C_8F_{17}SO_2NHCH_2CH_2CH_2N^+(CH_3)_3I^-$.

Silicone oils or the like may optionally be added to enhance the surface smoothness of the electrophotographic photoreceptor.

Examples of sensitizers include chloranil, tetracyanoethylene, Methyl Violet, Rhodamine B, cyanine dyes, merocyanine dyes, pyrilium dyes and thiapyrilium dyes.

Charge transporting substances generally comprise two groups: substances which transport electrons and those which transport positive holes. Both of these can be used for the electrophotographic photoreceptors of this invention. Examples of substances transporting electrons include compounds having electron-attracting groups, such as 2,4,7-trinitro-9-fluorenone, 2,4,5,7-tetranitrofluorenone, 9-dicyanomethylene-2,4,7-trinitrofluorenone, 9-dicyanomethylene-2,4,5,7-tetranitrofluorenone, tetranitrocarbazole-chloranil, 2,3-dichloro-5,6-dicyanobenzoquinone, 2,4,7-trinitro-9,10-phenanthrenequinone, tetrachlorophthalic anhydride, tetracyanoethylene and tetracyanoquinodimethane.

Compounds having electron-donating groups are used as positive hole transporting substances. Examples of polymeric substances are:

(1) Polyvinylcarbazole and its derivatives, as described in Japanese Patent Publication No. 10966/59

(2) Vinyl polymers, such as polyvinylpyrene, polyvinyl anthracene, poly-2-vinyl-4-(4'-dimethylaminophenyl)5-phenyloxazole and poly-3-vinyl-N-ethylcarbazole, described in Japanese Patent Publication Nos. 18674/68 and 19192/68

(3) Polyacenaphthylene, polyindene, acenaphthylenestyrene copolymers and other polymers as described in Japanese Patent Publication No. 19193/68

(4) Condensation polymers, such as pyrene-formaldehyde resin, bromopyrene-formaldehyde resin and ethylcarbazole-formaldehyde resin, as described in Japanese Patent Publication No. 13940/81 and others (5) Triphenylmethane polymers described in Japanese Patent Applications (OPI) Nos. 90883/81 and 161550/81.

Examples of low molecular compounds which transport positive holes are:

(6) Triazole derivatives described in U.S. Pat. No. 3,112,197 and others (7) Oxadiazole derivatives described in U.S. Pat. No. 3,189,447 and others (8) Imidazole derivatives described in Japanese Patent Publication No. 16096/62 and others (9) Polyarylalkane derivatives described in U.S. Pat. Nos. 3,615,402, 3,820,989, 3,542,544, Japanese Patent Publication Nos. 555/70, 10983/76, Japanese Patent Application (OPI) Nos. 93224/76, 108667/80, 156953/80, 36656/81, Japanese Patent Application Nos. 88272/78, 78968/79, and others

(10) Pyrazoline and pyrazolone derivatives described in U.S. Pat. No. 3,180,729, Japanese Patent Application No. 75854/78, Japanese Patent Application (OPI) Nos. 88064/80, 88065/80, 105537/74, 51086/80, 80051/81, 88141/81, 45545/82, 112637/79, 74546/80 and others

(11) Phenylenediamine derivatives described in U.S. Pat. No. 3,615,404, Japanese Patent Publication Nos. 10105/76, 3712/73, 28336/72, Japanese Patent Application (OPI) Nos. 83435/79, 110836/79, 119925/79 and others

(12) Arylamine derivatives described in U.S. Pat. Nos. 3,567,450, 3,180,703, 3,240,597, 3,658,520, 4,232,103, 4,175,961, 4,012,376, German Patent (DAS) No. 1,110,518, Japanese Patent Publication Nos. 35702/74, 27577/64, Japanese Patent Application (OPI) Nos. 144250/80, 119132/81, 22437/81 and others

(13) Amino-substituted chalcone derivatives described in U.S. Pat. No. 3,542,546

(14) N,N-dicarbazyl derivatives described in U.S. Pat. No. 3,542,546 and others

(15) Oxazole derivatives described in U.S. Pat. No. 3,257,203 and others

(16) Styrylanthracene derivatives described in Japanese Patent Application (OPI) No. 46234/81 and others

(17) Fluorenone derivatives described in Japanese Patent Application (OPI) No. 110837/79 and others

(18) Hydrazone derivatives described in U.S. Pat. No. 3,717,462, Japanese Patent Application (OPI) Nos. 59143/74 (corresponding to U.S. Pat. No. 4,150,987), 52063/80, 52064/80, 46760/80, 64244/82, Japanese Patent Application Nos. 85495/80, 33832/81 and others.

The charge transporting substances which can be used in this invention are not limited to the Compounds (1) through (18) above; other compounds known as charge transporting substances may be employed to achieve the purpose of this invention, if desired.

Two or more charge transporting substances may be used in combination, if desired.

The photoreceptor thus prepared may be provided, as required, with an adhesive or barrier layer between the electrically conductive support material and the photosensitive layer. Polyamide, nitrocellulose and aluminum oxide may be used as the material for this adhesive or barrier layer, and the thickness of this layer preferably is 1 μm or less.

The electrophotographic photoreceptors of this invention detailed above have high sensitivity, high durability and other outstanding features.

The electrophotographic photoreceptors of this invention can be employed in electrophotographic copying machines, printers using laser and cathode-ray tubes as light sources, and many other devices.

The photoconductive compositions of this invention can be employed as the photoconductive layer in video camera pickup tubes, and as the conductive layer of a solid image pickup element disposed over the entire surface of linear or planar semiconductor circuits used for signal transfer and scanning. Other applications include photoconductive layers in solar cells as described in A. K. Ghosh and Tom Freng, *J. Appl. Phys.*, 49 (12), 5982 (1978).

It is also possible to prepare printed circuit boards and printing plates with high resolution, durability and sensitivity by dispersing the disazo compounds of this invention, as disclosed in Japanese Patent Publication No. 17162/62, Japanese Patent Application (OPI) Nos. 19063/80 and 161250/80, and Japanese Patent Application No. 33579/81, in a solution of an alkali-soluble resin together with a charge transporting substance (e.g., oxidiazole and hydrazine derivatives), and coating this suspension on an electrically conductive support material (e.g., aluminum), followed by exposure for image formation, development with a toner and etching with an aqueous alkali solution.

The following examples are given to further illustrate the present invention but are not to be considered a limitation thereupon.

EXAMPLE 1

One part of Diasazo Compound (I-1), 5 parts of 4,4'-bis(diethylamino)-2,2'-dimethyltriphenylmethane and 5 parts of bisphenol A polycarbonate were added to 95 parts of dichloromethane. The mixture was milled in a ball mill to prepare a coating liquid, and this liquid was coated with a wire round rod on a transparent conductive support material (100 μm thick polyethylene terephthalate film with indium oxide vacuum-deposited thereupon; surface resistance: $10^3 \Omega$) and dried to produce an electrophotographic photoreceptor having a monolayer type photosensitive layer about 8 μm thick.

Using an electrophotographic copying paper tester (Kawaguchi Electric, Model SP-428), this photoreceptor was charged to +400 v with a +5 kv corona discharge, the charged surface was irradiated with a tungsten lamp of a color temperature of 3,000° K. so that the surface illuminance was 4 lux, and the half-value exposure $E_{50}$ (lux.sec) was determined by measuring the time required for the surface potential to decrease to half its original level. The result was 12.3 lux.sec. This value remained practically the same after repeating the cycle of charging and exposure 3,000 times.

EXAMPLES 2–52

Monolayer-type electrophotographic photoreceptors were prepared in a similar manner as described in Example 1, except that the following Disazo Compounds (I-3), (I-5), (I-6), (I-7), (I-10), (I-43), (I-48), (I-53), (I-62), (II-2), (II-4), (II-8), (II-13), (II-18), (II-44), (II-49), (II-54), (II-63), (III-6), (III-9), (III-12), (III-15), (III-20), (III-45), (III-50), (III-55), (III-61), (IV-1), (IV-6), (V-2), (V-7), (VI-1), (VI-6), (VII-1), (VII-7), (VIII-1), (VIII-8), (IX-5), (IX-7), (X-1), (X-7), (XI-2), (XI-6), (XII-3), (XII-8), (XIII-1), (XIII-6), (XIII-7), (XIV-2) and (XIV-6) were used in place of Disazo Compound (I-1). The half-value exposure with positive charging was determined in the same manner as described in Example 1. The results obtained are shown in Table 3 below.

TABLE 3

| Example | Disazo Compound | $E_{50}$ (lux · sec) |
|---|---|---|
| 2 | (I-3) | 6.0 |
| 3 | (I-5) | 3.8 |
| 4 | (I-6) | 6.5 |
| 5 | (I-7) | 3.4 |
| 6 | (I-10) | 6.6 |
| 7 | (I-43) | 6.0 |
| 8 | (I-48) | 3.7 |
| 9 | (I-53) | 14.1 |
| 10 | (I-62) | 31.5 |
| 11 | (II-2) | 5.1 |

TABLE 3-continued

| Example | Disazo Compound | $E_{50}$ (lux · sec) |
|---|---|---|
| 12 | (II-4) | 11.0 |
| 13 | (II-8) | 4.0 |
| 14 | (II-13) | 4.9 |
| 15 | (II-18) | 2.2 |
| 16 | (II-44) | 7.8 |
| 17 | (II-49) | 6.5 |
| 18 | (II-54) | 34.8 |
| 19 | (II-63) | 42.7 |
| 20 | (III-6) | 5.2 |
| 21 | (III-9) | 4.8 |
| 22 | (III-12) | 3.3 |
| 23 | (III-15) | 3.1 |
| 24 | (III-20) | 5.2 |
| 25 | (III-45) | 8.6 |
| 26 | (III-50) | 12.1 |
| 27 | (III-55) | 26.4 |
| 28 | (III-61) | 64.3 |
| 29 | (IV-1) | 14.5 |
| 30 | (IV-6) | 13.2 |
| 31 | (V-2) | 19.5 |
| 32 | (V-7) | 16.6 |
| 33 | (VI-1) | 9.3 |
| 34 | (VI-6) | 49.1 |
| 35 | (VII-1) | 14.5 |
| 36 | (VII-7) | 18.0 |
| 37 | (VIII-1) | 18.3 |
| 38 | (VIII-8) | 42.0 |
| 39 | (IX-5) | 13.6 |
| 40 | (IX-7) | 16.5 |
| 41 | (X-1) | 24.1 |
| 42 | (X-7) | 14.8 |
| 43 | (XI-2) | 23.8 |
| 44 | (XI-6) | 15.7 |
| 45 | (XII-6) | 18.1 |
| 46 | (XII-3) | 24.7 |
| 47 | (XII-8) | 37.4 |
| 48 | (XIII-1) | 25.6 |
| 49 | (XIII-6) | 19.0 |
| 50 | (XIII-7) | 16.8 |
| 51 | (XIV-2) | 10.6 |
| 52 | (XIV-6) | 28.5 |

EXAMPLE 53

Five grams of Disazo Compound (I-1) was dispersed in a solution of 5 g of polyester resin (Toyobo, Bryon-200$^R$) in 50 ml tetrahydrofuran by treating the mixture in a ball mill for 20 hours, and the resulting suspension was coated with a wire wound rod on a transparent electrically conductive support material (75 μm thick polyethylene terephthalate film with aluminum vacuum-deposited thereupon; surface resistance: $10^2 \Omega$) and dried to produce a charge generating layer 1 μm in thickness.

On this layer was coated, with a wire wound rod, a solution of 3.6 parts of p-(diphenylamino)benzaldehyde-N'-methyl-N'-phenylhydrazone of the following formula

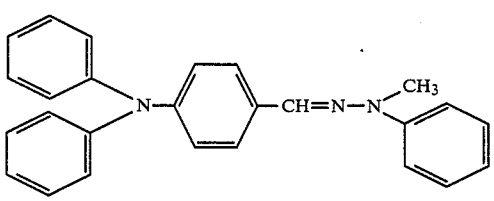

and 4 parts of bisphenol A polycarbonate in 13.3 parts of dichloromethane and 26.6 parts of 1,2-dichloroethane, followed by drying, to form a charge transporting layer 11 μm thick, to produce an electrophotographic photoreceptor comprising a double layer type photosensitive layer.

This photoreceptor was charged to −600 v using a −5 kv corona discharge. Its half-value exposure $E_{50}$ was 8.0 lux.sec. Little change was observed in this value after repeating the cycle of charging and exposure 3,000 times.

EXAMPLES 54–120

Double layer type electrophotographic photoreceptors were prepared in a similar manner to that described in Example 53, except that the following Disazo Compounds (I-2), (I-4), (I-8), (I-9), (I-11), (I-13), (I-25), (I-26), (I-28), (I-30), (I-43), (I-48), (I-54), (I-63), (II-1), (II-3), (II-5), (II-6), (II-7), (II-9), (II-10), (II-11), (II-12), (II-43), (II-48), (II-53), (II-64), (III-1), (III-2), (III-3), (III-4), (III-5), (III-11), (III-13), (III-25), (III-26), (III-28), (III-30), (III-31), (III-43), (III-48), (III-53), (III-61), (IV-2), (IV-8), (V-1), (V-6), (VI-2), (VI-7), (VII-2), (VII-6), (VIII-2), (VIII-7), (IX-1), (IX-6), (X-2), (X-8), (XI-1), (XI-5), (XII-1), (XII-7), (XIII-1), (XIII-2), (XIII-6), (XIII-7), (XIV-1) and (XIV-7) were used in place of Disazo Compound (I-1). The half-value exposure amount $E_{50}$ with negative charging is shown in Table 4 below.

TABLE 4

| Example | Disazo Compound | $E_{50}$ (lux · sec) |
| --- | --- | --- |
| 54 | (I-2) | 5.9 |
| 55 | (I-4) | 7.9 |
| 56 | (I-8) | 8.9 |
| 57 | (I-9) | 4.6 |
| 58 | (I-11) | 5.6 |
| 59 | (I-13) | 15.5 |
| 60 | (I-25) | 4.3 |
| 61 | (I-26) | 8.4 |
| 62 | (I-28) | 1.7 |
| 63 | (I-30) | 4.9 |
| 64 | (I-43) | 4.1 |
| 65 | (I-48) | 11.7 |
| 66 | (I-54) | 48.6 |
| 67 | (I-63) | 40.0 |
| 68 | (II-1) | 5.3 |
| 69 | (II-3) | 1.6 |
| 70 | (II-5) | 7.4 |
| 71 | (II-6) | 2.4 |
| 72 | (II-7) | 9.4 |
| 73 | (II-9) | 2.8 |
| 74 | (II-10) | 3.7 |
| 75 | (II-11) | 9.3 |
| 76 | (II-12) | 3.5 |
| 77 | (II-43) | 4.7 |
| 78 | (II-48) | 8.4 |
| 79 | (II-53) | 16.8 |
| 80 | (II-64) | 56.1 |
| 81 | (III-1) | 2.4 |
| 82 | (III-2) | 2.2 |
| 83 | (III-3) | 8.2 |
| 84 | (III-4) | 19.1 |
| 85 | (III-5) | 8.1 |
| 86 | (III-11) | 3.8 |
| 87 | (III-13) | 6.7 |
| 88 | (III-25) | 3.2 |
| 89 | (III-26) | 11.1 |
| 90 | (III-28) | 3.5 |
| 91 | (III-30) | 11.3 |
| 92 | (III-31) | 5.3 |
| 93 | (III-43) | 10.9 |
| 94 | (III-48) | 7.3 |
| 95 | (III-53) | 13.5 |
| 96 | (III-61) | 42.0 |
| 97 | (IV-2) | 22.1 |
| 98 | (IV-8) | 24.9 |
| 99 | (V-1) | 19.7 |
| 100 | (V-6) | 17.8 |
| 101 | (VI-2) | 13.8 |
| 102 | (VI-7) | 17.0 |
| 103 | (VII-2) | 24.9 |
| 104 | (VII-6) | 16.9 |
| 105 | (VIII-2) | 19.8 |
| 106 | (VIII-7) | 17.0 |
| 107 | (IX-1) | 22.9 |
| 108 | (IX-6) | 19.8 |
| 109 | (X-2) | 22.4 |
| 110 | (X-8) | 39.3 |
| 111 | (XI-1) | 25.9 |
| 112 | (XI-5) | 21.6 |
| 113 | (XII-1) | 25.3 |
| 114 | (XII-7) | 30.3 |
| 115 | (XIII-1) | 16.8 |
| 116 | (XIII-2) | 17.0 |
| 117 | (XIII-6) | 13.5 |
| 118 | (XIII-7) | 12.8 |
| 119 | (XIV-1) | 15.2 |
| 120 | (XIV-7) | 11.7 |

EXAMPLE 121

A charge transporting layer 12 μm thick was formed on a charge generating layer 1 μm thick in a similar manner to that described in Example 82, except that 4 parts of 2,4,7-trinitro-9-fluorenone was used as a charge transporting substance in place of p-(diphenylamino)-benzaldehyde-N'-methyl-N'-phenylhydrazone.

The resultant electrophotographic photoreceptor was charged to +600 v using a +5 corona discharge. Its half-value exposure $E_{50}$ was 8.9 lux.sec.

EXAMPLES 122–141

Electrophotographic photoreceptors of a double layer type were prepared in a similar manner to that described in Example 121, except that the following Disazo Compounds (I-2), (I-30), (I-44), (II-4), (II-31), (II-48), (III-18), (III-35), (III-49), (IV-2), (V-1), (VI-3), (VII-1), (VIII-4), (IX-3), (X-1), (XI-5), (XII-6), (XIII-1) and (XIV-2) were used in place of Disazo Compound (I-1). The half-value exposure amount $E_{50}$ is shown in Table 5 below.

TABLE 5

| Example | Disazo Compound | $E_{50}$ (lux · sec) |
| --- | --- | --- |
| 122 | (I-2) | 15.5 |
| 123 | (I-30) | 9.0 |
| 124 | (I-44) | 8.4 |
| 125 | (II-4) | 17.3 |
| 126 | (II-31) | 16.6 |
| 127 | (II-48) | 15.2 |
| 128 | (III-18) | 9.1 |
| 129 | (III-35) | 15.7 |
| 130 | (III-49) | 29.2 |
| 131 | (IV-2) | 38.5 |
| 132 | (V-1) | 48.6 |
| 133 | (VI-3) | 29.8 |
| 134 | (VII-1) | 28.3 |
| 135 | (VIII-4) | 26.7 |
| 136 | (IX-3) | 34.6 |
| 137 | (X-1) | 24.4 |
| 138 | (XI-5) | 35.0 |
| 139 | (XII-6) | 25.9 |
| 140 | (XIII-1) | 22.0 |
| 141 | (XIV-2) | 17.9 |

EXAMPLE 142

One part of Disazo Compound (I-1), 1 part of p-(diphenylamino)benzaldehyde-N'-methyl-N'-phenylhydrazone and 6 parts of m-cresol formaldehyde resin were added to 30 parts of ethyleneglycol monomethyl ether, the mixture was milled in a ball mill, the resulting suspension was coated with a wire wound rod on an about 0.25 mm thick aluminum sheet (sandblasted, anodized and pore-filled), and the coated layer was dried at 90° C. for 10 minutes and at 50° C. for an additional 24 hours, giving a sample sheet about 6 μm in thickness.

This sample sheet was subjected to corona discharge in the dark to a surface potential of 500 v, the image of a negative was projected onto this charged sheet using tungsten light (300 lux), and the exposed sheet was subjected to reversal development process with Mitsubishi Diafaxmaster LOM-Ed toner (Mitsubishi Paper Mills, Ltd.), to produce an original printing plate bearing a very sharp positive image. This original plate was soaked in a 10-fold dilution of etching solution DP-1 (Fuji Photo Film Co., Ltd.; aqueous solution of sodium silicate) for 1 minute to dissolve off plain areas (areas with no toner attached) of the photosensitive layer. As a result the pigment in plain areas was also removed together with the binder, to produce a printing plate bearing a clear and sharp image.

While the invention has been described in detail and with reference to specific embodiments thereof, it will be apparent to one skilled in the art that various changes and modifications can be made therein without departing from the spirit and scope thereof.

What is claimed is:

1. A photoconductive composition comprising disazo compound represented by the general formula (1)

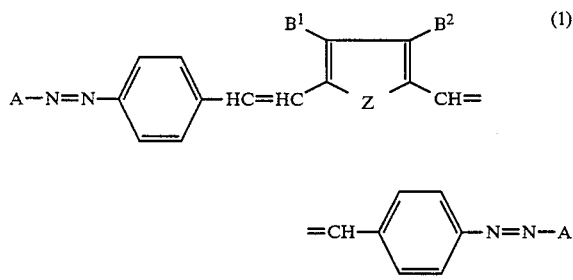

wherein $B^1$ and $B^2$ each represents a hydrogen atom, a halogen atom, a lower alkyl group, a lower alkoxy group, a lower alkoxycarbonyl group, an aryl group, an aryloxy group, an aryloxycarbonyl group, or a substituted group thereof; Z is

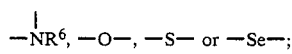

$R^6$ is a hydrogen atom, a lower alkyl group, an aryl group, an aryloxy group, an aryloxycarbonyl group or a substituted group thereof; A represents

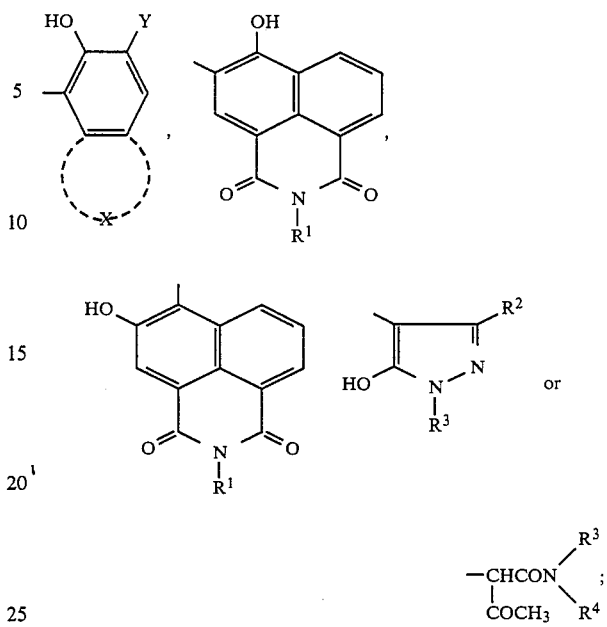

X represents a group of atoms which links with the benzene ring to which the hydroxyl group and the Y group are attached to form an aromatic ring or a heterocyclic ring which may be substituted or unsubstituted; Y represents

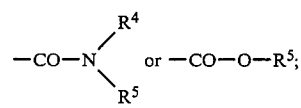

$R^1$ is an alkyl group, a phenyl group, or a substituted group thereof; $R^2$ is a hydrogen atom, a lower alkyl group, a carbamoyl group, a carboxyl group, an alkoxycarbonyl group, an aryloxycarbonyl group, or a substituted or unsubstituted amino group; $R^3$ and $R^5$ each represents an alkyl group, an aromatic group or a heterocyclic group, or a substituted group thereof; and $R^4$ is a hydrogen atom, an alkyl group, a phenyl group or a substituted group thereof.

2. The photoconductive disazo compound of claim 1, wherein the lower alkyl group for $R^6$ is methyl, ethyl, propyl, butyl, pentyl, hexyl, isopropyl, isobutyl, isohexyl, neopentyl or tert-butyl and the substituents on the alkyl group for $R^6$ can be one or more of a hydroxyl group, an alkoxyl group of 1 to 6 carbon atoms, a cyano group, an alkylamino group of 1 to 6 carbon atoms, a dialkylamino group having two alkyl groups of 1 to 6 carbon atoms, a halogen atom or an aryl group of 6 to 15 carbon atoms, said unsubstituted aryl group for $R^6$ is phenyl or naphthyl, said unsubstituted aryloxy group for $R^6$ is phenoxy or naphthoxy, said unsubstituted aryloxycarbonyl group for $R^6$ is phenoxycarbonyl or naphthoxycarbonyl, and when $R^6$ is a substituted aryl group, a substituted aryloxy group or substituted aryloxycarbonyl group, the substituent group may be the same as defined for the substituted alkyl group for $R^6$.

3. The photoconductive disazo compound of claim 1, wherein the substituted aromatic ring or heterocyclic ring for X contains one or more of a halogen atom or a lower alkyl group as a substituent.

4. The photoconductive disazo compound of claim 1, wherein the alkyl group for $R^1$ is methyl, ethyl, propyl, butyl, pentyl, hexyl, isopropyl, isobutyl, isoamyl, isohexyl, neopentyl, or tert-butyl; and the substituted alkyl group for $R^1$ is an alkyl group substituted with one or more of a hydroxyl group, alkoxy group of 1 to 12 carbon atoms, a cyano group, an amino group, an alkylamino group of 1 to 12 carbon atoms, a dialkylamino group with two alkyl groups of 1 to 12 carbon atoms, a halogen atom or an aryl group of 6 to 15 carbon atoms; the substituted phenyl group for $R^1$ is a phenyl group substituted with one or more of a hydroxy group, an alkoxy group of 1 to 12 carbon atoms, a cyano group, an amino group, an alkylamino group of 1 to 12 carbon atoms, a dialkylamino group having two alkyl groups of 1 to 12 carbon atoms, a halogen atom, an alkyl group of 1 to 6 carbon atoms and a nitro group.

5. The photoconductive disazo compound of claim 1, wherein the lower alkyl group for $R^2$ is methyl, ethyl, propyl, butyl, isopropyl or isobutyl, the alkoxycarbonyl group for $R^2$ contains an alkoxy moiety of 1 to 12 carbon atoms, the aryloxycarbonyl group for $R^2$ contains an aryloxy group of 6 to 20 carbon atoms and the substituted amino group for $R^2$ is methylamino, ethylamino, propylamino, phenylamino, tolylamino, benzylamino, phenethylamino, dimethylamino, diethylamino or diphenylamino.

6. The photoconductive disazo compound of claim 1, wherein the alkyl group for $R^3$ and $R^5$ is an alkyl group of 1 to 20 carbon atoms, the aromatic groups for $R^3$ and $R^5$ is a phenyl group or a naphthyl group, the heterocyclic group for $R^3$ and $R^5$ is a heterocyclic group containing one or more of oxygen, nitrogen or sulfur hetero atoms and the substituted alkyl for $R^3$ and $R^5$ is an alkyl group substituted with one or more of a hydroxy group, an alkoxy group of 1 to 12 carbon atoms, a cyano group, an amino group, an alkylamino group of 1 to 12 carbon atoms, a dialkylamino group with alkyl groups of 1 to 12 carbon atoms, a halogen atom and an aryl group of 6 to 15 carbon atoms, and the substituted aromatic group for $R^3$ and $R^5$ is substituted with one or more of a hydroxyl group, a cyano group, a nitro group, a halogen atom, an alkyl group of 1 to 12 carbon atoms, an alkoxy group of 1 to 12 carbon atoms, an amino group, an alkylamino group of 1 to 12 carbon atoms, a dialkylamino group having two alkyl groups of 1 to 12 carbon atoms, an arylamino group of 6 to 12 carbon atoms, a diarylamino group of 6 to 15 carbon atoms, a carboxyl group, an alkali metal carboxylate group, an alkali metal sulfonate group, an alkylcarbonyl group, an arylcarbonyl group having an aryl group of 6 to 12 carbon atoms and an alkylthio group of 1 to 12 carbon atoms.

7. The photoconductive disazo compound of claim 1, wherein the alkyl group for $R^4$ is an alkyl group having 1 to 20 carbon atoms and the substituted alkyl group for $R^4$ is an alkyl group substituted with one or more of a hydroxyl group, an alkoxy group of 1 to 12 carbon atoms, a cyano group, an amino group, an alkylamino group of 1 to 12 carbon atoms, a dialkylamino group with two alkyl groups of 1 to 12 carbon atoms, a halogen atom and an aryl group of 6 to 15 carbon atoms, and the substituted phenyl group for $R^4$ is a phenyl group substituted with one or more of a hydroxyl group, a cyano group, a nitro group, a halogen atom, an alkyl group of 1 to 12 carbon atoms, an alkoxyl group of 1 to 12 carbon atoms, an amino group, an alkylamino group of 1 to 12 carbon atoms, a dialkylamino group having two alkyl groups of 1 to 12 carbon atoms, an arylamino group of 6 to 12 carbon atoms, a diarylamino group having two aryl groups of 6 to 15 carbon atoms, a carboxyl group, an alkali metal carboxylate group, an alkali metal sulfonate group, an alkylcarbonyl group, an arylcarbonyl group having an aryl group of 6 to 12 carbon atoms, an alkylthio group of 1 to 12 carbon atoms and an arylthio group of one to 12 carbon atoms.

8. The photoconductive disazo compound of claim 1, wherein $B^1$ and $B^2$ each represents a hydrogen atom, a halogen atom, an alkyl group of 1 to 6 carbon atoms, an alkoxy group of 1 to 6 carbon atoms, an alkoxycarbonyl group of 1 to 6 carbon atoms, an aryl group of 6 to 15 carbon atoms, an aryloxy group of 6 to 15 carbon atoms, or an aryloxycarbonyl group of 6 to 15 carbon atoms and the substituents for the alkyl, alkoxy, alkoxycarbonyl, aryl, aryloxy or aryloxycarbonyl groups are selected from the group consisting of one or more of a hydroxyl group, an alkoxyl group of 1 to 6 carbon atoms, a cyano group, an alkylamino group of 1 to 6 carbon atoms, a dialkylamino group having two alkyl groups of 1 to 6 carbon atoms, a halogen atom or an aryl group of 6 to 15 carbon atoms.

9. The photoconductive disazo compound of claim 1, wherein said compound represented by the general formula (1) has the general formula (2)

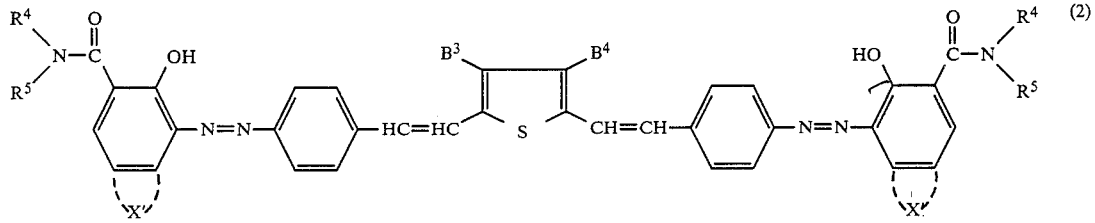

wherein $B^3$ and $B^4$ each represents a hydrogen atom, a chlorine atom or a bromine atom; X' represents a benzene ring, a carbazole ring or a dibenzofuran ring; and $R^4$ and $R^5$ are as defined in the general formula (1).

10. An electrophotographic photoreceptor comprising an electrically conductive support and a photoconductive layer provided thereon which comprises a charge transporting substance and a charge generating substance, the charge generating substance being a disazo compound represented by the general formula (1)

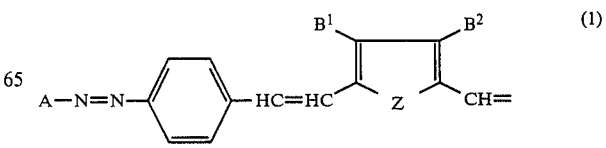

-continued

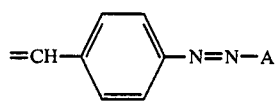

wherein $B^1$ and $B^2$ each represents a hydrogen atom, a halogen atom, a lower alkyl group, a lower alkoxy group, a lower alkoxycarbonyl group, an aryl group, an aryloxy group, an aryloxycarbonyl group, or a substituted group thereof; Z is

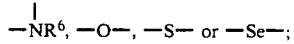

$R^6$ is a hydrogen atom, a lower alkyl group, an aryl group, an aryloxy group, an aryloxycarbonyl group or a substituted group thereof; a represents

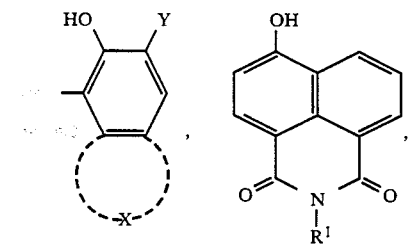

-continued

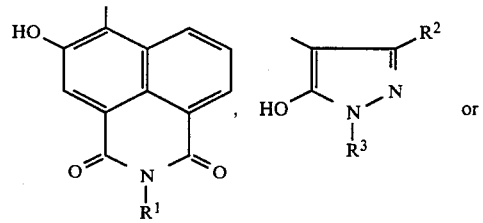

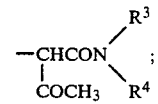

X represents a group of atoms which links with the benzene ring to which the hydroxyl group and the Y groups are attached to form an aromatic or heterocyclic ring, which may be substituted or unsubstituted; Y represents

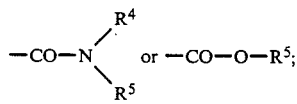

$R^1$ is an alkyl group, a phenyl group, or a substituted group thereof; $R^2$ is a hydrogen atom, a lower alkyl group, a carbamoyl group, a carboxyl group, an alkoxycarbonyl group, an aryloxycarbonyl group, or a substituted or unsubstituted amino group; $R^3$ and $R^5$ each represents an alkyl group, an aromatic group or a heterocyclic group, or a substituted group thereof; and $R^4$ is a hydrogen atom, an alkyl group, a phenyl group, or a substituted group thereof; on an electrically conductive support.

11. The electrophotographic photoreceptor of claim 10, wherein the photoconductive layer comprises a single layer containing the charge transporting substance and the charge generating substance.

12. The electrophotographic photoreceptor of claim 10, wherein the photoconductive layer comprises at least two layers comprising a layer containing the charge transporting substance and a layer containing the charge generating substance.

* * * * *